(12) United States Patent
Chang et al.

(10) Patent No.: US 10,670,830 B2
(45) Date of Patent: Jun. 2, 2020

(54) OPTICAL IMAGE CAPTURING SYSTEM

(71) Applicant: ABILITY OPTO-ELECTRONICS TECHNOLOGY CO. LTD., Taichung (TW)

(72) Inventors: Yeong-Ming Chang, Taichung (TW); Kuo-Yu Liao, Taichung (TW); Chien-Hsun Lai, Taichung (TW); Yao-Wei Liu, Taichung (TW)

(73) Assignee: ABILITY OPTO-ELECTRONICS TECHNOLOGY CO. LTD., Taichung (TW)

( * ) Notice: Subject to any disclaimer, the term of this patent is extended or adjusted under 35 U.S.C. 154(b) by 132 days.

(21) Appl. No.: 16/043,309

(22) Filed: Jul. 24, 2018

(65) Prior Publication Data

US 2019/0339486 A1 Nov. 7, 2019

(30) Foreign Application Priority Data

May 1, 2018 (TW) .............................. 107114798 A

(51) Int. Cl.
G02B 9/34 (2006.01)
G02B 27/00 (2006.01)
H04N 5/225 (2006.01)
G02B 13/00 (2006.01)

(52) U.S. Cl.
CPC .............. G02B 9/34 (2013.01); G02B 13/004 (2013.01); G02B 27/0025 (2013.01); H04N 5/2254 (2013.01)

(58) Field of Classification Search
CPC .......... G02B 9/36; G02B 3/02; G02B 13/004; G02B 9/34; G02B 13/04
See application file for complete search history.

(56) References Cited

U.S. PATENT DOCUMENTS 9,341,857 B2 * 5/2016 Suzuki ................... G02B 27/42

* cited by examiner

Primary Examiner — Joseph P Martinez
(74) Attorney, Agent, or Firm — Muncy, Geissler, Olds & Lowe, P.C.

(57) ABSTRACT

An optical image capturing system is provided. In order from an object side to an image side, the optical image capturing system includes a first lens, a second lens, a third lens and a fourth lens. The first lens has a refractive power and the object side thereof may be convex. The second lens and the third lens have refractive power. The object side and the image side of the foregoing lenses may be aspheric. The fourth lens may have positive refractive power. The object side and the image side thereof are aspheric. At least one of surfaces of the fourth lens may have one inflection point. The four lenses have refractive power. When meeting some certain conditions, the optical image capturing system may have outstanding light-gathering ability and an adjustment ability about the optical path in order to elevate the image quality.

25 Claims, 25 Drawing Sheets

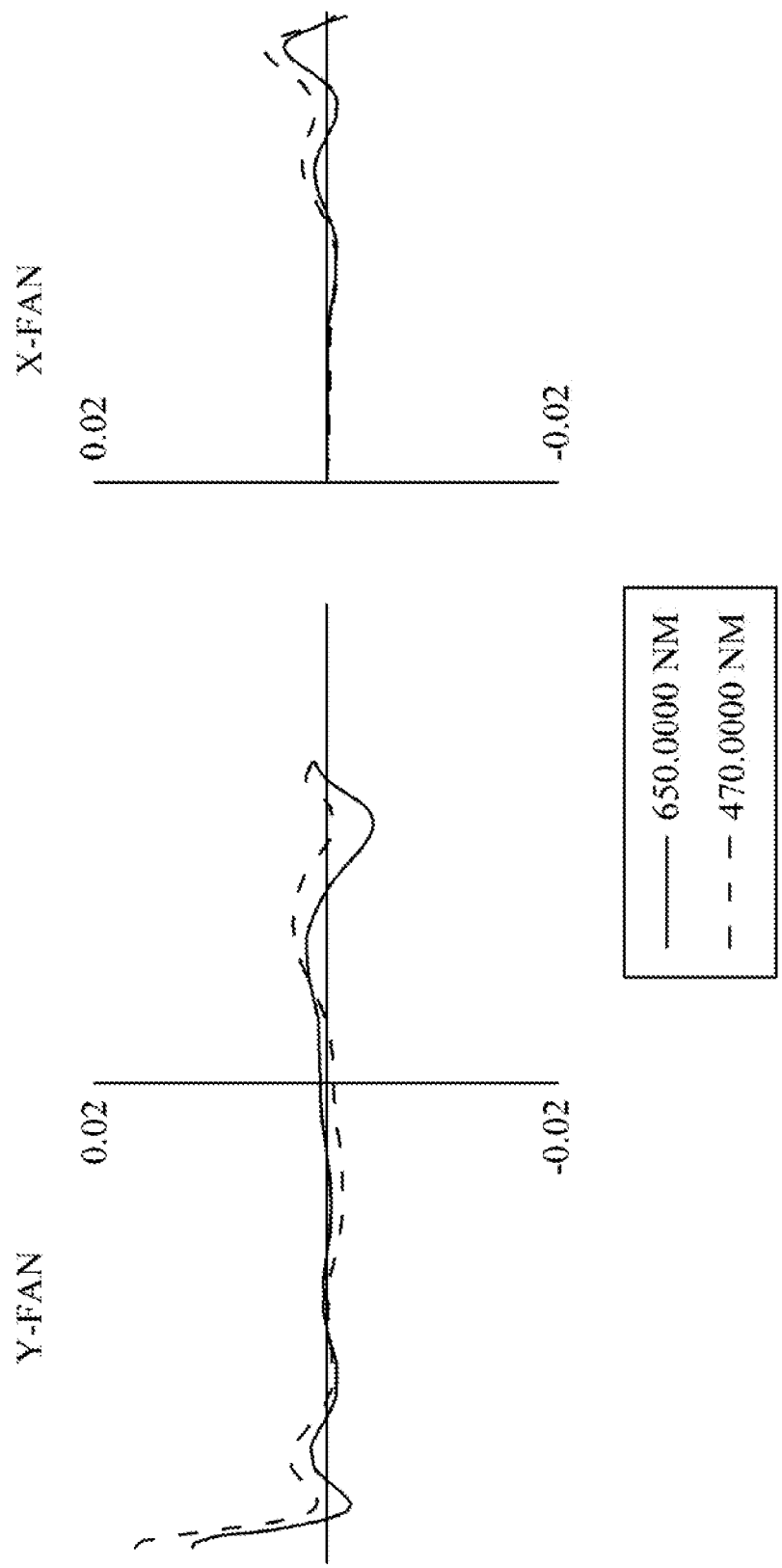

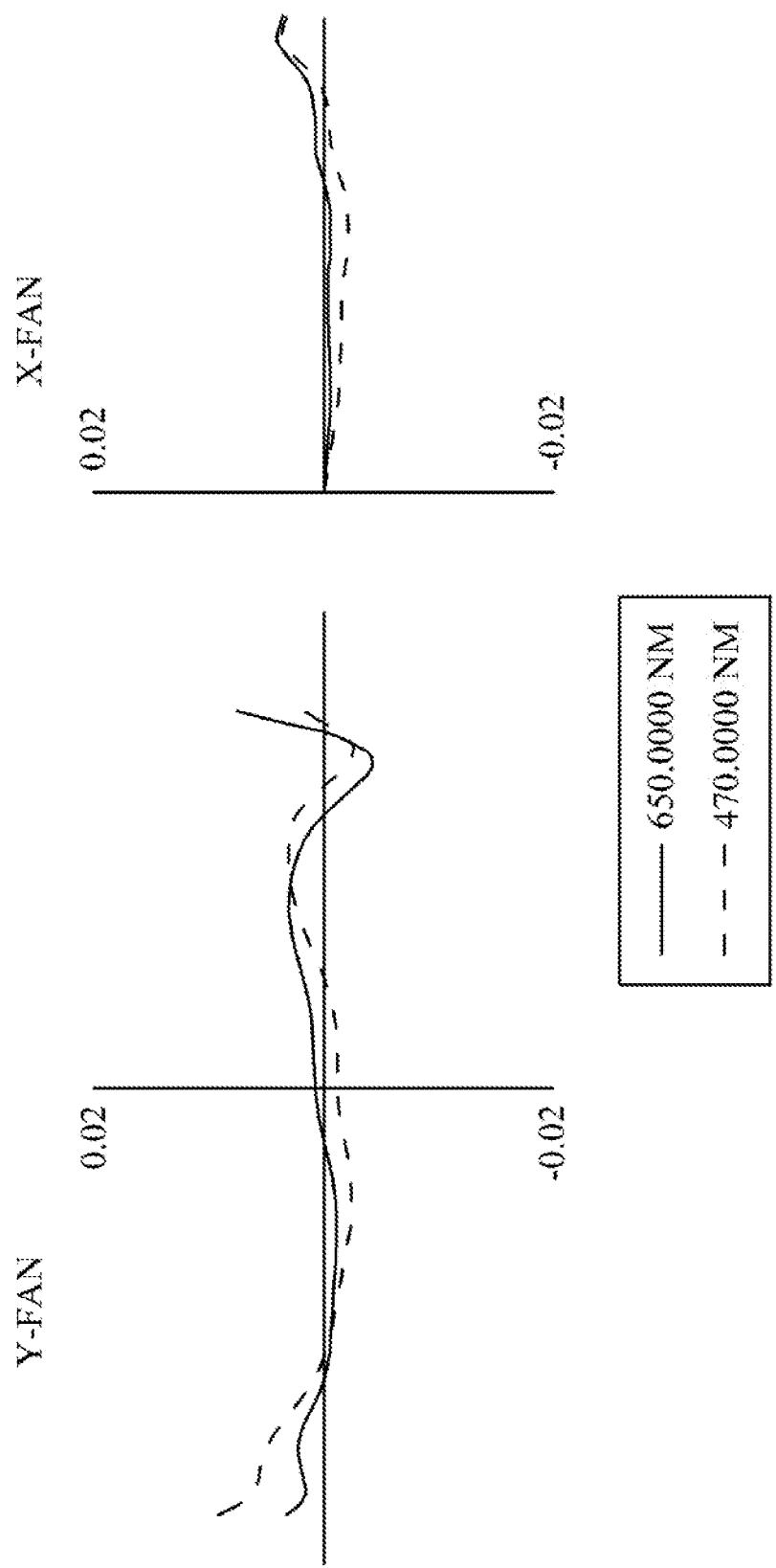

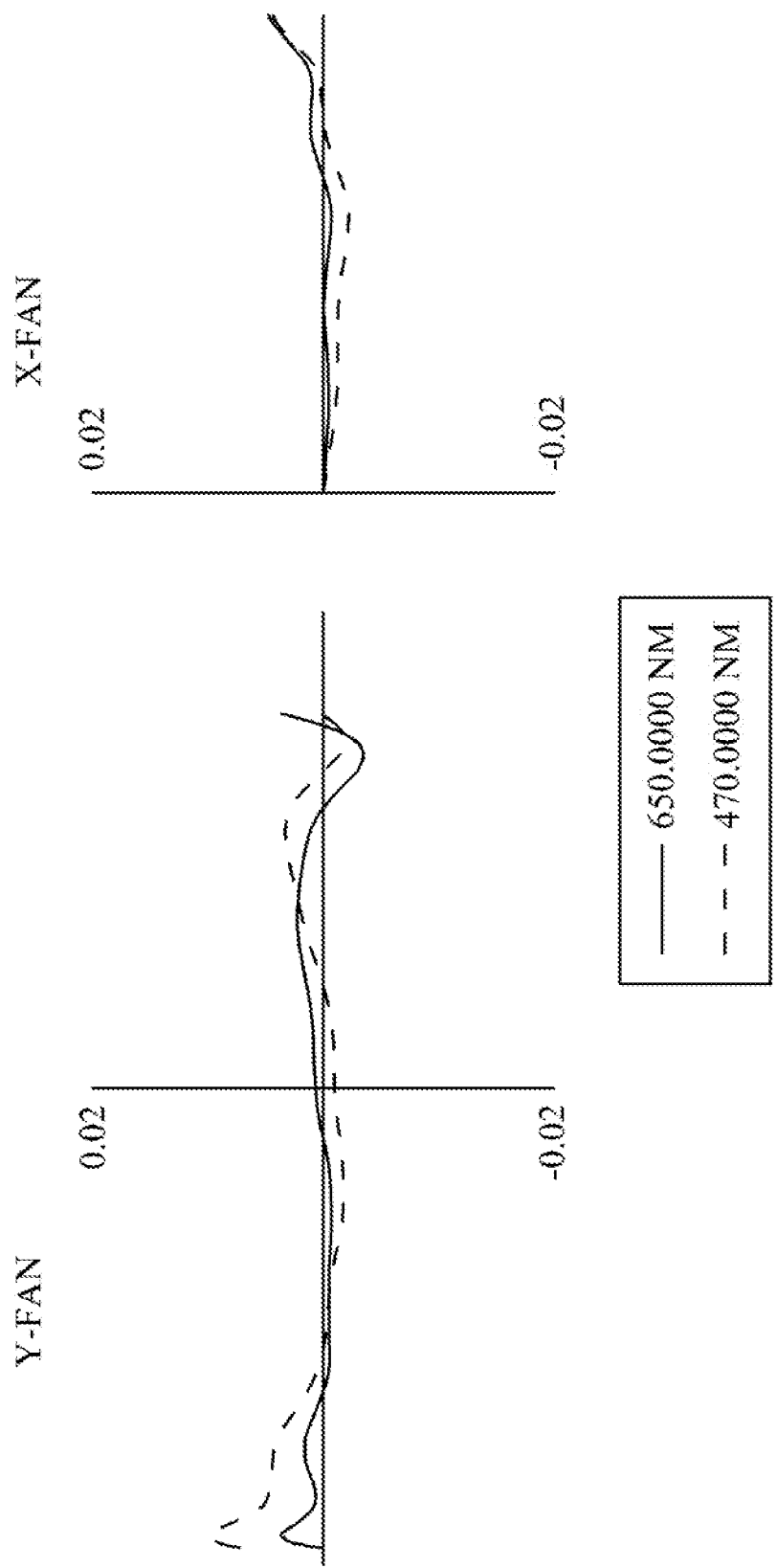

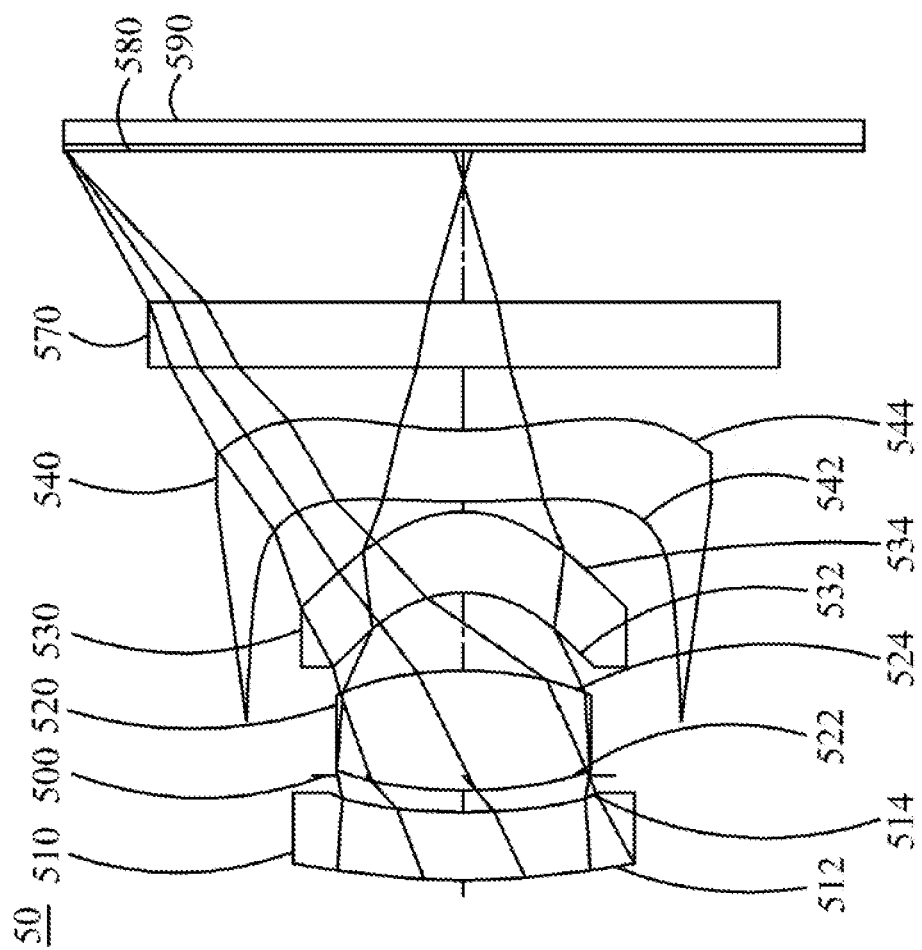

OPTICAL IMAGE CAPTURING SYSTEM

CROSS-REFERENCE TO RELATED APPLICATION

This application claims priority from Taiwan Patent Application No. 107114798, filed on May 1, 2018, in the Taiwan Intellectual Property Office, the content of which is hereby incorporated by reference in its entirety for all purposes.

BACKGROUND OF THE INVENTION

1. Field of the Invention

The present invention relates to the optical image capturing system, and more particularly is about the compact optical image capturing system applied to electronic products.

2. Description of the Related Art

In recent years, with the rise of portable electronic devices having camera functionalities, the demand for an optical image capturing system has gradually been raised. The image-sensing device of the ordinary photographing camera is commonly selected from charge coupled device (CCD) or complementary metal-oxide semiconductor sensor (CMOS Sensor). In addition, as advanced semiconductor manufacturing technology enables the minimization of the pixel size of the image-sensing device, the development of the optical image capturing system has gravitated towards the field of high pixels. Therefore, the requirement for high imaging quality has been rapidly increasing.

Conventional optical image capturing systems of portable electronic devices usually adopt a two lenses structure or three lenses structure as their main structure. However, since the pixel density of portable electronic devices has continuously increased, more end-users are demanding a large aperture for such as functionalities as glimmer and night view, or for a wide angle of view such as for selfies using the front camera. However, the optical image capturing system with the large aperture often encounters the dilemma of plentiful aberration, which results in the deterioration of peripheral image quality and difficulties about manufacturing, and the optical image capturing system with wide angle of view design encounters the dilemma of increased distortion rate in image formation. Conventional optical image capturing systems may not be sufficient to meet those advanced photography requirements.

Therefore, how to design an optical image capturing system capable of balancing the requirements for higher total pixel and higher image quality as well as the minimization of optical lenses by effectively increasing the amount of admitted light and the angle of view the optical image capturing system has become an important issue.

SUMMARY OF THE INVENTION

The aspect of embodiment of the present invention directs to an optical image capturing system which is able to use combination of refractive power, convex and concave surfaces of four optical lenses (the convex or concave surface in the invention is the geometrical shape of an object side or an image side of each lens on an optical axis in principle) and the mechanism elements with small thickness is used for positioning the lenses. Further, the quantity of incoming light of the optical image capturing system is effectively enhanced and thus the angle of view of the optical image capturing system is increased. Simultaneously, the optical image capturing system has a specific relative illuminance and the total pixels and the image quality increases to apply to miniaturization or to the narrow borders of an electronic product.

The terms and the numerals pertaining to the mechanism elements parameters in the embodiment of the present invention are shown as below for further reference.

The optical image capturing system may include an image-sensing module, and the image-sensing module includes a substrate and a photosensitive element disposed on the substrate. The optical image capturing system may include a first positioning element denoted by PE1 (positioning element 1) and comprises a base and a holder. The base has an open accommodation space disposed on the substrate and used to accommodate the photosensitive element. The holder is in a hollow shape and opaque. Optionally, the holder can be formed integrally. The holder has a cylinder and a basement connected with each other. The cylinder has a predetermined thickness. The holder has a first through hole and a second through hole, which are formed on the two opposite ends, respectively. The first through hole is connected with the cylinder, and the second through hole is connected with the basement. A maximum value of the minimum side length of the basement perpendicular to the optical axis is denoted by PhiD. A maximum diameter of the inner hole of the second through holes is denoted by Phi2.

The optical image capturing system of the present invention further may include a second positioning element denoted by Positioning Element 2. The second positioning element is disposed in the holder of the first positioning element, and comprises a positioning part and a connecting part. The positioning part is in a hollow shape and has a third through hole and a fourth through hole, which are formed on the two opposite ends of the optical axis. The third through hole is connected with the positioning part, and the fourth through hole is connected with the basement and has a predetermined thickness. The positioning part directly contacts with any one of the lenses in the embodiment of the present invention and generates the positioning effect of accommodating the lens and arranging the lens on the optical axis. The connecting part is disposed outside the positioning part and can directly combine with the cylinder so that the second positioning element is disposed in the holder of the first positioning element, and the optical image capturing system has function of adjusting and positioning the focal length in optical axis direction. The maximum outer diameter of the plane of the connection part perpendicular to the optical axis is denoted by PhiC. The maximum diameter of the inner hole of the fourth through hole is denoted by Phi4. The foregoing connecting part 724 may possess the thread and make the second positioning element 720 be engaged with the holder 714 of the first positioning element 710.

Any of lenses of the embodiment of the present invention can be directly disposed in the cylinder of the first positioning element, and be closer to the first through hole than the photosensitive element, and face the photosensitive element. Otherwise, any of lenses of the embodiment of the present invention can be selectively disposed indirectly in the first positioning element by means of the second positioning element, and is closer to the third through hole than the photosensitive element, and face photosensitive element.

The term and the definition to the lens parameter in the embodiment of the present invention are shown as below for further reference.

The Lens Parameters Related to the Length or the Height

The maximum height for image formation of the optical image capturing system is denoted by HOI. The height of the optical image capturing system is denoted by HOS. The distance from the object side of the first lens to the image side of the fourth lens is denoted by InTL. The distance from the image side of the fourth lens to the image plane is denoted by InB and InTL+InB=HOS. The distance from an aperture to an image plane is denoted by InS. The distance from the first lens to the second lens is denoted by In12 (instance). The central thickness of the first lens of the optical image capturing system on the optical axis is denoted by TP1 (instance).

The Lens Parameters Related to the Material

The coefficient of dispersion of the first lens in the optical image capturing system is denoted by NA1 (instance). The refractive index of the first lens is denoted by Nd1 (instance).

The Lens Parameters Related to the Angle of View

The angle of view is denoted by AF. Half of the angle of view is denoted by HAF. The major light angle is denoted by MRA.

The Lens Parameter Related to the Exit/Entrance Pupil

The entrance pupil diameter of the optical image capturing system is denoted by HEP. The exit pupil of the optical image capturing system means that the ray at the aperture passes through the lens set which is on the rear side of the aperture and forms an image on the first image plane. The exit pupil diameter of the optical image capturing system is denoted by HXP. For any surface of any lenses, the maximum effective half diameter (EHD) is a perpendicular distance between an optical axis and an intersection point on the surface where the incident light with a maximum angle of view of the system passing the margin of the entrance pupil. For example, the maximum effective half diameter of the object side of the first lens is denoted by EHD11. The maximum effective half diameter of the image side of the first lens is denoted by EHD12. The maximum effective half diameter of the object side of the second lens is denoted by EHD21. The maximum effective half diameter of the image side of the second lens is denoted by EHD22. The maximum effective half diameter position of any surfaces of the remaining lenses of the optical image capturing system can be referred as mentioned above. The maximum effective diameter of the image side which is the nearest to the image plane of the optical image capturing system is denoted by PhiA, and the relationship is satisfied: PhiA=double EHD. If the surface is aspheric, the cut-off point of the maximum effective diameter namely includes the cut-off point of the aspherical surface. An ineffective half diameter (IHD) position of any surface of single lens refers to the surficial section of the cut-off point (if it is an aspheric surface, a point end of the aspheric coefficient is on the surface) of the maximum effective diameter extending to the same surface in the direction of faring away from the optical axis. The maximum diameter of the image side of the lens which is the nearest to the image plane of the optical image capturing system is denoted by PhiB, and the relationship is satisfied: PhiB=a double (a maximum EHD+a maximum IHD)=PhiA+a double (a maximum IHD).

In the optical image capturing system of the present invention, the maximum effective diameter of the image side on the lens that is the closest to the image plane (i.e. image space) is the optical exit pupil. The maximum effective diameter is denoted by PhiA. For instance, when the optical exit pupil is on the image side of the third lens, the maximum effective diameter is denoted by PhiA3. When the optical exit pupil is on the image side of the fourth lens, the maximum effective diameter is denoted by PhiA4. If the optical image capturing system has different number of lenses with refractive power, the maximum effective diameter (optical exit pupil) can be referred as mentioned above. The pupil magnification ratio of the optical image capturing system is denoted by PMR, and the following condition is satisfied: PMR=PhiA/HEP.

The Lens Parameters Related to an Arc Length of the Lens Shape and an Outline of Surface The length of the maximum effective half diameter outline curve at any surface of a single lens refers to an arc length of a curve, which starts from a starting point which is an intersection point on the surface of the lens crossing the optical axis of the optical image capturing system, travels along the outline of the surface and ends at the final point which is the maximum effective half diameter position of the surface, and this arc length is denoted by ARS. For example, the length of the outline curve of the maximum effective half diameter position of the object side of the first lens is denoted by ARS11. The length of the outline curve of the maximum effective half diameter position of the image side of the first lens is denoted by ARS12. The length of the outline curve of the maximum effective half diameter position of the object side of the second lens is denoted by ARS21. The length of the outline curve of the maximum effective half diameter position of the image side of the second lens is denoted by ARS22. The lengths of the outline curves of the maximum effective half diameter position of any surface of the other lenses in the optical image capturing system are denoted in a similar way.

The length of ½ entrance pupil diameter (HEP) outline curve of any surface of a single lens refers to an arc length of curve, which starts from a starting point which is an intersection point on the surface of the lens crossing the optical axis, travels along the outline of the surface of the lens and ends at a coordinate point on the surface where the vertical height from the optical axis to the surface is equivalent to ½ entrance pupil diameter; and the arc length is denoted by ARE. For example, the length of the ½ entrance pupil diameter (HEP) outline curve of the object side of the first lens is denoted by ARE11. The length of the ½ entrance pupil diameter (HEP) outline curve of the image side of the first lens is denoted by ARE12. The length of the ½ entrance pupil diameter (HEP) outline curve of the object side of the second lens is denoted by ARE21. The length of the ½ entrance pupil diameter (HEP) outline curve of the image side of the second lens is denoted by ARE22. The lengths of the ½ entrance pupil diameter (HEP) outline curve of any surfaces of the other lens in the optical image capturing system are expressed in the similar way.

The Lens Parameters Related to the Surface Depth of the Lens

The horizontal distance parallel to the optical axis, which is measured from the intersection point where the object side of the fourth lens crosses the optical axis to the terminal point of the maximum effective half diameter on the object side of the fourth lens, is denoted by InRS41 (instance). The horizontal distance parallel to the optical axis, which is measured from the intersection point where the image side of the fourth lens crosses the optical axis to the terminal point of the maximum effective half diameter on the image side of the fourth lens, is denoted by InRS42 (instance).

The Lens Parameter Related to the Shape of the Lens

The critical point C is a point, which is tangential to the tangential plane and perpendicular to the optical axis on the specific surface of the lens except that an intersection point which crosses the optical axis on the specific surface of the lens. In addition to the description above, the perpendicular distance between the critical point C31 on the object side of the third lens and the optical axis is denoted by HVT31 (instance). The perpendicular distance between a critical point C32 on the image side of the third lens and the optical axis is denoted by HVT32 (instance). The perpendicular distance between the critical point C41 on the object side of the fourth lens and the optical axis is denoted by HVT41 (example). The perpendicular distance between a critical point C42 on the image side of the fourth lens and the optical axis is denoted by HVT42 (instance). The perpendicular distances between the critical point on the object side or the image side of other lenses and the optical axis are denoted in a similar way.

The object side of the fourth lens has one inflection point IF411 which is the first nearest to the optical axis, and the sinkage value of the inflection point IF411 is denoted by SGI411 (instance). The horizontal distance parallel to the optical axis from an inflection point on the object side of the fourth lens that is the first nearest to the optical axis to the intersection point where the object side of the fourth lens crosses the optical axis is denoted by SGI411. The distance perpendicular to the optical axis between the inflection point IF411 and the optical axis is HIF411 (instance). The image side of the fourth lens has one inflection point IF421 which is the first nearest to the optical axis, and the sinkage value of the inflection point IF421 is denoted by SGI421 (instance). The horizontal distance parallel to the optical axis from an inflection point on the image side of the fourth lens that is the first nearest to the optical axis to the intersection point where the image side of the fourth lens crosses the optical axis is denoted by SGI421. The distance perpendicular to the optical axis between the inflection point IF421 and the optical axis is HIF421 (instance).

The object side of the fourth lens has one inflection point IF412 which is the second nearest to the optical axis, and the sinkage value of the inflection point IF412 is denoted by SGI412 (instance). The horizontal distance parallel to the optical axis from an inflection point on the object side of the fourth lens that is the second nearest to the optical axis to the intersection point where the object side of the fourth lens crosses the optical axis is denoted by SGI412. The distance perpendicular to the optical axis between the inflection point IF412 and the optical axis is denoted by HIF412 (instance). The image side of the fourth lens has one inflection point IF422 which is the second nearest to the optical axis, and the sinkage value of the inflection point IF422 is denoted by SGI422 (instance). The horizontal distance parallel to the optical axis from an inflection point on the image side of the fourth lens that is the second nearest to the optical axis to the intersection point where the image side of the fourth lens crosses the optical axis is denoted by SGI422. The distance perpendicular to the optical axis between the inflection point IF422 and the optical axis is HIF422 (instance).

The object side of the fourth lens has one inflection point IF413 which is the third nearest to the optical axis, and the sinkage value of the inflection point IF413 is denoted by SGI413 (instance). The horizontal distance parallel to the optical axis from an inflection point on the object side of the fourth lens that is the third nearest to the optical axis to the intersection point where the object side of the fourth lens crosses the optical axis is denoted by SGI413. The distance perpendicular to the optical axis between the inflection point IF413 and the optical axis is HIF413 (instance). The image side of the fourth lens has one inflection point IF423 which is the third nearest to the optical axis, and the sinkage value of the inflection point IF423 is denoted by SGI423 (instance). The horizontal distance parallel to the optical axis from an inflection point on the image side of the fourth lens that is the third nearest to the optical axis to the intersection point where the image side of the fourth lens crosses the optical axis is denoted by SGI423. The distance perpendicular to the optical axis between the inflection point IF423 and the optical axis is HIF423 (instance).

The object side of the fourth lens has one inflection point IF414 which is the fourth nearest to the optical axis, and the sinkage value of the inflection point IF414 is denoted by SGI414 (instance). The horizontal distance parallel to the optical axis from an inflection point on the object side of the fourth lens that is the fourth nearest to the optical axis to the intersection point where the object side of the fourth lens crosses the optical axis is denoted by SGI414. The distance perpendicular to the optical axis between the inflection point IF414 and the optical axis is HIF414 (instance). The image side of the fourth lens has one inflection point IF424 which is the fourth nearest to the optical axis, and the sinkage value of the inflection point IF424 is denoted by SGI424 (instance). The horizontal distance parallel to the optical axis from an inflection point on the image side of the fourth lens that is the fourth nearest to the optical axis to the intersection point where the image side of the fourth lens crosses the optical axis is denoted by SGI424. The distance perpendicular to the optical axis between the inflection point IF424 and the optical axis is HIF424 (instance).

The inflection point, the distance perpendicular to the optical axis between the inflection point and the optical axis, and the sinkage value thereof on the object side or image side of other lenses are denoted in a similar way as described above.

The Lens Parameters Related to an Aberration

Optical distortion for image formation in the optical image capturing system is denoted by ODT. TV distortion for image formation in the optical image capturing system is denoted by TDT. Further, the range of the aberration offset for the view of image formation may be limited to 50%-100% field. The offset of the spherical aberration is denoted by DFS. The offset of the coma aberration is denoted by DFC.

The transverse aberration of the margin of the aperture is denoted by STA and evaluates the performance of the specific optical image capturing system. The transverse aberration at any field of view may be calculated by utilizing the tangential fan and the sagittal fan. Specifically, the transverse aberration at the longest operation wavelength (for instance, the wavelength is 650 nm) and the shortest operation wavelength (for instance, the wavelength is 470 nm) respectively passing through the margin of the aperture is calculated to act as the standard of the performance. The aforementioned coordinate direction of the tangential fan can be further divided into the positive direction (the upper ray) and the negative direction (the lower ray). The transverse aberration at the longest operation wavelength passing through the margin of the aperture defines the difference between the image position at the specific field of view where the longest operation wavelength passes through the margin of the aperture and strikes on the image plane and the image position at the specific field of view where the chief ray of the reference wavelength (for instance, the wavelength is 555 nm) strikes on the image plane. The transverse aberration at the shortest operation wavelength passing through the margin of the aperture defines the difference between the image position at the specific field of view where the shortest operation wavelength passes through the margin of the aperture and strikes on the image plane and the image position at the specific field of view where the chief ray of the reference wavelength (for instance, the wavelength is 555 nm) strikes on the image plane. To evaluate the performance of the specific optical image capturing system, we can utilize that the transverse aberration at the 0.7 field of view (i.e., the 0.7 height of an image HOI) where the longest operation wavelength passes through the margin of the aperture and strikes on the image plane and the transverse aberration at the 0.7 field of view (i.e., the 0.7 height of an image HOI) where the shortest operation wavelength passes through the margin of the aperture and strikes on the image plane (i.e., the 0.7 height of an image HOI) both are less than 50 μm as a way of the examination. Even further, the way of the examination can be that the transverse aberration at the 0.7 field of view where the longest operation wavelength passes through the margin of the aperture and strikes on the image plane and the transverse aberration at the 0.7 field of view where the shortest operation wavelength passes through the margin of the aperture and strikes on the image plane are both less than 30 μm.

The maximum height for image formation perpendicular to the optical axis on the image plane is denoted by HOI. The transverse aberration of the visible light with the longest operation wavelength from the positive tangential fan, which passes through a margin of the entrance pupil and strikes at the position of 0.7 HOI on the image plane, is denoted by PLTA. The transverse aberration of the visible light with the shortest operation wavelength from the positive tangential fan, which passes through the margin of the entrance pupil and strikes at the position of 0.7 HOI on the image plane, is denoted by PSTA. The transverse aberration of the visible light with the longest operation wavelength from negative tangential fan, which passes through the margin of the entrance pupil and strikes at the position of 0.7 HOI on the image plane, is denoted by NLTA The transverse aberration of the visible light with the shortest operation wavelength from a negative tangential fan, which passes through the margin of the entrance pupil and strikes at the position of 0.7 HOI on the image plane, is denoted by NSTA. The transverse aberration of the visible light with the longest operation wavelength from a sagittal fan, which passes through the margin of the entrance pupil and strikes at the position of 0.7 HOI on the image plane, is denoted by SLTA. The transverse aberration of the visible light with the shortest operation wavelength from the sagittal fan, which passes through the margin of the entrance pupil and strikes at the position of 0.7 HOI on the image plane, is denoted by SSTA.

The present invention provides an optical image capturing system, and a fourth lens of optical image capturing system is provided with an inflection point on the object side or on the image side to adjust the incident angle of each view field and modify the optical distortion and the TV distortion. In addition, the surfaces of the fourth lens are capable of modifying the optical path to improve the imaging quality.

The present invention provides an optical image capturing system, in order along an optical axis from an object side to an image side, includes a first lens, a second lens, a third lens, a fourth lens, and an image plane. The first lens has refractive power. The object side and an image side of the fourth lens are both aspheric. f1, f2, f3 and f4 are focal lengths of the first lens to the fourth lens. f is the focal length of the optical image capturing system. HEP is the entrance pupil diameter of the optical image capturing system. A distance HOS is the distance from object side of the first lens to the image plane. A distance InTL is the distance on the optical axis from object side of the first lens to image side of the fourth lens. PhiA4 is the maximum effective diameter of the image side of the fourth lens. The length of the outline curve of a half of an pupil diameter (HEP) of any surface of a signal lens refers to the length of the outline curve of the half of the entrance pupil diameter (HEP) from an axial point on the surface of the lens to a coordinate point of perpendicular height with a distance of the half of the entrance pupil diameter from the optical axis on the surface along the outline of the surface of the lens and is denoted by ARE. The following conditions are satisfied: $1.2 \leq f/HEP \leq 10$; $0.5 \leq HOS/f \leq 20$; $0 < PhiA4/InTL \leq 1.3$; and $0.1 \leq 2(ARE/HEP) \leq 2.0$.

The present invention provides an optical image capturing system, in order along an optical axis from an object side to an image side, includes a first lens, a second lens, a third lens, a fourth lens, an image plane and a first positioning element. The first positioning element comprises a holder. The holder is in a hollow shape and opaque. The holder comprises a cylinder and a basement connected with each other. The cylinder is configured to accommodate the first lens to the fourth lens. The basement is between the fourth lens and the image plane. An outer periphery of the basement is greater than an outer periphery of the cylinder, the maximum value of the minimum side length of the basement perpendicular to the optical axis denoted by PhiD. The first lens has refractive power. The object side of the first lens adjacent to the optical axis is convex. The second lens has refractive power. The third lens has refractive power. The fourth lens has refractive power. At least one lens among the first lens to the fourth lenses has positive refractive power. f1, f2, f3 and f4 are focal lengths of the first lens to the fourth lens. f is the focal length of the optical image capturing system. HEP is the entrance pupil diameter of the optical image capturing system. HOS is the distance from object side of the first lens to the image plane. InTL is the distance on the optical axis from object side of the first lens to image side of the fourth lens. The length of the outline curve of a half of an pupil diameter (HEP) of any surface of a signal lens refers to a length of the outline curve of the half of the entrance pupil diameter (HEP) from an axial point on the surface of the lens to a coordinate point of perpendicular height with the distance of the half of the entrance pupil diameter from the optical axis on the surface along the outline of the surface of the lens and is denoted by ARE, and the following conditions are satisfied: $1.2 \leq f/HEP \leq 10$; $0.5 \leq HOS/f \leq 20$; $0 \text{ mm} < PhiD \leq 2.9 \text{ mm}$; and $0.1 \leq 2(ARE/HEP) \leq 2.0$.

The present invention provides an optical image capturing system, in order along an optical axis from the object side to the image side, comprise a first lens, a second lens, a third lens, a fourth lens, an image plane, a first positioning element and a second positioning element. The first positioning element comprises a holder. The holder is in a hollow shape and opaque. The holder comprises a cylinder and a basement connected with each other. The cylinder is configured to accommodate the first lens to the fourth lens. The basement is between the fourth lens and the image plane. An outer periphery of the basement is greater than the outer periphery of the cylinder. The maximum value of the minimum side length of the basement perpendicular to the optical axis is denoted by PhiD. The second positioning element is disposed in the holder, and comprises a positioning part and a connecting part. The positioning part is in a hollow shape and directly contacts and accommodates any of the four lenses, to arrange the four lenses on the optical axis. The connecting part is disposed outside the positioning part and directly contacts an inner periphery of the cylinder. The maximum outer diameter of the plane of the connection part perpendicular to the optical axis is denoted by PhiC. The first lens has refractive power. The object side of the first lens adjacent to the optical axis is convex. The second lens has refractive power. The third lens has refractive power. The fourth lens has refractive power. At least one lens among the first lens to the fourth lens has positive refractive power. Focal lengths of the first lens to the fourth lens are denoted by f1, f2, f3 and f4. The focal length of the optical image capturing system is denoted by f. The entrance pupil diameter of the optical image capturing system is denoted by HEP. The distance from the object side of the first lens to the image plane is denoted by HOS. The distance on the optical axis from the object side of the first lens to the image side of the fourth lens is denoted by InTL. The maximum effective diameter of the image side of the fourth lens is denoted by PhiA4. The length of ½ entrance pupil diameter (HEP) outline curve of any surface of a single lens refers to an arc length of curve, which starts from a starting point which is an intersection point on the surface of the lens crossing the optical axis of the optical image capturing system, travels along the outline of the surface of the lens and ends at a coordinate point on the surface where the vertical height from the optical axis to the surface is equivalent to ½ entrance pupil diameter; and the arc length may be denoted by ARE. The following conditions are satisfied: $1.2 \leq f/HEP \leq 10$; $0.5 \leq HOS/f \leq 20$; $PhiC < PhiD$; $0\ mm < PhiD \leq 2.9\ mm$; and $0.1 \leq 2(ARE/HEP) \leq 2.0$.

The length of outline curve of any surface of a single lens in the range of the maximum effective half diameter influences the ability of the surface aberration correction and the optical path difference at each field of view. The length of outline curve is longer than the ability of the surface aberration correction can be elevated, but this increases difficulty in the production. Therefore, the length of the outline curve of any surface of a single lens must be controlled in the range of the maximum effective half diameter. Specifically, the ratio (ARS/TP) of the length of outline curve of the surface in the range of the maximum effective half diameter (ARS) to the thickness of the lens to which surface belongs on the optical axis (TP) must be controlled. For example, the length of the outline curve of the maximum effective half diameter position of the object side of the first lens is denoted by ARS11. The thickness of the first lens on the optical axis is denoted by TP1. The ratio between both of them is denoted by ARS 11/TP 1. The length of the outline curve of the maximum effective half diameter position of the image side of the first lens is denoted by ARS12. The ratio between ARS12 and TP1 is denoted by ARS12/TP1. The length of the outline curve of the maximum effective half diameter position of the object side of the second lens is denoted by ARS21. The thickness of the second lens on the optical axis is denoted by TP2. The ratio between ARS21 and TP2 is denoted by ARS21/TP2. The length of the outline curve of the maximum effective half diameter position of the image side of the second lens is denoted by ARS22. The ratio between ARS22 and TP2 is denoted by ARS22/TP2. The ratio of the lengths of the outline curve of the maximum effective half diameter positions of any of the surfaces of the other lenses to the thicknesses of the lens to which surface belongs on the optical axis (TP) in the optical image capturing system are denoted in a similar way.

The length of outline curve of any surface of a single lens in the range of the height which is half entrance pupil diameter (HEP) especially influences the ability of the surface aberration correction at the common area of each field of view of ray and the optical path difference at each field of view. The length of outline curve is longer than the ability of the surface aberration correction can be elevated, but this increases difficulty in the production. Therefore, the length of outline curve from any of the surfaces of a single lens must be controlled in the range of the height, which is the half entrance pupil diameter (HEP). Specifically, the ratio (ARE/TP) of the length of outline curve of the surface (ARE) is in the range of the height which is the half entrance pupil diameter (HEP) to the thickness of the lens to which surface belongs on the optical axis (TP) must be controlled. For example, the length of the outline curve of the height which is the half entrance pupil diameter (HEP) of the object side of the first lens is denoted by ARE11. The thickness of the first lens on the optical axis is denoted by TP1. The ratio between ARE11 and TP1 is denoted by ARE11/TP1. The length of the outline curve of the height which is the half entrance pupil diameter (HEP) of the image side of the first lens is denoted by ARE12. The ratio between ARE12 and TP1 is denoted by ARE12/TP1. The length of the outline curve of the height which is the half entrance pupil diameter (HEP) of the object side of the second lens is denoted by ARE21. The thickness of the second lens on the optical axis is denoted by TP2. The ratio between ARE21 and TP2 is denoted by ARE21/TP2. The length of the outline curve of the height which is the half entrance pupil diameter (HEP) of the image side of the second lens is denoted by ARE22. The thickness of the second lens on the optical axis is denoted by TP2. The ratio between ARE22 and TP2 is denoted by ARE22/TP2. The ratio of the length of the outline curve of the height which is the half entrance pupil diameter (HEP) of the surface of the other lens to the thickness of the lens to which surface belongs on the optical axis in the optical image capturing system are expressed in the similar way.

The optical image capturing system described above may be used to collocate with the image-sensing device whose diagonal length is shorter than 1/1.2 inches to form an image. Preferably, the size of the image-sensing device is 1/2.3 inches. The pixel size of the image-sensing device is smaller than 1.4 micrometers (μm). Preferably, the pixel size of the image-sensing device is smaller than 1.12 micrometers (μm). The best pixel size of the image-sensing device is smaller than 0.9 micrometers (μm). Furthermore, the optical image capturing system is applicable to the image-sensing device with an aspect ratio of 16:9.

The optical image capturing system described above is applicable to the demand of video recording with more than millions or tens of millions of pixels (e.g. 4K and 2K videos or the so-called UHD and QHD) and is endowed with a good image quality.

The height of optical image capturing system (HOS) may be reduced to achieve the minimization of the optical image capturing system when the absolute value of f1 is larger than f4 ($|f1|>f4$).

When $|f2|+|f3|>|f1|+|f4|$, at least one lens among the second lens to the third lens may have a weak positive refractive power or a weak negative refractive power. The weak refractive power indicates that an absolute value of the focal length of a specific lens is greater than 10. When at least one lens among the second lens to the third lens has the weak positive refractive power, the positive refractive power of the first lens can be shared, such that the unnecessary aberration will not appear too early. On the contrary, when at least one lens among the second lens to the third lens has the weak negative refractive power, the aberration of the optical image capturing system can be corrected and fine-tuned.

The fourth lens may have positive refractive power. Moreover, at least one surface of the fourth lens may possess at least one inflection point which is capable of effectively reducing the incident angle of the off-axis rays and may further correct the off-axis aberration.

BRIEF DESCRIPTION OF THE DRAWINGS

The structure, operating principle and effects of the present invention will be described in detail by way of various embodiments illustrated in the accompanying drawings.

FIG. 2C is a transverse aberration diagram of the longest operation wavelength and the shortest operation wavelength for tangential fan and sagittal fan, in which the longest operation wavelength and the shortest operation wavelength pass through an margin of the entrance pupil and strike at the position of 0.7 field of view on the image plane, according to the second embodiment of the present invention.

FIG. 3C is a transverse aberration diagram of the longest operation wavelength and the shortest operation wavelength for tangential fan and sagittal fan, in which the longest operation wavelength and the shortest operation wavelength pass through an margin of the entrance pupil and strike at the position of 0.7 field of view on the image plane, according to the third embodiment of the present invention.

FIG. 4C is a transverse aberration diagram of the longest operation wavelength and the shortest operation wavelength for tangential fan and sagittal fan, in which the longest operation wavelength and the shortest operation wavelength pass through an margin of the entrance pupil and strike at the position of 0.7 field of view on the image plane, according to the fourth embodiment of the present invention.

FIG. 5A is a schematic view of an optical image capturing system of a fifth embodiment of the present invention.

DETAILED DESCRIPTION OF THE PREFERRED EMBODIMENTS

Figure 1A:
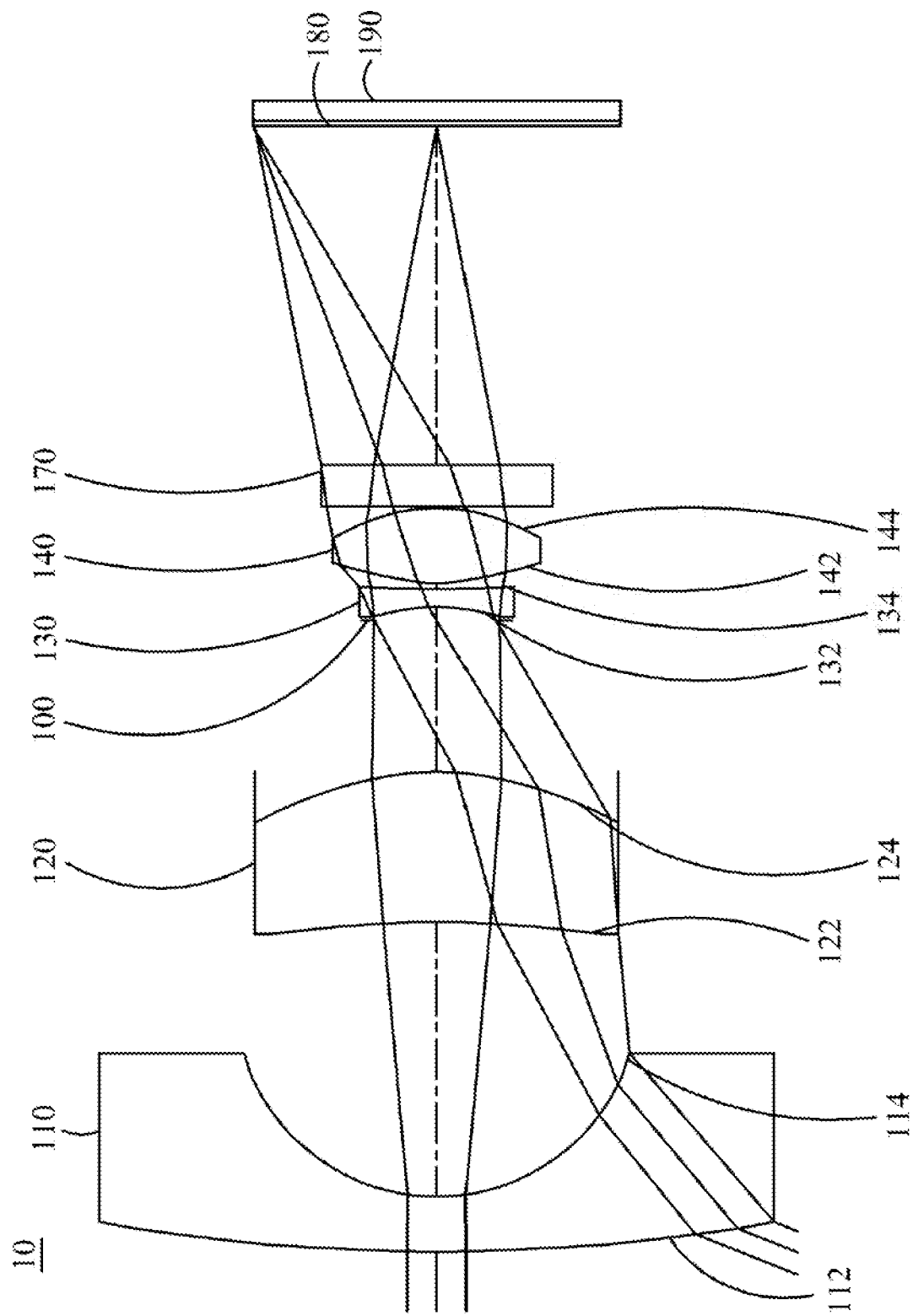
FIG. 1A is a schematic view of an optical image capturing system of the first embodiment of the present invention.

An optical image capturing system is provided, which includes, in order from an object side to an image side, a first lens, a second lens, a third lens, a fourth lens with refractive power and an image plane. The optical image capturing system may further include an image-sensing device, which is disposed on the image plane.

The optical image capturing system may use three sets of operation wavelengths, which are 486.1 nm, 587.5 nm and 656.2 nm, respectively, and 587.5 nm serves as the primary reference wavelength and a reference wavelength to obtain technical features of the optical system. The optical image capturing system may also use five sets of wavelengths, which are 470 nm, 510 nm, 555 nm, 610 nm and 650 nm, respectively, and 555 nm serves as the primary reference wavelength and a reference wavelength to obtain technical features of the optical system.

The ratio of the focal length f of the optical image capturing system to a focal length fp of each lens with positive refractive power is PPR. The ratio of the focal length f of the optical image capturing system to a focal length fn of each lens with negative refractive power is NPR. The sum of the PPR of all lenses with positive refractive power is ΣPPR. The sum of the NPR of all lenses with negative refractive power is ΣNPR. The total refractive power and the total length of the optical image capturing system can be controlled easily when the following condition is satisfied: 0.5≤ΣPPR/|ΣNPR|≤4.5; preferably, the following condition is satisfied: 0.9≤ΣPPR/|ΣNPR|≤3.5.

The height of the optical image capturing system is denoted by HOS. When the value of HOS/f is approximately one, the configuration is beneficial for manufacturing the minimized optical image capturing system with high pixel for image formation.

The sum of the fp of all lenses with positive refractive power of the optical image capturing system is ΣPP. The sum of the fp of all lenses with negative refractive power of the optical image capturing system is ΣNP. In one embodiment of the optical image capturing system, the following condition is satisfied: 0<ΣPP≤200 and f4/ΣPP≤0.85; preferably, the following condition is satisfied: 0<ΣPP≤150 and 0.01≤f4/ΣPP≤0.7. Hereby, it is favorable to control the ability of focusing for the optical image capturing system and to distribute appropriately the positive refractive power of the optical image capturing system such that an observable aberration is suppressed to occur too early.

The optical image capturing system may further include an image-sensing device, which is disposed on the image plane. A half diagonal of the effective detection field of the image-sensing device (image formation height or the maximum image height of the optical image capturing system) is denoted by HOI. The distance on the optical axis from the object side of the first lens to the image plane is denoted by HOS. The following conditions are satisfied: HOS/HOI≤15 and 0.5≤HOS/f≤20.0. Preferably, the following conditions may be satisfied: 1≤HOS/HOI≤10 and 1≤HOS/f≤15. Hereby, this configuration can keep the miniaturization of the optical image capturing system to collocate with light and thin portable electronic product.

In addition, in the optical image capturing system of the present invention, according to different requirements, at least one aperture may be arranged to reduce stray light and help elevate the image quality.

In the optical image capturing system of the invention, the aperture may be a front or middle aperture. Wherein, the front aperture is the aperture between a photographed object and the first lens while the middle aperture is the aperture between the first lens and the image plane. In the case that the aperture is the front aperture, it can make the optical image capturing system generate a longer distance between the exit pupil and the image plane, such that the optical image capturing system can accommodate more optical elements and the efficiency of the image-sensing device in receiving image can be increased. In the case that the aperture is the middle aperture, it can expand the angle of view of the optical image capturing system, such that the optical image capturing system has the advantage of the camera lens with wide angle. The distance from the foregoing aperture to the image plane is denoted by InS. The following condition is satisfied: 0.2≤InS/HOS≤1.1. Preferably, the following conditions may be satisfied: 0.4≤InS/HOS≤1. Therefore, the optical image capturing system can be kept miniaturized and have a feature of wide angle of view.

In the optical image capturing system of the present invention, the distance from the object side of the first lens to the image side of the fourth lens is denoted by InTL. The sum of thicknesses of all lenses with refractive power on the optical axis is denoted by ΣTP. The following condition is satisfied: 0.2≤ΣTP/InTL≤0.95. Preferably, the following condition may be satisfied: 0.2≤ΣTP/InTL≤0.9. Hereby, this configuration can keep the contrast ratio of the optical image capturing system and the yield rate about manufacturing lens at the same time, and provide the proper back focal length to accommodate other elements.

The curvature radius of the object side of the first lens is R1. The curvature radius of the image side of the first lens is R2. The following condition is satisfied: 0.01≤|R1/R2|≤100. Preferably, the following condition is satisfied: 0.01≤|R1/R2|≤60.

The curvature radius of the object side of the fourth lens is R9. The curvature radius of the image side of the fourth lens is R10. The following condition is satisfied: −200<(R7−R8)/(R7+R8)<30. Hereby, this configuration is beneficial for correcting the astigmatism generated by the optical image capturing system.

The distance between the first lens and the second lens on the optical axis is IN12, and the following condition is satisfied: 0<IN12/f≤5.0. Preferably, the following condition is satisfied: 0.01≤IN12/f≤4.0. Thereby, this configuration is helpful to improve the chromatic aberration of the lens in order to elevate the performance of the optical image capturing system.

The distance between the second lens and the third lens on the optical axis is IN23, and the following condition is satisfied: 0<IN23/f≤5.0. Preferably, the following condition is satisfied: 0.01≤IN23/f≤3.0. Thereby, this configuration is helpful to improve the performance of the optical image capturing system.

The distance between the third lens and the fourth lens on the optical axis is IN34, and the following condition is satisfied: 0<IN34/f≤5.0. Preferably, the following condition is satisfied: 0.001≤IN34/f≤3.0. Thereby, this configuration is helpful to improve the performance of the optical image capturing system.

The central thicknesses of the first lens and the second lens on the optical axis are respectively TP1 and TP2, and the following condition is satisfied: 1<(TP1+IN12)/TP2≤20. With this configuration, the sensitivity of the optical image capturing system can be controlled, and its performance can be improved.

Central thicknesses of the third lens and the fourth lens on the optical axis are respectively TP3 and TP4. The distance between the third lens and the fourth lens on the optical axis is IN34. The following condition is satisfied: 0.2≤(TP4+IN34)/TP4≤20. With this configuration, the sensitivity of the optical image capturing system can be controlled and the total height of the optical image capturing system can be reduced.

The distance between the second lens and the third lens on the optical axis is IN23. The sum of central thicknesses of the first lens through the fourth lens on the optical axis is ΣTP. The following condition is satisfied: 0.01≤IN23/(TP2+IN23+TP3)≤0.9. Preferably, the following condition is satisfied: 0.05≤IN23/(TP2+IN23+TP3)≤0.7. Therefore, this configuration is helpful to slightly correct the aberration of the propagating process of the incident light layer by layer, and decrease the total height of the optical image capturing system.

In the optical image capturing system of the present invention, the horizontal distance parallel to the optical axis, which is measured from the intersection point where the object side of the fourth lens crosses the optical axis to the terminal point of the maximum effective half diameter on the object side of the fourth lens, is denoted by InRS41 (When the horizontal distance is toward the image side, InRS41 is a positive value. When the horizontal distance is toward the object side, InRS41 is a negative value). The horizontal distance parallel to the optical axis, which is measured from the intersection point where the image side of the fourth lens crosses the optical axis to the terminal point of the maximum effective half diameter on the image side of the fourth lens, is denoted by InRS42. The central thickness of the fourth lens 140 is TP4, and the following conditions are satisfied: −1 mm≤InRS41≤1 mm, −1 mm≤InRS42≤1 mm, 1 mm≤|InRS41|+|InRS42|≤2 mm, 0.01≤|InRS41|/TP4≤10, 0.01≤|InRS42|/TP4≤10. Hereby, the control of the position of the maximum effective half diameter between the object side and the image side of the fourth lens is favorable to correction of aberration for peripheral field of view of the optical image capturing system and effective maintenance of miniaturization of the optical image capturing system.

In the optical image capturing system of the present invention, the horizontal distance parallel to the optical axis from an inflection point on the object side of the fourth lens that is the first nearest to the optical axis to an intersection point where the object side of the fourth lens crosses the optical axis is denoted by SGI411. The horizontal distance in parallel with the optical axis from an inflection point on the image side of the fourth lens that is the first nearest to the optical axis to an intersection point where the image side of the fourth lens crosses the optical axis is denoted by SGI421. The following conditions are satisfied: 0<SGI411/(SGI411+TP4)≤0.9 and 0<SGI421/(SGI421+TP4)≤0.9. Preferably, the following conditions are satisfied: 0.01≤SGI411/(SGI411+TP4)≤0.7 and 0.01<SGI421/(SGI421+TP4)≤0.7.

In the optical image capturing system of the present invention, the horizontal distance parallel to the optical axis from an inflection point on the object side of the fourth lens that is second nearest to the optical axis to an intersection point where the object side of the fourth lens crosses the optical axis is denoted by SGI412. The horizontal distance in parallel with the optical axis from an inflection point on the image side of the fourth lens that is second nearest to the optical axis to an intersection point where the image side of the fourth lens crosses the optical axis is denoted by SGI422. The following conditions are satisfied: 0<SGI412/(SGI412+TP4)≤0.9 and 0<SGI422/(SGI422+TP4)≤0.9. Preferably, the following conditions are satisfied: 0.1≤SGI412/(SGI412+TP4)≤0.8 and 0.1≤SGI422/(SGI422+TP4)≤0.8.

The perpendicular distance between the inflection point on the object side of the fourth lens that is the first nearest to the optical axis and the optical axis is denoted by HIF411. The perpendicular distance between an intersection point where the image side of the fourth lens crosses the optical axis and an inflection point on the image side of the fourth lens that is the first nearest to the optical axis is denoted by HIF421. The following conditions are satisfied: 0.01≤HIF411/HOI≤0.9, and 0.01≤HIF421/HOI≤0.9. Preferably, the following conditions are satisfied: 0.09≤HIF411/HOI≤0.5 and 0.09≤HIF421/HOI≤0.5.

The perpendicular distance between the inflection point on the object side of the fourth lens that is the second nearest to the optical axis and the optical axis is denoted by HIF412. The perpendicular distance between an intersection point where the image side of the fourth lens crosses the optical axis and an inflection point on the image side of the fourth lens that is the second nearest to the optical axis is denoted by HIF422. The following conditions are satisfied: 0.01≤HIF412/HOI≤0.9, and 0.01≤HIF422/HOI≤0.9. Preferably, the following conditions are satisfied: 0.09≤HIF412/HOI≤0.8 and 0.09≤HIF422/HOI≤0.8.

The perpendicular distance between the inflection point on the object side of the fourth lens that is the third nearest to the optical axis and the optical axis is denoted by HIF413. The perpendicular distance between an intersection point where the image side of the fourth lens crosses the optical axis and an inflection point on the image side of the fourth lens that is the third nearest to the optical axis is denoted by HIF423. The following conditions are satisfied: 0.001 mm≤|HIF413|≤5 mm, and 0.001 mm≤|HIF423|≤5 mm. Preferably, the following conditions are satisfied: 0.1 mm≤|HIF423|≤3.5 mm and 0.1 mm≤|HIF413|≤3.5 mm.

The perpendicular distance between the inflection point on the object side of the fourth lens that is the fourth nearest to the optical axis and the optical axis is denoted by HIF414. The perpendicular distance between an intersection point where the image side of the fourth lens crosses the optical axis and an inflection point on the image side of the fourth lens that is the fourth nearest to the optical axis is denoted by HIF424. The following conditions are satisfied: 0.001 mm≤|HIF414|≤5 mm, and 0.001 mm≤|HIF424|≤5 mm. Preferably, the following conditions are satisfied: 0.1 mm≤|HIF424|≤3.5 mm and 0.1 mm≤|HIF414|≤3.5 mm.

In one embodiment of the optical image capturing system of the present invention, the chromatic aberration of the optical image capturing system can be corrected by alternatively arranging the lenses with large coefficient of dispersion and small coefficient of dispersion, and the chromatic aberration of the optical image capturing system can be corrected.

The equation for the aforementioned aspheric surface is:

$$z=ch^2/[1+[1-(k+1)c^2h^2]^{0.5}]+A4h^4+A6h^6+A8h^8+A10h^{10}+A12h^{12}+A14h^{14}+A16h^{16}+A18h^{18}+A20h^{20}+\ldots \quad (1)$$

where z is a position value of the position along the optical axis and at the height h which reference to the surface apex; k is the conic coefficient, c is the reciprocal of curvature radius, and A4, A6, A8, A10, A12, A14, A16, A18, and A20 are high order aspheric coefficients.

In the optical image capturing system provided by the present invention, the lens may be made of glass or plastic. If the lens is made of plastic, it can reduce the manufacturing cost as well as the weight of the lens effectively. If lens is made of glass, it can control the heat effect and increase the design space of the configuration of the lens with refractive power in the optical image capturing system. Besides, the object side and the image side of the first lens through sixth lens may be aspheric, which can gain more control variables and even reduce the number of the used lenses in contrast to traditional glass lens in addition to the use of reducing the aberration. Thus, the total height of the optical image capturing system can be reduced effectively.

Furthermore, in the optical image capturing system provided by the present invention, when the surface of lens is a convex surface, the surface of that lens is a convex surface in the vicinity of the optical axis in principle. When the surface of lens is a concave surface, the surface of that lens is a concave surface in the vicinity of the optical axis in principle.

In addition, in the optical image capturing system of the disclosure, according to different requirements, at least one aperture may be arranged for reducing stray light and improving the imaging quality.

The optical image capturing system of the present invention can be applied to the optical image capturing system with automatic focus based on the demand and have characters of the good aberration correction and the good image quality. Thereby, the optical image capturing system can expand the application aspect.

The optical image capturing system of the present invention may include a driving module upon demand, the driving module couples with the four lenses to displace the lenses. The driving module described above may be the voice coil motor (VCM) which is applied to move the lens to focus, or may be the optical image stabilization (OIS) which is applied to reduce the frequency the optical system is out of focus owing to the vibration of the lens during photo or video shooting.

At least one lens among the first, second, third and fourth lenses may be a light filtering element for light with wavelength of less than 500 nm, depending on the design requirements. The light filtering element may be made by coating film on at least one surface of that lens with certain filtering function, or forming that lens with material that can filter light with short wavelength.

According to the above embodiments, the specific embodiments with figures are presented in detail as below.

The First Embodiment

Figure 1B:
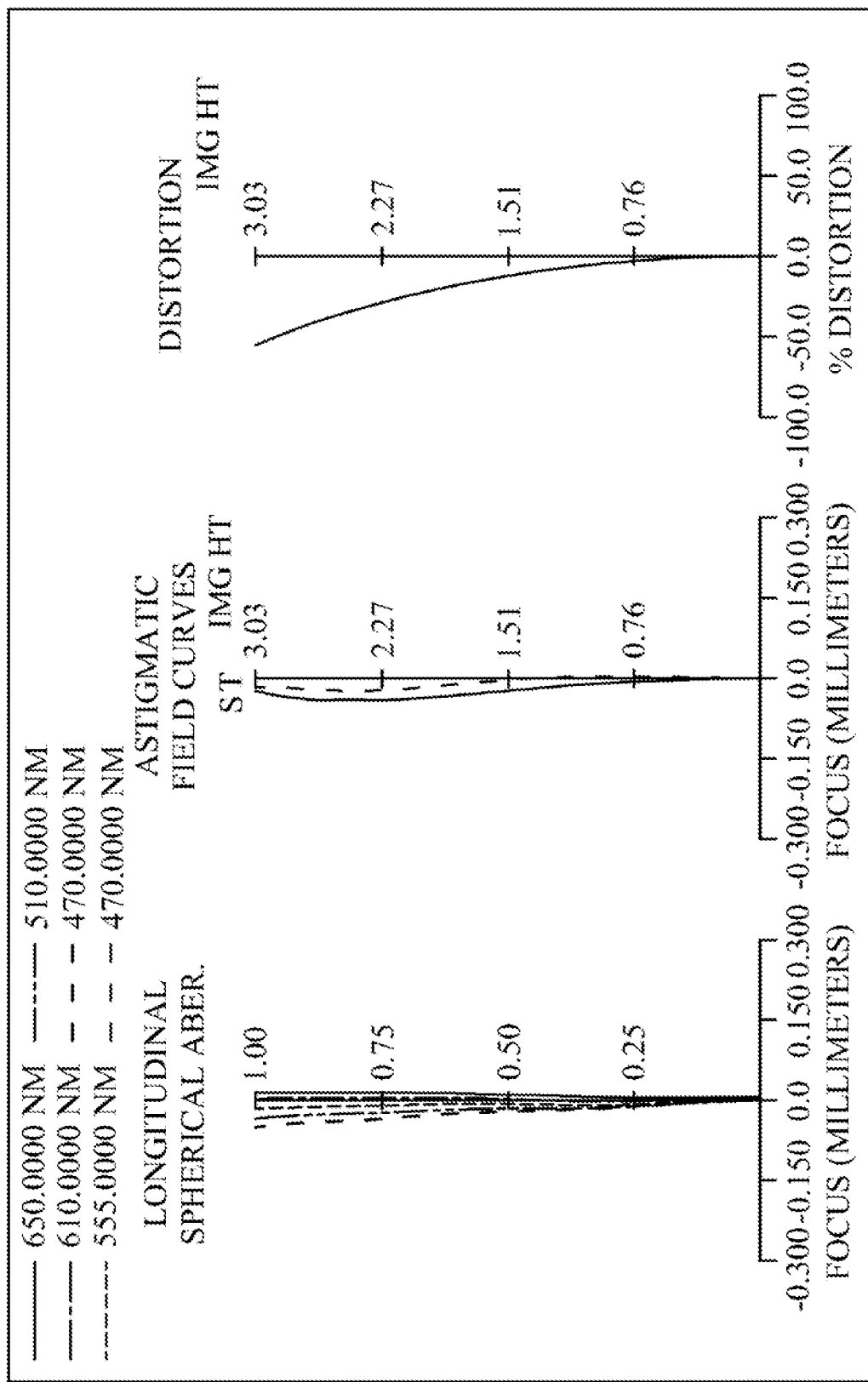
FIG. 1B shows curve diagrams of longitudinal spherical aberration, astigmatic field, and optical distortion of the optical image capturing system in order from left to right of the first embodiment of the present invention.
Figure 1C:
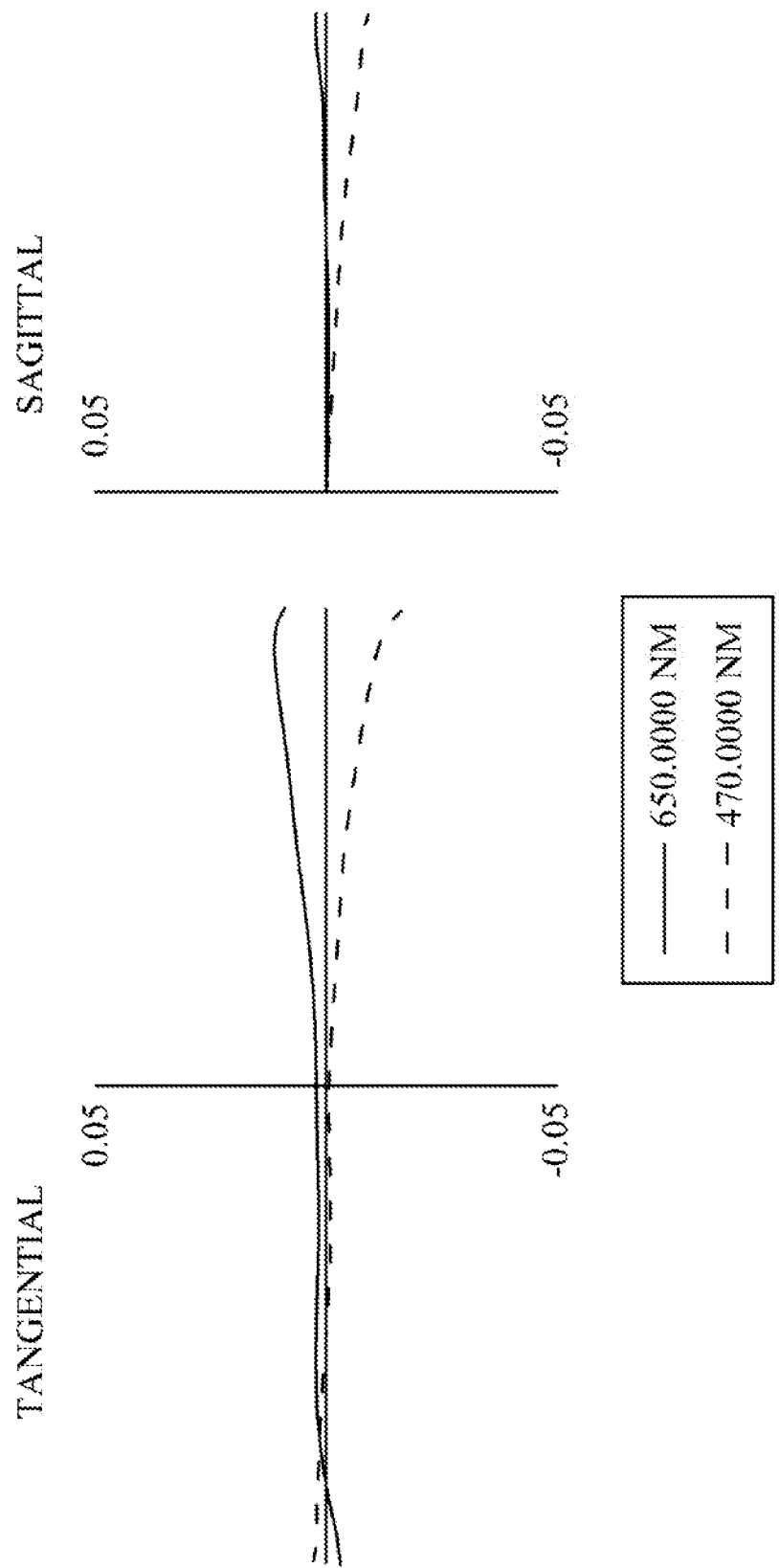
FIG. 1C is a transverse aberration diagram of the longest operation wavelength and the shortest operation wavelength for tangential fan and sagittal fan, in which the longest operation wavelength and the shortest operation wavelength pass through an margin of the entrance pupil and strike at the position of 0.7 field of view on the image plane, according to the first embodiment of the present invention.
Figure 1D:
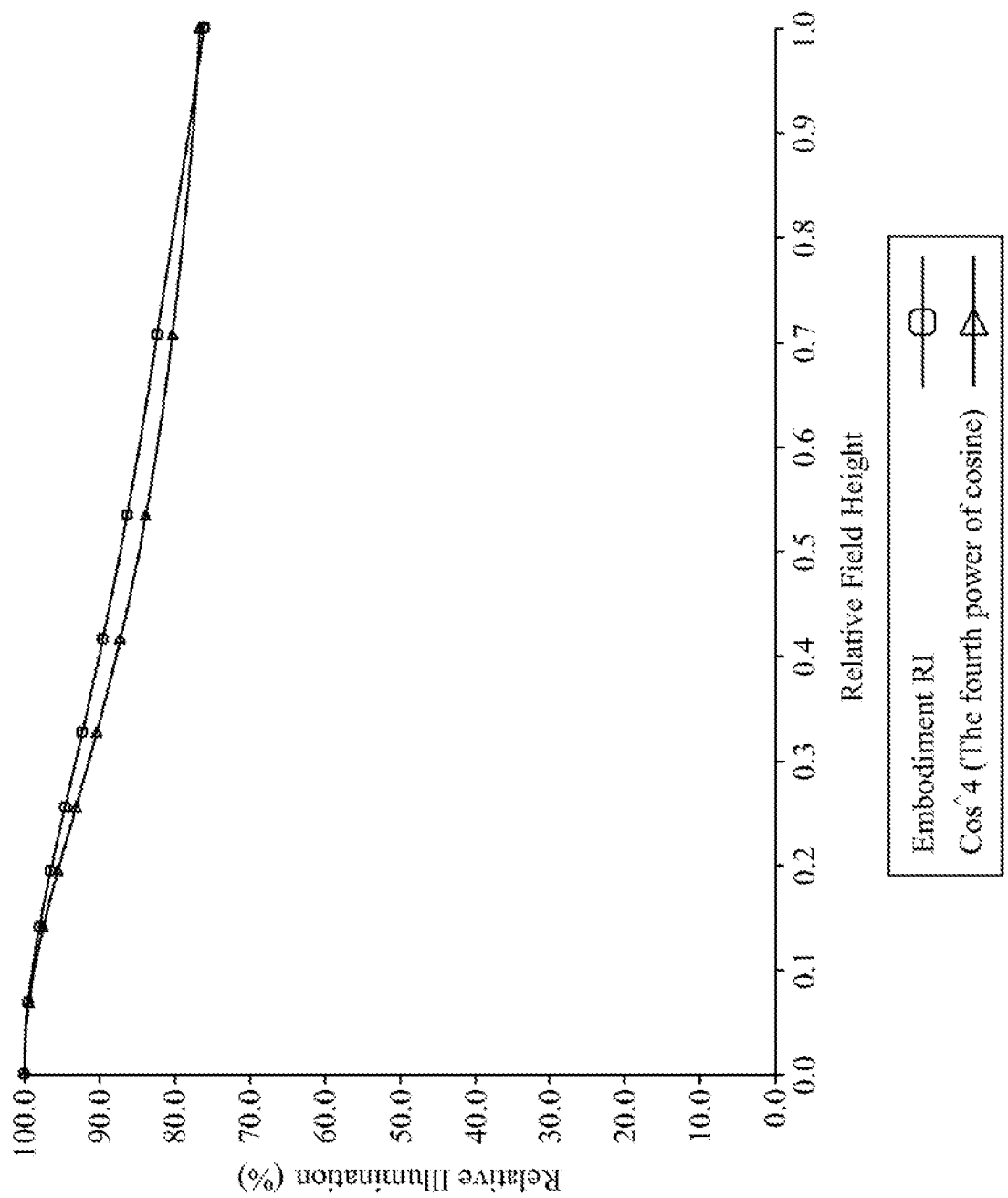
FIG. 1D is a numerical diagram of relative illuminance at each field of view on the image plane for an optical image capturing system of the first embodiment of the present invention.

Please refer to FIGS. 1A, 1B, 1C and 1D. FIG. 1A is a schematic view of an optical image capturing system of the first embodiment of the present invention. FIG. 1B shows the longitudinal spherical aberration curves, astigmatic field curves, and optical distortion curve of the optical image capturing system in order from left to right according to the first embodiment of the present invention. FIG. 1C is a transverse aberration diagram of the longest operation wavelength and the shortest operation wavelength for tangential fan and sagittal fan, in which the longest operation wavelength and the shortest operation wavelength pass through an margin of the entrance pupil and strike at the position of 0.7 field of view on the image plane, according to the first embodiment of the present invention. FIG. 1D is a numerical diagram of relative illuminance at each field of view on the image plane for an optical image capturing system of the first embodiment of the present invention. As shown in FIG. 1A, in order along an optical axis from an object side to an image side, the optical image capturing system 10 comprises a first lens 110, a second lens 120, an aperture 100, a third lens 130, a fourth lens 140, an IR-bandstop filter 170, an image plane 180 and an image-sensing device 190.

The first lens 110 has negative refractive power and is made of a glass. The first lens 110 has a convex object side 112 and the first lens 110 has a concave image side 114. Both of the object side 112 and the image side 114 thereof are aspheric. The length of the outline curve of the maximum effective half diameter of the object side 112 of the first lens 110 is denoted by ARS11. The length of the outline curve of the maximum effective half diameter of the image side 114 of the first lens 110 is denoted by ARS12. The length of the outline curve of half entrance pupil diameter (HEP) of the object side 112 of the first lens 110 is denoted by ARE11. The length of the outline curve of half entrance pupil diameter (HEP) of the image side 114 of the first lens 110 is denoted by ARE12. The central thickness of the first lens 110 on the optical axis is TP1. The maximum effective half diameter of the object side 112 of the first lens 110 is denoted by EHD11 and the maximum effective half diameter of the image side 114 of the first lens 110 is denoted by EHD12.

The horizontal distance parallel to the optical axis from an inflection point on the object side 112 of the first lens 110 that is the first nearest to the optical axis to the intersection point where the object side 112 of the first lens 110 crosses the optical axis is denoted by SGI111. The horizontal distance parallel to the optical axis from an inflection point on the image side 114 of the first lens 110 that is the first nearest to the optical axis to the intersection point where the image side 114 of the first lens 110 crosses the optical axis is denoted by SGI121. The following conditions are satisfied: SGI111=0 mm, SGI121=0 mm, |SGI111|/(|SGI111|+TP1)=0 and |SGI121|/(|SGI121|+TP1)=0.

The perpendicular distance between the optical axis and the inflection point on the object side 112 of the first lens 110 that is the first nearest to the optical axis is denoted by HIF111. The perpendicular distance between the optical axis and the inflection point on the image side 114 of the first lens 110 that is the first nearest to the optical axis is denoted by HIF121. The following conditions are satisfied: HIF111=0 mm, HIF121=0 mm, HIF111/HOI=0 and HIF121/HOI=0.

The second lens 120 has positive refractive power and is made of plastic. An object side 122 of the second lens 120 is a concave surface and an image side 124 of the second lens 120 is a convex surface. Both of the object side 122 and the image side 124 of the second lens 120 are aspheric. The object side 122 of the second lens 120 has one inflection point. The length of the maximum effective half diameter outline curve of the object side 122 of the second lens 120 is denoted by ARS21. The length of the maximum effective half diameter outline curve of the image side 124 of the second lens 120 is denoted by ARS22. The length of the half entrance pupil diameter (HEP) outline curve of the object side 122 of the second lens 120 is denoted by ARE21. The length of the half entrance pupil diameter (HEP) outline curve of the image side 124 of the second lens 120 is denoted by ARE22. The thickness of the second lens 120 on the optical axis is denoted by TP2. The maximum effective half diameter of the object side 122 of the second lens 120 is denoted by EHD21 and the maximum effective half diameter of the image side 124 of the second lens 120 is denoted by EHD22.

The horizontal distance parallel to the optical axis from an inflection point on the object side 122 of the second lens 120 that is the first nearest to the optical axis to an intersection point where the object side 122 of the second lens 120 crosses the optical axis is denoted by SGI211. The horizontal distance parallel to the optical axis from an inflection point on the image side 124 of the second lens 120 that is the first nearest to the optical axis to the intersection point where the image side 124 of the second lens 120 crosses the optical axis is denoted by SGI221. The following conditions are satisfied: SGI211=−0.13283 mm and |SGI211|/(|SGI211|+TP2)=0.05045.

The perpendicular distance between the inflection point on the object side 122 of the second lens 120 that is the first nearest to the optical axis and the optical axis is denoted by HIF211. The perpendicular distance between the inflection point on the image side 124 of the second lens 120 that is the first nearest to the optical axis and the optical axis is denoted by HIF221. The following conditions are satisfied: HIF211=2.10379 mm and HIF211/HOI=0.69478.

The third lens 130 has negative refractive power and is made of plastic. An object side 132 of the third lens 130 is a concave surface and an image side 134 of the third lens 130 is a concave surface. Both of the object side 132 and the image side 134 of the third lens 130 are aspheric. The image side 134 of the third lens 130 has one inflection point. The length of the maximum effective half diameter outline curve of the object side 132 of the third lens 130 is denoted by ARS31. The length of the maximum effective half diameter outline curve of the image side 134 of the third lens 130 is denoted by ARS32. The length of the half entrance pupil diameter (HEP) outline curve of the object side 132 of the third lens 130 is denoted by ARE31. The length of the half entrance pupil diameter (HEP) outline curve of the image side 134 of the third lens 130 is denoted by ARE32. The thickness of the third lens 130 on the optical axis is denoted by TP3. The maximum effective half diameter of the object side 132 of the third lens 130 is denoted by EHD31 and the maximum effective half diameter of the image side 134 of the third lens 130 is denoted by EHD32.

The horizontal distance parallel to the optical axis from an inflection point on the object side 132 of the third lens 130 that is the first nearest to the optical axis to an intersection point where the object side 132 of the third lens 130 crosses the optical axis is denoted by SGI311. The horizontal distance parallel to the optical axis from an inflection point on the image side 134 of the third lens 130 that is the first nearest to the optical axis to the intersection point where the image side 134 of the third lens 130 crosses the optical axis is denoted by SGI321. The following conditions are satisfied: SGI321=0.01218 mm and |SGI321|/(|SGI321|+TP3)=0.03902.

The perpendicular distance between the inflection point on the object side 132 of the third lens 130 that is the first nearest to the optical axis and the optical axis is denoted by HIF311. The perpendicular distance between the inflection point on the image side 134 of the third lens 130 that is the first nearest to the optical axis and the optical axis is denoted by HIF321. The following conditions are satisfied: HIF321=0.84373 mm and HIF321/HOI=0.27864.

The fourth lens 140 has positive refractive power and is made of plastic. An object side 142 of the fourth lens 140 is a convex surface and an image side 144 of the fourth lens 140 is a convex surface. Both of the object side 142 and the image side 144 of the fourth lens 140 are aspheric. The image side 144 of the fourth lens 140 has one inflection point. The length of the maximum effective half diameter outline curve of the object side 142 of the fourth lens 140 is denoted by ARS41. The length of the maximum effective half diameter outline curve of the image side 144 of the fourth lens 140 is denoted by ARS42. The length of the half entrance pupil diameter (HEP) outline curve of the object side 142 of the fourth lens 140 is denoted by ARE41. The length of the half entrance pupil diameter (HEP) outline curve of the image side 144 of the fourth lens 140 is denoted by ARE42. The thickness of the fourth lens 140 on the optical axis is denoted by TP4. The maximum effective half diameter of the object side 142 of the fourth lens 140 is denoted by EHD41 and the maximum effective half diameter of the image side 144 of the fourth lens 140 is denoted by EHD42.

The horizontal distance parallel to the optical axis from an inflection point on the object side 142 of the fourth lens 140 that is the first nearest to the optical axis to an intersection point where the object side 142 of the fourth lens 140 crosses the optical axis is denoted by SGI411. The horizontal distance parallel to the optical axis from an inflection point on the image side 144 of the fourth lens 140 that is the first nearest to the optical axis to the intersection point where the image side 144 of the fourth lens 140 crosses the optical axis is denoted by SGI421. The following conditions are satisfied: SGI411=0 mm, SGI421=−0.41627 mm, |SGI411|/(|SGI411|+TP4)=0 and |SGI421|/(|SGI421|+TP4)=0.25015.

The horizontal distance parallel to the optical axis from an inflection point on the object side 142 of the fourth lens 140 that is the second nearest to the optical axis to an intersection point where the object side 142 of the fourth lens 140 crosses the optical axis is denoted by SGI412. The following conditions are satisfied: SGI412=0 mm and |SGI412|/(|SGI412|+TP4)=0.

The perpendicular distance between the inflection point on the object side 142 of the forth lens 140 that is the first nearest to the optical axis and the optical axis is denoted by HIF411. The perpendicular distance between the inflection point on the image side 144 of the fourth lens 140 that is the first nearest to the optical axis and the optical axis is denoted by HIF421. The following conditions are satisfied: HIF411=0 mm, HIF421=1.55079 mm, HIF411/HOI=0 and HIF421/HOI=0.51215.

The perpendicular distance between the inflection point on the object side 142 of the fourth lens 140 that is the second nearest to the optical axis and the optical axis is denoted by HIF412. The following conditions are satisfied: HIF412=0 mm and HIF412/HOI=0.

The IR-bandstop filter 170 is made of glass. The IR-bandstop filter 170 is disposed between the fourth lens 140 and the image plane 180, and does not affect the focal length of the optical image capturing system 10.

In the optical image capturing system 10 of the first embodiment, the focal length of the optical image capturing system 10 is denoted by f. The entrance pupil diameter of the optical image capturing system 10 is denoted by HEP. The half maximum angle of view of the optical image capturing system 10 is denoted by HAF. The detailed parameters are shown as below: f=2.6841 mm, f/HEP=2.7959, HAF=70 deg. and tan(HAF)=2.7475.

In the optical image capturing system 10 of the first embodiment, the focal length of the first lens 110 is denoted by f1 and the focal length of the fourth lens 140 is denoted by f4. The following conditions are satisfied: f1=−5.4534 mm, |f/f1|=0.4922, f4=2.7595 mm and |f1/f4|=1.9762.

In the optical image capturing system 10 of the first embodiment, focal lengths of the second lens 120 to the third lens 130 may be respectively expressed as f2 and f3. The following conditions are satisfied: |f2|+|f3|=13.2561 mm, |f1|+|f4|=8.2129 mm and |f2|+|f3|>|f1|+|f4|.

The ratio of the focal length f of the optical image capturing system 10 to the focal length fp of each of lenses with positive refractive power is denoted by PPR. The ratio of the focal length f of the optical image capturing system 10 to a focal length fn of each of lenses with negative refractive power is denoted by NPR. In the optical image capturing system 10 of the first embodiment, the sum of the PPR of all lenses with positive refractive power is $\Sigma PPR=|f/f2|+|f/f4|=1.25394$. The sum of the NPR of all lenses with negative refractive power is $\Sigma NPR=|f/f1|+|f/f2|=1.21490$, $\Sigma PPR/|\Sigma NPR|=1.03213$. Simultaneously, the following conditions are also satisfied: $|f/f1|=0.49218$, $|f/f2|=0.28128$, $|f/f3|=0.72273$, $|f/f4|=0.97267$.

In the optical image capturing system 10 of the first embodiment, the distance from the object side 112 of the first lens 110 to the image side 144 of the fourth lens 140 is denoted by InTL. The distance from the object side 112 of the first lens 110 to the image plane 180 is denoted by HOS. The distance from the aperture 100 to the image plane 180 is denoted by InS. A half diagonal length of the effective detection field of the image-sensing device 190 is denoted by HOI. The distance from the image side 144 of the fourth lens 140 to the image plane 180 is denoted by InB. The following conditions are satisfied: InTL+InB=HOS, HOS=18.74760 mm, HOI=3.088 mm, HOS/HOI=6.19141, HOS/f=6.9848, InTL/HOS=0.6605, InS=8.2310 mm and InS/HOS=0.4390.

In the optical image capturing system 10 of the first embodiment, a total thickness of all lenses with refractive power on the optical axis is denoted by $\Sigma TP$. The following conditions are satisfied: $\Sigma TP=4.9656$ mm and $\Sigma TP/InTL=0.4010$. Hereby, this configuration can keep the contrast ratio of the optical image capturing system and the yield rate about manufacturing lens at the same time, and provide the proper back focal length to accommodate other elements.

In the optical image capturing system 10 of the first embodiment, the curvature radius of the object side 112 of the first lens 110 is denoted by R1. The curvature radius of the image side 114 of the first lens 110 is denoted by R2. The following condition is satisfied: $|R1/R2|=9.6100$. Hereby, the first lens has a suitable magnitude of positive refractive power to prevent the longitudinal spherical aberration from increasing too fast.

In the optical image capturing system 10 of the first embodiment, the curvature radius of the object side 142 of the fourth lens 140 is denoted by R7. The curvature radius of the image side 144 of the fourth lens 140 is denoted by R8. The following condition is satisfied: $(R7-R8)/(R7+R8)=-35.5932$. Hereby, this configuration is beneficial for correcting the astigmatism generated by the optical image capturing system.

In the optical image capturing system 10 of the first embodiment, the sum of focal lengths of all lenses with positive refractive power is denoted by $\Sigma PP$. The following conditions are satisfied: $\Sigma PP=12.30183$ mm and $f4/\Sigma PP=0.22432$. Hereby, this configuration is helpful to distribute the positive refractive power of the fourth lens 140 to other lenses with positive refractive power in an appropriate way to suppress the generation of noticeable aberrations in the propagating process of the incident light in the optical image capturing system 10.

In the optical image capturing system 10 of the first embodiment, the sum of focal lengths of all lenses with negative refractive power is denoted by $\Sigma NP$. The following conditions are satisfied: $\Sigma NP=-14.6405$ mm and $f1/\Sigma NP=0.59488$. Hereby, this configuration is helpful to distribute the negative refractive power of the fourth lens 140 to other lenses with negative refractive power in an appropriate way to suppress the generation of noticeable aberrations in the propagating process of the incident light in the optical image capturing system 10.

In the optical image capturing system 10 of the first embodiment, the distance on the optical axis between the first lens 110 and the second lens 120 is denoted by IN12. The following conditions are satisfied: IN12=4.5709 mm and IN12/f=1.70299. Therefore, this configuration is helpful to improve the chromatic aberration of the lens in order to elevate the performance of the optical image capturing system of the first embodiment.

In the optical image capturing system 10 of the first embodiment, the distance on the optical axis between the second lens 120 and the third lens 130 is denoted by IN23. The following conditions are satisfied: IN23=2.7524 mm and IN23/f=1.02548. Therefore, this configuration is helpful to improve the chromatic aberration of the lens in order to elevate the performance of the optical image capturing system of the first embodiment.

In the optical image capturing system 10 of the first embodiment, the distance on the optical axis between the third lens 130 and the fourth lens 140 is denoted by IN34. The following conditions are satisfied: IN34=0.0944 mm and IN34/f=0.03517. Therefore, this configuration is helpful to improve the chromatic aberration of the lens in order to elevate the performance of the optical image capturing system of the first embodiment.

In the optical image capturing system 10 of the first embodiment, the thicknesses of the first lens 110 and the second lens 120 on the optical axis is denoted by respectively as TP1 and TP2. The following conditions are satisfied: TP1=0.9179 mm, TP2=2.5000 mm, TP1/TP2=0.36715 and (TP1+IN12)/TP2=2.19552. Therefore, this configuration is helpful to control the sensitivity generated by the optical image capturing system and elevate the performance of the optical image capturing system of the first embodiment.

In the optical image capturing system 10 of the first embodiment, the thicknesses of the third lens 130 and the fourth lens 140 on the optical axis is denoted by respectively as TP3 and TP4 and the distance between the aforementioned two lenses on the optical axis is IN34. The following conditions are satisfied: TP3=0.3 mm, TP4=1.2478 mm, TP3/TP4=0.24043 and (TP4+IN34)/TP3=4.47393. Therefore, this configuration is helpful to control the sensitivity generated by the optical image capturing system and decrease the total height of the optical image capturing system of the first embodiment.

In the optical image capturing system 10 of the first embodiment, the following conditions are satisfied: IN23/(TP2+IN23+TP3)=0.49572. Therefore, this configuration is helpful to slightly correct the aberration of the propagating process of the incident light layer by layer and decrease the total height of the optical image capturing system.

In the optical image capturing system 10 of the first embodiment, the horizontal distance parallel to the optical axis from a maximum effective diameter position on the object side 142 of the fourth lens 140 to the intersection point where the object side 142 of the fourth lens 140 crosses the optical axis is denoted by InRS41. The horizontal distance parallel to the optical axis from a maximum effective diameter position on the image side 144 of the fourth lens 140 to an intersection point where the image side 144 of the fourth lens 140 crosses the optical axis is denoted by InRS42. The thickness of the fourth lens 140 on the optical axis is denoted by TP4. The following conditions are satisfied: InRS41=0.2955 mm, InRS42=−0.4940 mm, |InRS41|+|InRS42|=0.7894 mm, |InRS41|/TP4=0.23679, and |InRS42|/TP4=0.39590. Hereby, the configuration is favorable to the manufacturing and forming of the lens and maintaining the minimization for the optical image capturing system.

In the optical image capturing system 10 of the first embodiment, the perpendicular distance between a critical point C41 on the object side 142 of the fourth lens 140 and the optical axis is denoted by HVT41. The perpendicular distance between a critical point C42 on the image side 144 of the fourth lens 140 and the optical axis is denoted by HVT42. The following conditions are satisfied: HVT41=0 mm, HVT42=0 mm.

In the optical image capturing system 10 of the first embodiment, the following condition is satisfied: HVT42/HOI=0.

In the optical image capturing system 10 of the first embodiment, the following condition is satisfied: HVT42/HOS=0.

In the optical image capturing system 10 of the first embodiment, the coefficient of dispersion of the first lens 110 is denoted by NA1. The coefficient of dispersion of the second lens 120 is denoted by NA2. The coefficient of dispersion of the third lens 130 is denoted by NA3. The coefficient of dispersion of the fourth lens 140 is denoted by NA4. The following condition is satisfied: |NA1−NA2|=0.0351. Hereby, this configuration is helpful to correct the chromatic aberration of the optical image capturing system 10.

In the optical image capturing system 10 of the first embodiment, TV distortion and optical distortion for image formation in the optical image capturing system 10 may be respectively expressed as TDT and ODT. The following conditions are satisfied: TDT=37.4846% and ODT=−55.3331%.

In the optical image capturing system 10 of this embodiment, the transverse aberration of the visible lights with the longest operation wavelength from a positive tangential fan, which passes through the margin of the entrance pupil and strikes at the position of 0.7 field of view on the image plane 180, is denoted by PLTA, and PLTA=−0.018 mm. The transverse aberration of the visible lights with the shortest operation wavelength from a positive tangential fan, which passes through the margin of the entrance pupil and strikes at the position of 0.7 field of view on the image plane 180, is denoted by PSTA, and PSTA=0.010 mm. The transverse aberration of the visible lights with the longest operation wavelength from the negative tangential fan, which passes through the margin of the entrance pupil and strike at the position of 0.7 field of view on the image plane, is denoted by NLTA, and NLTA=0.003 mm. The transverse aberration of the visible lights with the shortest operation wavelength from the negative tangential fan, which passes through the margin of the entrance pupil and strikes at the position of 0.7 field of view on the image plane 180, is denoted by NSTA, and NSTA=−0.003 mm. The transverse aberration of the visible lights with the longest operation wavelength from the sagittal fan, which passes through the margin of the entrance pupil and strikes at the position of 0.7 field of view on the image plane 180, is denoted by SLTA, and SLTA=−0.010 mm. The transverse aberration of the visible lights with the shortest operation wavelength from the sagittal fan, which passes through the margin of the entrance pupil and strikes at the position of 0.7 field of view on the image plane 180, is denoted by SSTA, and SSTA=0.003 mm.

FIG. 1D is a numerical diagram of relative illuminance at each field of view on the image plane for an optical image capturing system of the first embodiment of the present invention. The relative illuminance of the optical axis (0.0 field of view), 0.1 field of view, 0.2 field of view, 0.3 field of view, 0.4 field of view, 0.5 field of view, 0.6 field of view, 0.7 field of view, 0.8 field of view, 0.9 field of view and 1.0 field of view is denoted by RI1, RI2, RI3, RI4, RI5, RI6, RI7, RI8, RI9 and RI10, wherein the relative illuminance of 0.9 field of view RI9 is appropriately 80%.

Figure 7:
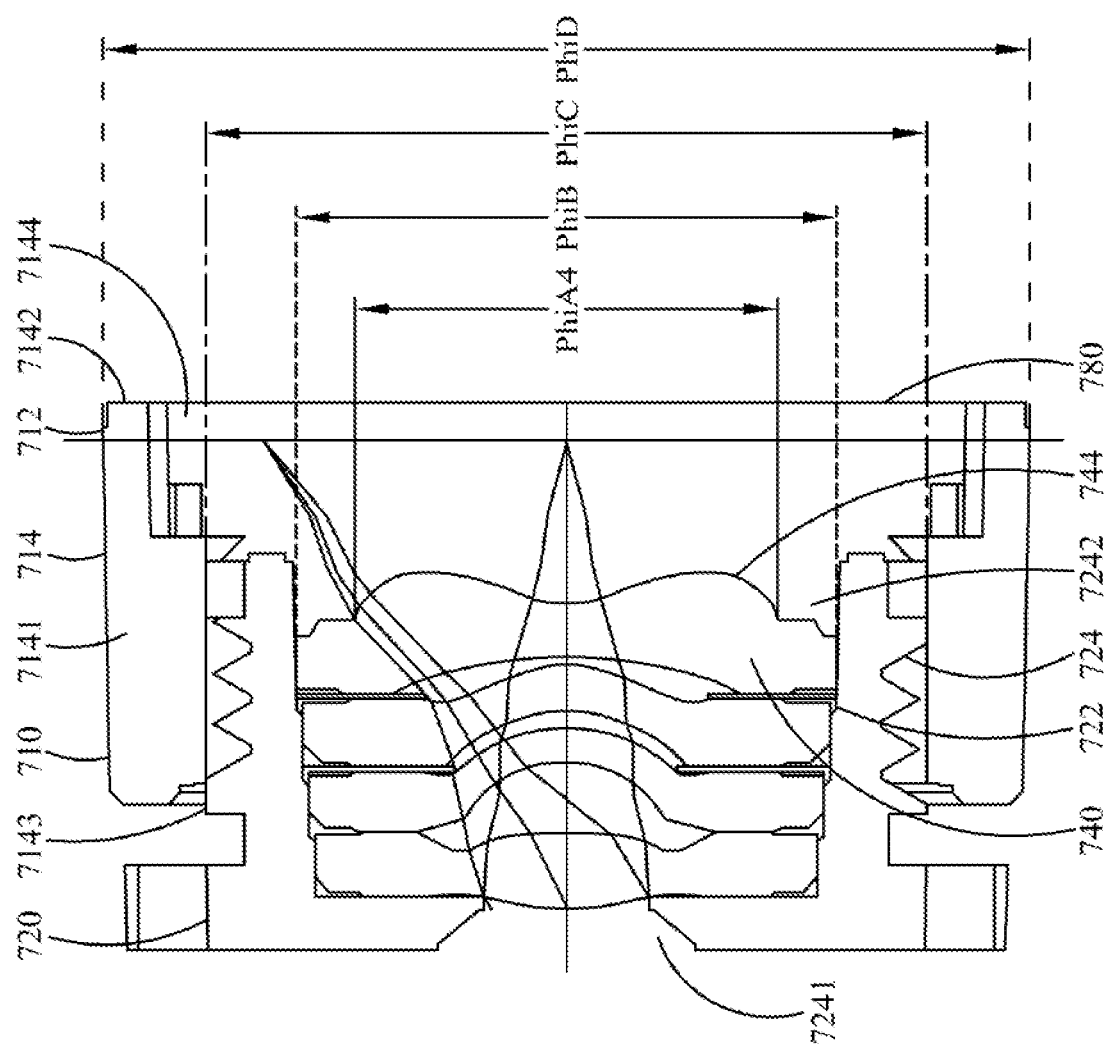
FIG. 7 is schematic view showing maximum effective diameter PhiA4 of image side of fourth lens, maximum diameter PhiB of the image side of the fourth lens, a maximum value PhiD of the minimum side length of the basement of the first positioning element perpendicular to the optical axis, and the maximum outer diameter PhiC of the connecting part of the second positioning element perpendicular to the surface of the optical axis.

Please refer to FIG. 7; the optical image capturing system of this embodiment may include an image-sensing module (not shown in FIG. 7). The image-sensing module includes a substrate and a photosensitive element disposed on the substrate. The optical image capturing system may include a first positioning element 710. The first positioning element 710 comprises a base 712 and a holder 714. The base 712 has an open accommodation space disposed on the substrate and used to accommodate the photosensitive element. The holder 714 is in a hollow shape and opaque. Optionally, the holder 714 can be formed integrally. The holder 714 has a cylinder 7141 and a basement 7142. The holder 714 has a first through hole 7143 and a second through hole 7144 which are formed on the two opposite ends, respectively. The first through hole 7143 is connected with the cylinder 7141. The second through hole 7144 is connected with the basement 7142. A maximum value of the minimum side length of the basement 7142 perpendicular to the optical axis is denoted by PhiD, and PhiD=3.3 mm.

The optical image capturing system of this embodiment includes a second positioning element 720. The second positioning element 720 is disposed in the holder 714 of the first positioning element 710, and comprises a positioning part 722 and a connecting part 724. The positioning part 722 is in a hollow shape and has a third through hole 7241 and a fourth through hole 7242 which are formed on the two opposite ends thereof of the optical axis. The third through hole 7241 is connected the positioning part 722, and the fourth through hole 7242 is connected with the basement 7142. The positioning part 722 directly contacts with any of the lenses of this embodiment, and generates the positioning effect of accommodating the lens and arranging the lens on the optical axis. The connecting part 724 is disposed outside the positioning part 722 and can directly combine with the cylinder 7141, so that the second positioning element 720 can be disposed in the holder 714 of the first positioning element 710 and the optical image capturing system 10 has function of adjusting and positioning the focal length in optical axis direction. The maximum outer diameter of the plane of the connection part 724 perpendicular to the optical axis is denoted by PhiC, and PhiC=2.85 mm. The maximum diameter of the inner hole of the fourth through hole 7242 is denoted by Phi4. The foregoing connecting part 724 may possess the thread and make the second positioning element 720 be engaged with the holder 714 of the first positioning element 710.

Any of lenses of this embodiment can be indirectly disposed in the first positioning element 710 by the second positioning element 720, and disposed closer to the third through hole 7241 than the photosensitive element, and face the photosensitive element.

In this embodiment, the lens which is the nearest to the image plane 780 is the fourth lens 740, a maximum effective diameter of the image side 744 of the fourth lens 740 is denoted by PhiA4, and the following condition is satisfied: PhiA4=a double of EHD42=1.767 mm. The image side 744 of the fourth lens 740 is aspheric, and cutoff points of the maximum effective diameter include cutoff points of the aspheric surface. The ineffective half diameter (IHD) of image side 744 of the fourth lens 740 is a surface section extended from the cutoff points of the maximum effective half diameter of the same surface in a direction away from the optical axis. In this embodiment, the lens which is the nearest to the image plane 780 is the fourth lens 740. The maximum diameter of the image side 744 of the fourth lens 740 is denoted by PhiB, and the following condition is satisfied: PhiB=a double of (a maximum EHD 42+a maximum IHD)=PhiA4+a double of a (maximum IHD)=2.167 mm.

In this embodiment, the maximum effective diameter of the image side 744 of the fourth lens 740 which is the nearest to the image plane 780 (that is, the image space), also called optical exit pupil, is denoted by PhiA4. The pupil magnification ratio of the optical image capturing system is denoted by PMR, and the following condition is satisfied: PMR=PhiA4/HEP=1.84337. A ratio to pupil and image is denoted by PMMR, and the following condition is satisfied: PMMR=PhiA4/ImgH=0.58355. A condensed ratio is denoted by PSMR, and the following condition is satisfied: PSMR=PhiA4/InTL=0.14269.

Table 1 and Table 2 below should be incorporated into the reference of the first embodiment.

TABLE 1

Lens Parameter for the First Embodiment
f (focal length) = 2.6841 mm, f/HEP = 2.7959,
HAF (half angle of view) = 70 deg, tan(HAF) = 2.7475

| Surface No. | | Curvature Radius | Thickness (mm) | Material |
|---|---|---|---|---|
| 0 | Object | Plane | infinity | |
| 1 | First Lens | 31.98102785 | 0.918 | Glass |
| 2 | | 3.327880578 | 4.571 | |
| 3 | Second Lens | −15.2556818 | 2.500 | Plastic |
| 4 | | −4.681543531 | 2.528 | |
| 5 | Aperture | Plane | 0.225 | |
| 6 | Third Lens | −2.453543123 | 0.300 | Plastic |
| 7 | | 127.8664454 | 0.094 | |
| 8 | Fourth Lens | 2.697747363 | 1.248 | Plastic |
| 9 | | −2.853715061 | 0.725 | |
| 10 | IR-bandstop Filter | Plane | 2.000 | BK7_SCHOTT |
| 11 | | Plane | 3.640 | |
| 12 | Image Plane | Plane | | |

| Surface No. | Refractive Index | Coefficient of Dispersion | Focal Length |
|---|---|---|---|
| 0 | | | |
| 1 | 1.688 | 50.26 | −5.453 |

TABLE 1-continued

Lens Parameter for the First Embodiment
f (focal length) = 2.6841 mm, f/HEP = 2.7959,
HAF (half angle of view) = 70 deg, tan(HAF) = 2.7475

| | | | |
|---|---|---|---|
| 2 | | | |
| 3 | 1.642 | 22.46 | 9.542 |
| 4 | | | |
| 5 | | | |
| 6 | 1.642 | 22.46 | −3.714 |
| 7 | | | |
| 8 | 1.544 | 56.09 | 2.759 |
| 9 | | | |
| 10 | 1.517 | 64.13 | |
| 11 | | | |
| 12 | | | |

Reference Wavelength: 555 nm; Shield Position: the 3rd surface with effective aperture radius = 3.0 mm

TABLE 2

Aspheric Coefficients of the First Embodiment
Table 2: Aspheric Coefficients

| | Surface No. | | |
|---|---|---|---|
| | 3 | 4 | 6 |
| k | −2.918829E+01 | −3.214789E+00 | −1.504539E+01 |
| A4 | −9.004096E−04 | −9.725260E−06 | 8.890018E−05 |
| A6 | 2.391364E−04 | −8.096303E−05 | −1.166688E−02 |
| A8 | −2.421089E−05 | 7.787465E−07 | −5.720942E−04 |
| A10 | 1.716292E−06 | 3.517517E−07 | 8.305770E−04 |
| A12 | 0.000000E+00 | 0.000000E+00 | 0.000000E+00 |

| | Surface No. | | |
|---|---|---|---|
| | 7 | 8 | 9 |
| k | −2.970417E+01 | −1.613370E+01 | −1.145951E+00 |
| A4 | 3.634454E−02 | 9.587367E−03 | −4.742020E−03 |
| A6 | −3.060142E−02 | −3.693991E−03 | 1.232422E−03 |
| A8 | 8.833265E−03 | 8.653836E−04 | 3.333400E−04 |
| A10 | −1.362695E−03 | −7.093620E−05 | −2.583094E−06 |
| A12 | 0.000000E+00 | 0.000000E+00 | 0.000000E+00 |

The numerical data related to the length of the outline curve is shown according to table 1 and table 2.

First Embodiment (Primary reference wavelength = 555 nm)

| ARE | ½(HEP) | ARE value | ARE − ½(HEP) | 2(ARE/HEP) % | TP | ARE/TP (%) |
|---|---|---|---|---|---|---|
| 11 | 0.480 | 0.480 | 0.000 | 100.00% | 0.918 | 52.30% |
| 12 | 0.480 | 0.482 | 0.002 | 100.35% | 0.918 | 52.48% |
| 21 | 0.480 | 0.480 | 0.000 | 100.02% | 2.500 | 19.20% |
| 22 | 0.480 | 0.481 | 0.001 | 100.17% | 2.500 | 19.23% |
| 31 | 0.480 | 0.482 | 0.002 | 100.49% | 0.300 | 160.78% |
| 32 | 0.480 | 0.480 | 0.000 | 100.00% | 0.300 | 160.00% |
| 41 | 0.480 | 0.482 | 0.002 | 100.42% | 1.248 | 38.63% |
| 42 | 0.480 | 0.482 | 0.002 | 100.47% | 1.248 | 38.65% |

| ARS | EHD | ARS value | ARS − EHD | (ARS/EHD) % | TP | ARS/TP (%) |
|---|---|---|---|---|---|---|
| 11 | 5.943 | 5.978 | 0.035 | 100.58% | 0.918 | 651.27% |
| 12 | 3.236 | 4.439 | 1.204 | 137.20% | 0.918 | 483.66% |
| 21 | 3.000 | 3.007 | 0.007 | 100.24% | 2.500 | 120.29% |
| 22 | 2.855 | 2.983 | 0.128 | 104.49% | 2.500 | 119.33% |
| 31 | 1.061 | 1.079 | 0.017 | 101.61% | 0.300 | 359.54% |
| 32 | 1.293 | 1.292 | −0.001 | 99.95% | 0.300 | 430.77% |
| 41 | 1.642 | 1.676 | 0.034 | 102.06% | 1.248 | 134.30% |
| 42 | 1.767 | 1.859 | 0.092 | 105.21% | 1.248 | 148.98% |

Table 1 is the detailed structure data to the first embodiment in FIG. 1A, wherein the unit of the curvature radius, the thickness, the distance, and the focal length is millimeters (mm). Surfaces 0-12 illustrate the surfaces from the object side to the image side in the optical image capturing system. Table 2 is the aspheric coefficients of the first embodiment, wherein k is the conic coefficient in the aspheric surface formula, and A1-A20 are the first to the twentieth order aspheric surface coefficient. Furthermore, the tables in the following embodiments are referenced to the schematic view and the aberration graphs, respectively, and definitions of parameters in the tables are equal to those in the Table 1 and the Table 2, so the repetitious details will not be given here.

The Second Embodiment

Figure 2A:
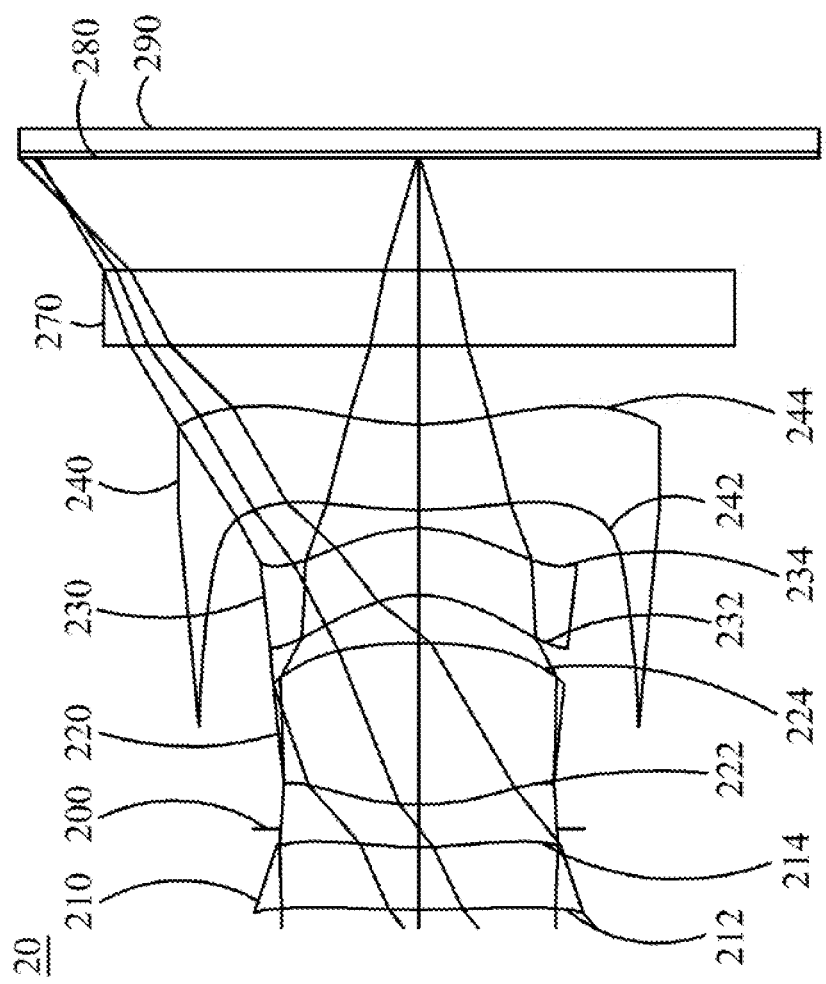
FIG. 2A is a schematic view of an optical image capturing system of a second embodiment of the present invention.
Figure 2B:
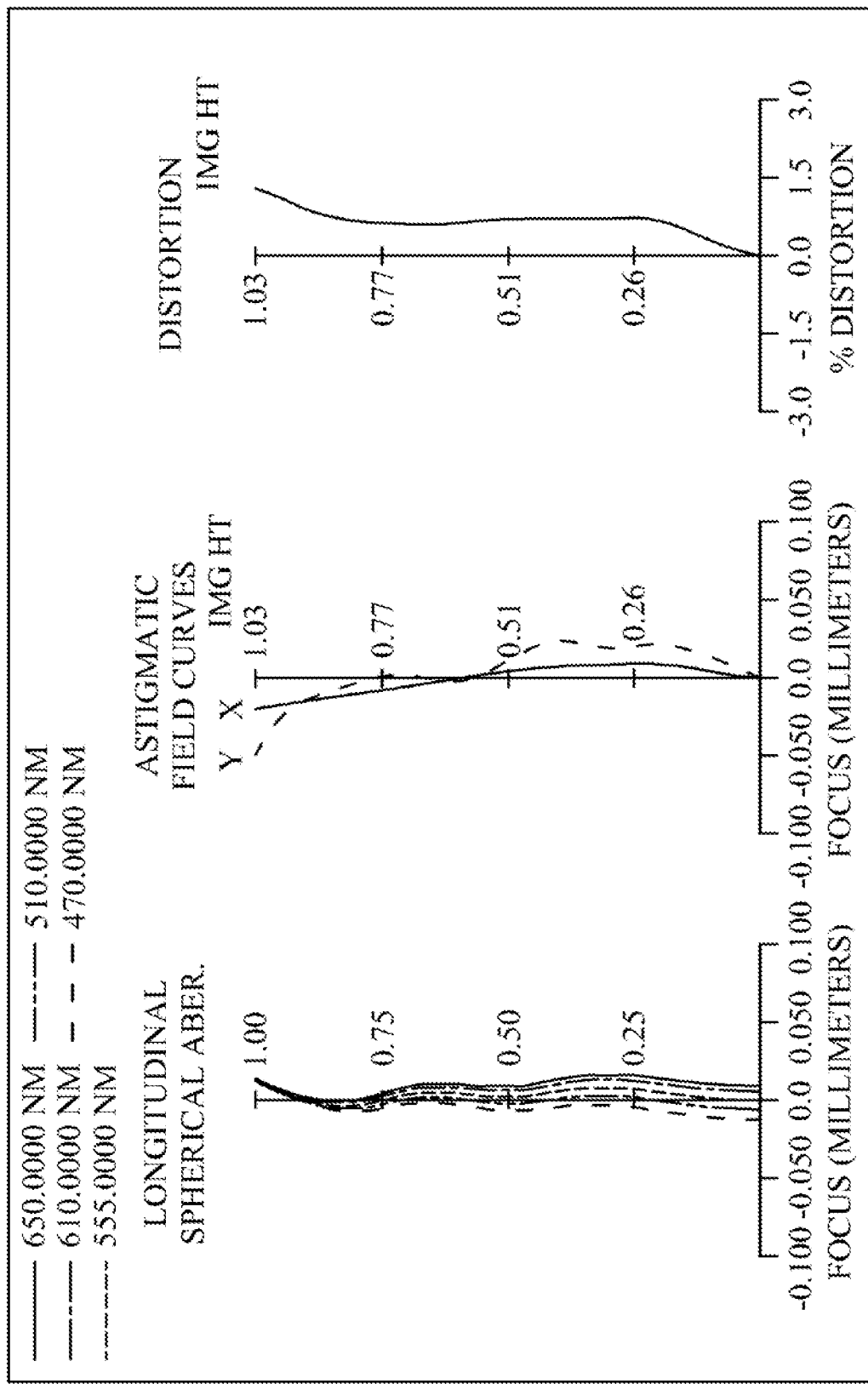
FIG. 2B shows curve diagrams of longitudinal spherical aberration, astigmatic field, and optical distortion of the optical image capturing system in order from left to right of the second embodiment of the present invention.
Figure 2D:
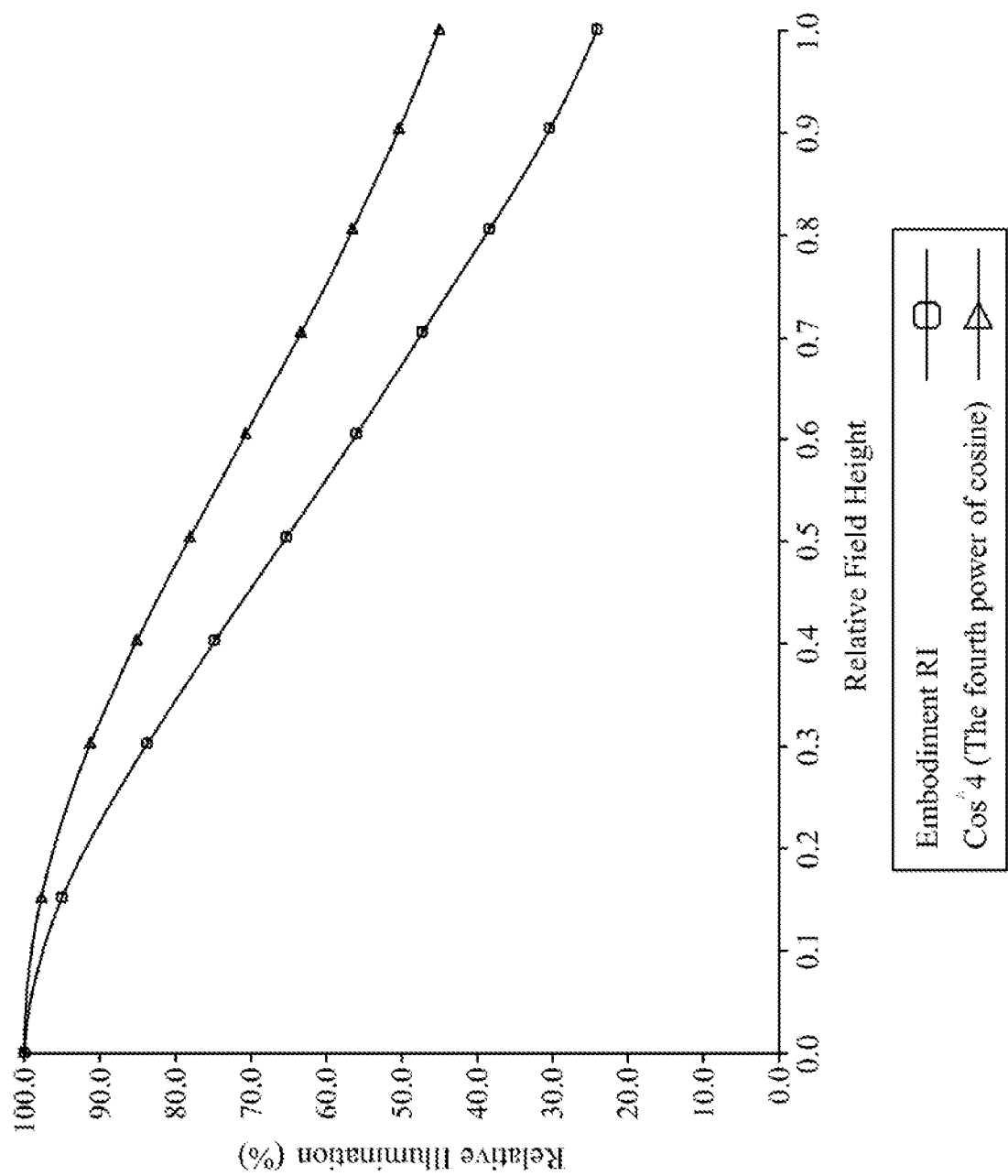
FIG. 2D is a numerical diagram of relative illuminance at each field of view on the image plane for an optical image capturing system of the second embodiment of the present invention.

Please refer to FIGS. 2A, 2B, 2C and 2D. FIG. 2A is a schematic view of an optical image capturing system of the second embodiment of the present invention. FIG. 2B shows the longitudinal spherical aberration curves, astigmatic field curves, and optical distortion curve of the optical image capturing system in order from left to right according to the second embodiment of the present invention. FIG. 2C is a transverse aberration diagram of the longest operation wavelength and the shortest operation wavelength for tangential fan and sagittal fan, in which the longest operation wavelength and the shortest operation wavelength pass through an margin of the entrance pupil and strike at the position of 0.7 field of view on the image plane, according to the second embodiment of the present invention. FIG. 2D is a numerical diagram of relative illuminance at each field of view on the image plane for an optical image capturing system of the second embodiment of the present invention. As shown in FIG. 2A, in order along an optical axis from an object side to an image side, the optical image capturing system 20 comprises a first lens 210, an aperture 200, a second lens 220, a third lens 230, a fourth lens 240, an IR-bandstop filter 270, an image plane 280 and an image-sensing device 290.

The first lens 210 has negative refractive power and is made of plastic. An object side 212 of the first lens 210 is a convex surface and an image side 214 of the first lens 210 is a concave surface. Both of the object side 212 and the image side 214 of the first lens 210 are aspheric. Both of the object side 212 and the image side 214 of the first lens 210 has one inflection point.

The second lens 220 has positive refractive power and is made of plastic. An object side 222 of the second lens 220 is a convex surface and an image side 224 of the second lens 220 is a convex surface. Both of the object side 222 and the image side 224 of the second lens 220 are aspheric. The object side 222 of the second lens 220 has one inflection point.

The third lens 230 has positive refractive power and is made of plastic. An object side 232 of the third lens 230 is a concave surface and an image side 234 of the third lens 230 is a convex surface. Both of the object side 232 and the image side 234 of the third lens 230 are aspheric. Both of the object side 232 and the image side 234 of the third lens 230 has one inflection point.

The fourth lens 240 has negative refractive power and is made of plastic. An object side 242 of the fourth lens 240 is convex a surface and an image side 244 of the fourth lens 240 is a concave surface. Both of the object side 242 and the image side 244 of the fourth lens 240 are aspheric. Both of the object side 242 and the image side 244 of the fourth lens 240 has one inflection point.

The IR-bandstop filter 270 is made of glass. The IR-bandstop filter 270 is disposed between the fourth lens 240 and the image plane 280, and does not affect the focal length of the optical image capturing system 20.

In the optical image capturing system 20 of the second embodiment, both of the second lens 220 and the third lens 230 have positive refractive power. The focal lengths of the second lens 220 and the third lens 230 are respectively expressed as f2 and f3. The sum of the fp of all lenses with positive refractive power of the optical image capturing system 20 is ΣPP, and the following condition is satisfied: ΣPP=f2+f3. Hereby, this configuration is helpful to distribute the positive refractive power of the single lens to other lenses with positive refractive power in an appropriate way to suppress the generation of noticeable aberrations in the propagating process of the incident light in the optical image capturing system 20.

In the optical image capturing system 20 of the second embodiment, a sum of the focal lengths of all lenses with negative refractive power is Σ NP, and the following condition is satisfied: ΣNP=f1+f3.

Please refer to the following Table 3 and Table 4. The detailed data of the optical image capturing system 20 of the second Embodiment is as shown in Table 3.

TABLE 3

Lens Parameter for the Second Embodiment
f (focal length) = 1.323 mm, f/HEP = 1.8,
HAF (half angle of view) = 37.5 deg, tan(HAF) = 0.7673

| Surface No. | | Curvature Radius | Thickness (mm) | Material |
|---|---|---|---|---|
| 0 | Object | Plane | Infinity | |
| 1 | First Lens | 2.815155869 | 0.175 | Plastic |
| 2 | | 1.16843349 | 0.051 | |
| 3 | Aperture | Plane | 0.066 | |
| 4 | Second Lens | 0.599339272 | 0.450 | Plastic |
| 5 | | −1.411016917 | 0.133 | |
| 6 | Third Lens | −0.317760089 | 0.187 | Plastic |
| 7 | | −0.356324528 | 0.050 | |
| 8 | Fourth Lens | 1.400960481 | 0.238 | Plastic |
| 9 | | 0.686143826 | 0.219 | |
| 10 | IR-bandstop Filter | Plane | 0.210 | BK7_SCHOTT |
| 11 | | Plane | 0.31 | |
| 12 | Image Plane | Plane | | |

| Surface No. | Refractive Index | Coefficient of Dispersion | Focal Length |
|---|---|---|---|
| 0 | | | |
| 1 | 1.515 | 56.55 | −4.014 |
| 2 | | | |
| 3 | | | |
| 4 | 1.544 | 55.96 | 0.837 |
| 5 | | | |
| 6 | 1.642 | 22.46 | 5.004 |
| 7 | | | |
| 8 | 1.642 | 22.46 | −2.390 |
| 9 | | | |
| 10 | 1.517 | 64.13 | |
| 11 | | | |
| 12 | | | |

Reference Wavelength: 555 nm; Shield Position: the 1st surface with effective aperture radius = 0.43 mm; the 5th surface with effective aperture radius = 0.390 mm

TABLE 4

Aspheric Coefficients of the Second Embodiment
Table 4: Aspheric Coefficients

| | Surface No. | | | |
|---|---|---|---|---|
| | 1 | 2 | 4 | 5 |
| k | −2.100896E+01 | −3.117650E+01 | −6.594072E−01 | −5.749340E+00 |
| A4 | −1.034815E+00 | −1.247743E+00 | −2.144582E+00 | −5.564182E−01 |
| A6 | −1.467293E+01 | −3.933644E+01 | −2.397809E+01 | −5.601046E+01 |
| A8 | 4.846220E+02 | 1.049222E+03 | 1.466540E+03 | 7.715029E+02 |
| A10 | −7.102825E+03 | −1.234792E+04 | −4.393327E+04 | −8.580555E+03 |
| A12 | 5.884002E+04 | 5.356074E+04 | 7.002153E+05 | 6.735915E+04 |
| A14 | −2.820526E+05 | 1.558329E+05 | −6.248007E+06 | −2.902619E+05 |
| A16 | 7.245452E+05 | −2.134561E+06 | 2.912419E+07 | 5.267012E+05 |
| A18 | −7.701193E+05 | 5.176547E+06 | −5.535295E+07 | −1.326747E+05 |
| A20 | 1.874256E+01 | 0.000000E+00 | 0.000000E+00 | 0.000000E+00 |

| | Surface No. | | | |
|---|---|---|---|---|
| | 6 | 7 | 8 | 9 |
| k | −1.293538E+00 | −1.778968E+00 | −9.958872E−02 | −9.720777E+00 |
| A4 | 5.280891E+00 | 7.147752E+00 | 2.668792E+00 | −6.993487E−01 |
| A6 | −4.929357E+01 | −1.152802E+02 | −1.053723E+02 | −9.822777E+00 |
| A8 | −5.524670E+02 | 1.188148E+03 | 1.164018E+03 | 9.374187E+01 |
| A10 | 2.181848E+04 | −6.205622E+03 | −7.629138E+03 | −4.377047E+02 |
| A12 | −2.298819E+05 | 2.212051E+04 | 3.098893E+04 | 1.160682E+03 |
| A14 | 1.176507E+06 | −6.949962E+04 | −7.777603E+04 | −1.720966E+03 |
| A16 | −3.006163E+06 | 1.681686E+05 | 1.168351E+05 | 1.259258E+03 |
| A18 | 3.050941E+06 | −1.906600E+05 | −9.146103E+04 | −3.228384E+02 |
| A20 | 0.000000E+00 | 0.000000E+00 | 0.000000E+00 | 0.000000E+00 |

In the second embodiment, the presentation of the aspheric surface equation is similar to that in the first embodiment. Besides, the definitions of parameters in following tables are similar to those in the first embodiment, so the repetitive details will not be given here.

The following values for the conditions can be obtained from the data in Table 3 and Table 4.

| Second Embodiment (Primary reference wavelength = 555 nm) | | | | | |
|---|---|---|---|---|---|
| InRS41 | InRS42 | HVT41 | HVT42 | ODT % | TDT % |
| −0.02448 | −0.00545 | 0.30907 | 0.42296 | 1.30002 | 0.70606 |
| |f/f1| | |f/f2| | |f/f3| | |f/f4| | |f1/f2| | |f2/f3| |
| 0.32944 | 1.58025 | 0.26432 | 0.55346 | 4.79676 | 0.16726 |
| ΣPPR | ΣNPR | ΣPPR/\|ΣNPR\| | ΣPP | ΣNP | f1/ΣPP |
| 1.84456 | 0.88290 | 2.08922 | 5.84043 | −6.40396 | −0.68735 |
| f4/ΣNP | IN12/f | IN23/f | IN34/f | TP3/f | TP4/f |
| 0.37314 | 0.08827 | 0.10034 | 0.03781 | 0.14140 | 0.18018 |

| Second Embodiment (Primary reference wavelength = 555 nm) | | | | | |
|---|---|---|---|---|---|
| InTL | HOS | HOS/HOI | InS/HOS | InTL/HOS | ΣTP/InTL |
| 1.34974 | 2.08923 | 2.03232 | 0.89196 | 0.64605 | 0.77815 |
| (TP1 + IN12)/TP2 | (TP4 + IN34)/TP3 | TP1/TP2 | TP3/TP4 | | IN23/(TP2 + IN23 + TP3) |
| 0.64830 | 1.54164 | 0.38889 | 0.78476 | | 0.17240 |
| \|InRS41\|/TP4 | \|InRS42\|/TP4 | HVT42/HOI | HVT42/HOS | PhiA4/InTL | PhiA4/HOI |
| 0.1027 | 0.0229 | 0.4114 | 0.2024 | 1.0372 | 0.6809 |
| PhiA4 | PhiB | PhiC | PhiD | RI9 | PhiA4/HEP |
| 1.4 mm | 1.8 mm | 2.2 mm | 2.5 mm | 50% | 1.9055 |
| PSTA | PLTA | NSTA | NLTA | SSTA | SLTA |
| 0.001 mm | 0.001 mm | 0.018 mm | 0.012 mm | −0.002 mm | 0.001 mm |

The following values for the conditions can be obtained from the data in Table 3 and Table 4.

| Values Related to Inflection Point of Second Embodiment (Primary Reference Wavelength = 555 nm) | | | | | |
|---|---|---|---|---|---|
| HIF111 | 0.1522 | HIF111/HOI | 0.1481 | SGI111 | 0.0034 | \|SGI111\|/(\|SGI111\| + TP1) | 0.0192 |
| HIF121 | 0.1456 | HIF121/HOI | 0.1417 | SGI121 | 0.0074 | \|SGI121\|/(\|SGI121\| + TP1) | 0.0408 |
| HIF211 | 0.2328 | HIF211/HOI | 0.2264 | SGI211 | 0.0389 | \|SGI211\|/(\|SGI211\| + TP2) | 0.0796 |
| HIF311 | 0.2617 | HIF311/HOI | 0.2546 | SGI311 | −0.0900 | \|SGI311\|/(\|SGI311\| + TP3) | 0.3249 |

-continued

| Values Related to Inflection Point of Second Embodiment (Primary Reference Wavelength = 555 nm) | | | | | | |
|---|---|---|---|---|---|---|
| HIF321 | 0.2495 | HIF321/ HOI | 0.2427 | SGI321 | −0.0673 | \|SGI321\|/ (\|SGI321\| + TP3) | 0.2646 |
| HIF411 | 0.1827 | HIF411/ HOI | 0.1778 | SGI411 | 0.0122 | \|SGI411\|/ (\|SGI411\| + TP4) | 0.0486 |
| HIF421 | 0.2076 | HIF421/ HOI | 0.2020 | SGI421 | 0.0250 | \|SGI421\|/ (\|SGI421\| + TP4) | 0.0950 |

The numerical data related to the length of the outline curve is shown according to table 3 and table 4.

| Second Embodiment (Primary reference wavelength = 555 nm) | | | | | | |
|---|---|---|---|---|---|---|
| ARE | ½(HEP) | ARE value | ARE − ½(HEP) | 2(ARE/HEP) % | TP | ARE/TP (%) |
| 11 | 0.367 | 0.367 | −0.00021 | 99.94% | 0.175 | 209.80% |
| 12 | 0.367 | 0.368 | 0.00053 | 100.14% | 0.175 | 210.22% |
| 21 | 0.363 | 0.369 | 0.00589 | 101.62% | 0.450 | 81.92% |
| 22 | 0.367 | 0.387 | 0.01919 | 105.22% | 0.450 | 85.90% |
| 31 | 0.367 | 0.398 | 0.03014 | 108.20% | 0.187 | 212.56% |
| 32 | 0.367 | 0.384 | 0.01694 | 104.61% | 0.187 | 205.51% |
| 41 | 0.367 | 0.368 | 0.00075 | 100.20% | 0.238 | 154.48% |
| 42 | 0.367 | 0.371 | 0.00333 | 100.91% | 0.238 | 155.56% |
| ARS | EHD | ARS value | ARS − EHD | (ARS/EHD) % | TP | ARS/TP (%) |
| 11 | 0.430 | 0.430 | −0.00027 | 99.94% | 0.175 | 245.56% |
| 12 | 0.393 | 0.395 | 0.00137 | 100.35% | 0.175 | 225.46% |
| 21 | 0.363 | 0.369 | 0.00589 | 101.62% | 0.450 | 81.92% |
| 22 | 0.390 | 0.415 | 0.02497 | 106.40% | 0.450 | 92.22% |
| 31 | 0.402 | 0.433 | 0.03104 | 107.71% | 0.187 | 231.77% |
| 32 | 0.433 | 0.452 | 0.01854 | 104.28% | 0.187 | 241.65% |
| 41 | 0.503 | 0.519 | 0.01623 | 103.23% | 0.238 | 217.83% |
| 42 | 0.697 | 0.732 | 0.03446 | 104.94% | 0.238 | 307.07% |

The Third Embodiment

Figure 3A:
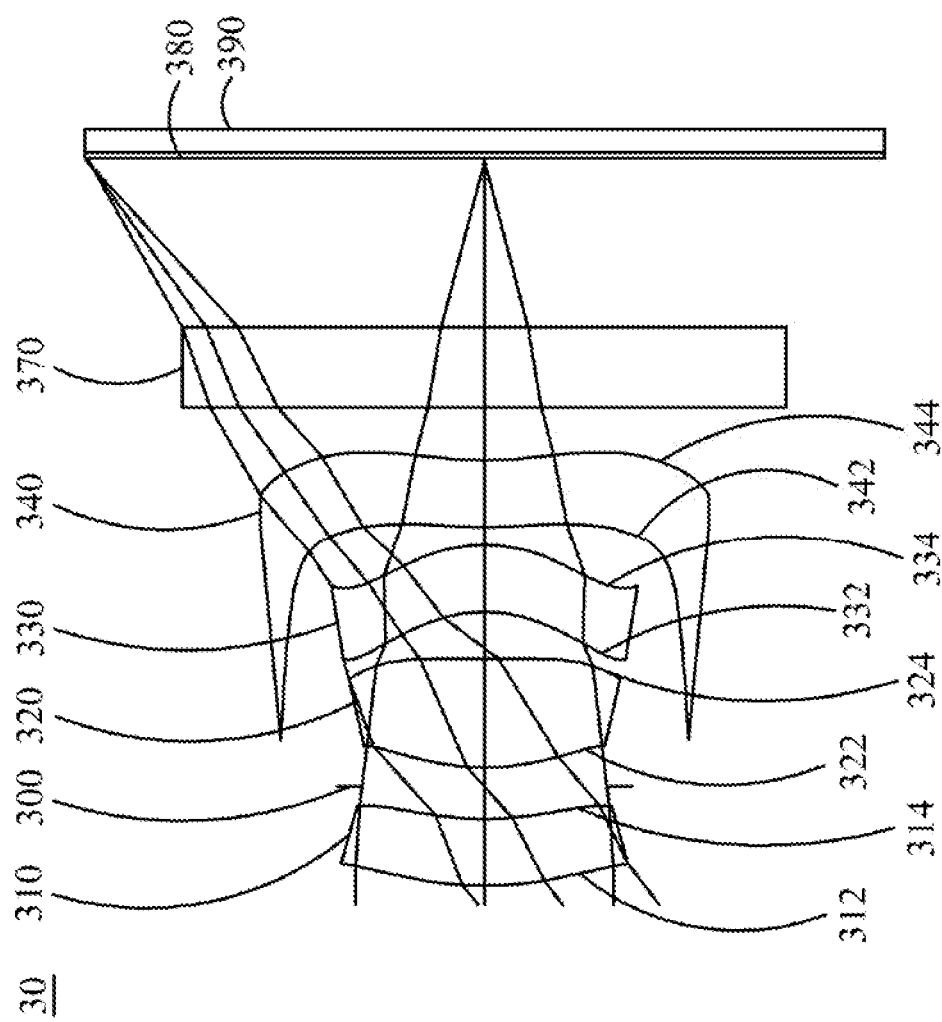
FIG. 3A is a schematic view of an optical image capturing system of a third embodiment of the present invention.
Figure 3B:
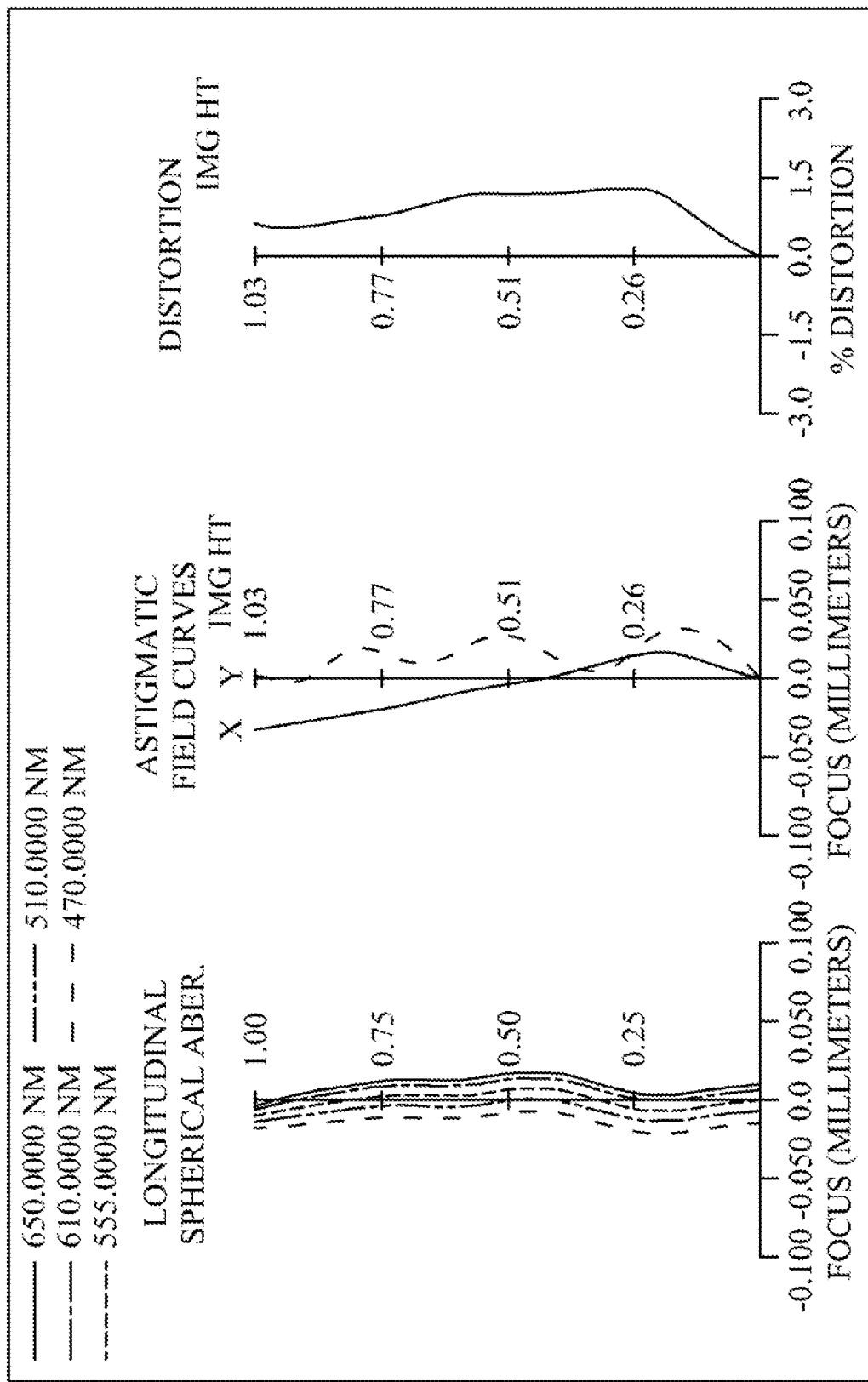
FIG. 3B shows curve diagrams of longitudinal spherical aberration, astigmatic field, and optical distortion of the optical image capturing system in order from left to right of the third embodiment of the present invention.
Figure 3D:
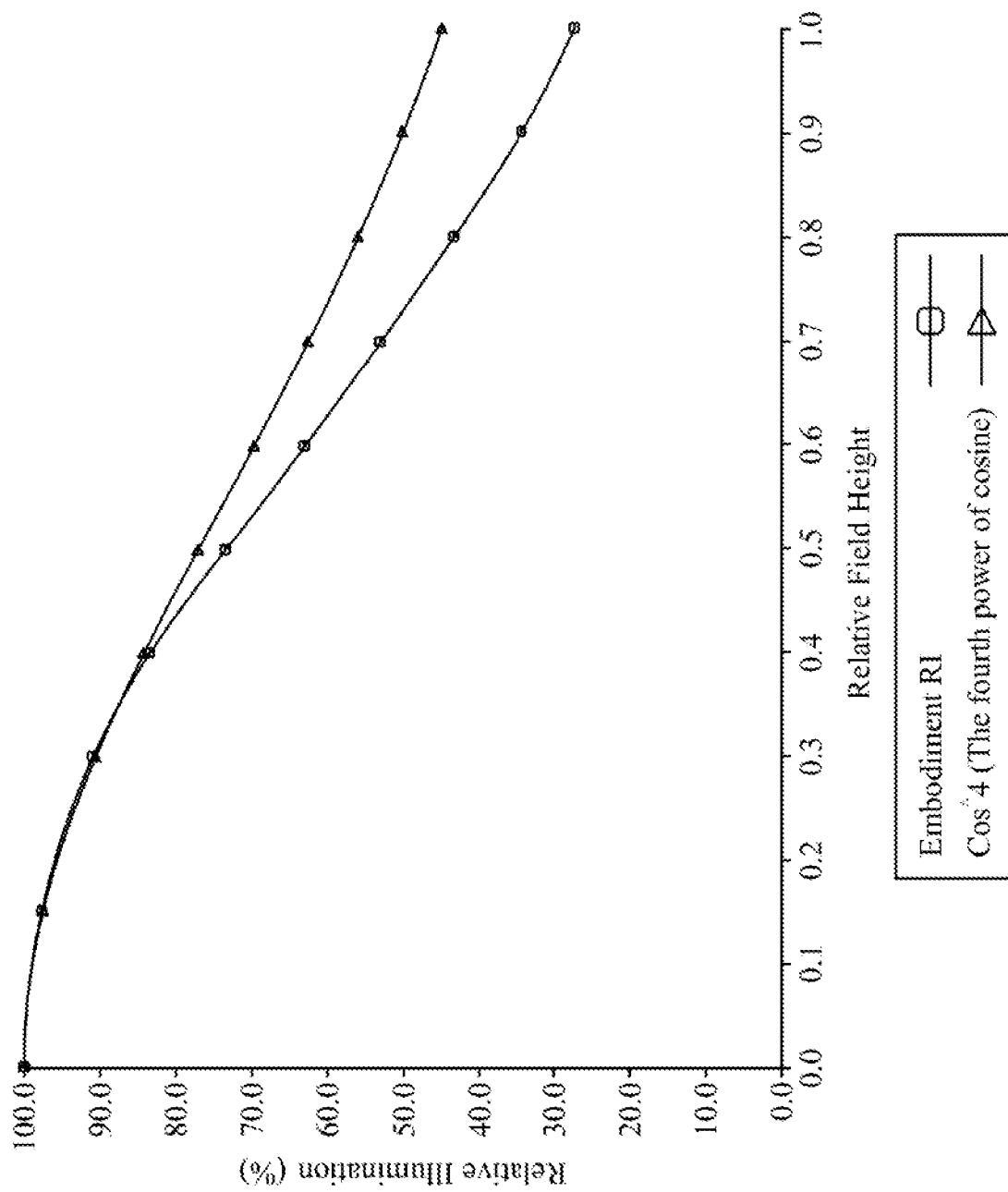
FIG. 3D is a numerical diagram of relative illuminance at each field of view on the image plane for an optical image capturing system of the third embodiment of the present invention.

Please refer to FIGS. 3A, 3B, 3C and 3D. FIG. 3A is a schematic view of an optical image capturing system of the third embodiment of the present invention. FIG. 3B shows the longitudinal spherical aberration curves, astigmatic field curves, and optical distortion curve of the optical image capturing system in order from left to right according to the third embodiment of the present invention. FIG. 3C is a transverse aberration diagram of the longest operation wavelength and the shortest operation wavelength for tangential fan and sagittal fan, in which the longest operation wavelength and the shortest operation wavelength pass through an margin of the entrance pupil and strike at the position of 0.7 field of view on the image plane, according to the third embodiment of the present invention. FIG. 3D is a numerical diagram of relative illuminance at each field of view on the image plane for an optical image capturing system of the third embodiment of the present invention. As shown in FIG. 3A, in order along an optical axis from an object side to an image side, the optical image capturing system 30 comprises a first lens 310, an aperture 300 a second lens 320, a third lens 330, a fourth lens 340, an IR-bandstop filter 370, an image plane 380 and an image-sensing device 390.

The first lens 310 has positive refractive power and is made of plastic. An object side 312 of the first lens 310 is a convex surface and an image side 314 of the first lens 310 is a concave surface. Both of the object side 312 and the image side 314 of the first lens 310 are aspheric. Both of the object side 312 and the image side 314 of the first lens 310 has one inflection point.

The second lens 320 has positive refractive power and is made of plastic. An object side 322 of the second lens 320 is a convex surface and an image side 324 of the second lens 320 is a convex surface. Both of the object side 322 and the image side 324 of the second lens 320 are aspheric. Both of the object side 322 and the image side 324 of the second lens 320 have one inflection point.

The third lens 330 has positive refractive power and is made of plastic. An object side 332 of the third lens 330 is a concave surface and an image side 334 of the third lens 330 is a convex surface. Both of the object side 332 and the image side 334 of the third lens 330 are aspheric. Both of the object side 332 and the image side 334 of the third lens 330 has one inflection point.

The fourth lens 340 has negative refractive power and is made of plastic. An object side 342 of the fourth lens 340 is convex a surface and an image side 344 of the fourth lens 340 is a concave surface. Both of the object side 342 and the image side 344 of the fourth lens 340 are aspheric. Both of the object side 342 and the image side 344 of the fourth lens 340 has one inflection point.

The IR-bandstop filter 370 is made of glass. The IR-bandstop filter 370 is disposed between the fourth lens 340 and the image plane 380, and does not affect the focal length of the optical image capturing system 30.

In the optical image capturing system 30 of the third embodiment, the first lens 310, the second lens 320 and the third lens 330 have positive refractive power. The focal lengths of the first lens 310, the second lens 320 and the third lens 330 are respectively expressed as f1, f2 and f3. The sum of the fp of all lenses with positive refractive power of the optical image capturing system 30 is ΣPP, and the following condition is satisfied: ΣPP=f1+f2+f3. Hereby, this configuration is helpful to distribute the positive refractive power of the single lens to other lenses with positive refractive power in an appropriate way to suppress the generation of noticeable aberrations in the propagating process of the incident light in the optical image capturing system 30.

In the optical image capturing system 30 of the third embodiment, a sum of the focal lengths of all lenses with negative refractive power is Σ NP, and the following condition is satisfied: ΣNP=f4.

Please refer to the following Table 5 and Table 6.

The detailed data of the optical image capturing system 30 of the third embodiment is as shown in Table 5.

TABLE 5

Lens Parameter for the Third Embodiment
f (focal length) = 1.3310 mm; f/HEP = 2.0;
HAF (half angle of view) = 37.5170 deg; tan (HAF) = 0.7678

| Surface No. | | Curvature Radius | Thickness (mm) | Material |
|---|---|---|---|---|
| 0 | Object | Plane | infinity | |
| 1 | First Lens | 0.83935305 | 0.175 | Plastic |
| 2 | | 0.779262354 | 0.085 | |
| 3 | Aperture | Plane | 0.050 | |
| 4 | Second Lens | 0.623234619 | 0.285 | Plastic |
| 5 | | −11.00170615 | 0.123 | |
| 6 | Third Lens | −0.364938387 | 0.175 | Plastic |
| 7 | | −0.410676892 | 0.050 | |
| 8 | Fourth Lens | 1.0692297 | 0.175 | Plastic |
| 9 | | 0.820249597 | 0.138 | |
| 10 | IR-bandstop Filter | Plane | 0.210 | BK7_SCHOTT |
| 11 | | Plane | 0.442 | |
| 12 | Image Plane | Plane | | |

| Surface No. | Refractive Index | Coefficient of Dispersion | Focal Length |
|---|---|---|---|
| 0 | | | |
| 1 | 1.584 | 29.88 | 238.535 |
| 2 | | | |
| 3 | | | |
| 4 | 1.545 | 55.96 | 1.089 |
| 5 | | | |
| 6 | 1.642 | 22.46 | 10.040 |
| 7 | | | |
| 8 | 1.642 | 22.46 | −7.515 |
| 9 | | | |
| 10 | 1.517 | 64.13 | |
| 11 | | | |
| 12 | | | |

Reference Wavelength: 555 nm; Shield Position: the 1st surface with effective aperture radius = 0.370 mm; the 5th surface with effective aperture radius = 0.350 mm

TABLE 6 coefficients of aspheric surfaces of the third embodiment
Table 6: Aspheric Coefficients

| | Surface No. | | | |
|---|---|---|---|---|
| | 1 | 2 | 4 | 5 |
| k | −1.559670E+01 | −3.285895E+01 | −3.283737E−01 | −2.715604E+01 |
| A4 | 2.960488E+00 | 5.065976E+00 | −7.176660E−01 | 3.614461E−01 |
| A6 | −8.781953E+01 | −1.155499E+02 | −5.059534E+01 | −7.045897E+01 |
| A8 | 2.168917E+03 | 1.873961E+02 | 2.209574E+03 | 1.490315E+03 |
| A10 | −3.808808E+04 | 4.119672E+04 | −6.239210E+04 | −2.783463E+04 |
| A12 | 4.172494E+05 | −9.858251E+05 | 9.875788E+05 | 2.549608E+05 |
| A14 | −2.731712E+06 | 1.068435E+07 | −9.081709E+06 | −1.110874E+06 |
| A16 | 9.752197E+06 | −5.730864E+07 | 4.401602E+07 | 2.625091E+06 |
| A18 | −1.459442E+07 | 1.229646E+08 | −8.582584E+07 | −4.104192E+06 |
| A20 | 1.874089E+01 | 0.000000E+00 | 0.000000E+00 | 0.000000E+00 |

| | Surface No. | | | |
|---|---|---|---|---|
| | 6 | 7 | 8 | 9 |
| k | −1.097425E+00 | −1.384866E+00 | −9.000000E+01 | −1.042971E+01 |
| A4 | 2.214305E+00 | −4.780890E+00 | −5.438650E+00 | −5.344102E+00 |
| A6 | −8.731178E+01 | 1.414294E+02 | 9.066051E+01 | 5.295146E+01 |
| A8 | 2.841182E+03 | −1.711255E+03 | −1.364068E+03 | −4.481013E+02 |
| A10 | −5.162307E+04 | 9.272611E+03 | 1.266697E+04 | 2.489477E+03 |
| A12 | 5.492447E+05 | 4.055356E+04 | −7.011162E+04 | −8.594433E+03 |
| A14 | −3.054910E+06 | −7.073760E+05 | 2.041429E+05 | 1.680325E+04 |
| A16 | 7.919499E+06 | 2.992540E+06 | −2.001005E+05 | −1.520673E+04 |
| A18 | −6.822180E+06 | −4.349295E+06 | −1.771508E+05 | 2.609779E+03 |
| A20 | 0.000000E+00 | 0.000000E+00 | 0.000000E+00 | 0.000000E+00 |

In the third embodiment, the presentation of the aspheric surface formula is similar to that in the first embodiment. Furthermore, the definitions of parameters in following tables are equal to those in the first embodiment, so the repetitious details will not be given here.

The following values for the conditions can be obtained from the data in Table 5 and Table 6.

| Third Embodiment (Primary reference wavelength = 555 nm) | | | | | |
|---|---|---|---|---|---|
| InRS41 | InRS42 | HVT41 | HVT42 | ODT % | TDT % |
| −0.06700 | −0.09200 | 0.20300 | 0.29700 | 1.30000 | 0.60800 |
| |f/f1| | |f/f2| | |f/f3| | |f/f4| | |f1/f2| | |f2/f3| |
| 0.00558 | 1.22222 | 0.13257 | 0.17711 | 219.04040 | 0.10847 |
| ΣPPR | ΣNPR | ΣPPR/\|ΣNPR\| | ΣPP | ΣNP | f1/ΣPP |
| 1.36037 | 0.17711 | 7.68084 | 249.66400 | −7.51500 | 0.95542 |

| Third Embodiment (Primary reference wavelength = 555 nm) | | | | | |
|---|---|---|---|---|---|
| f4/ΣNP | IN12/f | IN23/f | IN34/f | TP3/f | TP4/f |
| −0.14491 | 0.10143 | 0.09241 | 0.03757 | 0.13148 | 0.13148 |
| InTL | HOS | HOS/HOI | InS/HOS | InTL/HOS | ΣTP/InTL |
| 1.11700 | 1.90700 | 1.85506 | 0.86418 | 0.58574 | 0.72516 |
| (TP1 + IN12)/TP2 | (TP4 + IN34)/TP3 | TP1/TP2 | TP3/TP4 | | IN23/(TP2 + IN23 + TP3) |
| 1.08772 | 1.28571 | 0.61404 | 1.00000 | | 0.21098 |
| \|InRS41\|/TP4 | \|InRS42\|/TP4 | HVT42/HOI | HVT42/HOS | PhiA4/InTL | PhiA4/HOI |
| 0.3829 | 0.5257 | 0.2889 | 0.1557 | 1.0743 | 0.5837 |
| PhiA4 | PhiB | PhiC | PhiD | RI9 | PhiA4/HEP |
| 1.2 mm | 1.6 mm | 2.0 mm | 2.3 mm | 50% | 1.8032 |
| PSTA | PLTA | NSTA | NLTA | SSTA | SLTA |
| 0.002 mm | 0.008 mm | 0.010 mm | 0.003 mm | 0.004 mm | 0.004 mm |

The following values for the conditions can be obtained from the data in Table 5 and Table 6.

| Values Related to Inflection Point of Third Embodiment (Primary Reference Wavelength = 555 nm) | | | | | | | |
|---|---|---|---|---|---|---|---|
| HIF111 | 0.2660 | HIF111/HOI | 0.2588 | SGI111 | 0.0370 | \|SGI111\|/(\|SGI111\| + TP1) | 0.1745 |
| HIF121 | 0.1940 | HIF121/HOI | 0.1887 | SGI121 | 0.0200 | \|SGI121\|/(\|SGI121\| + TP1) | 0.1026 |
| HIF211 | 0.2270 | HIF211/HOI | 0.2208 | SGI211 | 0.0380 | \|SGI211\|/(\|SGI211\| + TP2) | 0.1176 |
| HIF221 | 0.3430 | HIF221/HOI | 0.3337 | SGI221 | −0.0490 | \|SGI221\|/(\|SGI221\| + TP2) | 0.1467 |
| HIF311 | 0.2590 | HIF311/HOI | 0.2519 | SGI311 | −0.0860 | \|SGI311\|/(\|SGI311\| + TP3) | 0.3295 |
| HIF321 | 0.2470 | HIF321/HOI | 0.2403 | SGI321 | −0.0730 | \|SGI321\|/(\|SGI321\| + TP3) | 0.2944 |
| HIF411 | 0.0950 | HIF411/HOI | 0.0924 | SGI411 | 0.0030 | \|SGI411\|/(\|SGI411\| + TP4) | 0.0169 |
| HIF421 | 0.1440 | HIF421/HOI | 0.1401 | SGI421 | 0.0100 | \|SGI421\|/(\|SGI421\| + TP4) | 0.0541 |

The numerical data related to the length of the outline curve is shown according to table 5 and table 6.

| Third Embodiment (Primary reference wavelength = 555 nm) | | | | | | |
|---|---|---|---|---|---|---|
| ARE | ½(HEP) | ARE value | ARE − ½(HEP) | 2(ARE/HEP) % | TP | ARE/TP (%) |
| 11 | 0.333 | 0.337 | 0.00406 | 101.22% | 0.175 | 192.42% |
| 12 | 0.333 | 0.334 | 0.00166 | 100.50% | 0.175 | 191.05% |
| 21 | 0.329 | 0.335 | 0.00624 | 101.90% | 0.285 | 117.73% |
| 22 | 0.333 | 0.339 | 0.00628 | 101.89% | 0.285 | 119.01% |
| 31 | 0.333 | 0.358 | 0.02516 | 107.56% | 0.175 | 204.48% |
| 32 | 0.333 | 0.353 | 0.02042 | 106.14% | 0.175 | 201.77% |
| 41 | 0.333 | 0.333 | 0.00028 | 100.08% | 0.175 | 190.26% |
| 42 | 0.333 | 0.333 | 0.00021 | 100.06% | 0.175 | 190.22% |
| ARS | EHD | ARS value | ARS − EHD | (ARS/EHD) % | TP | ARS/TP (%) |
| 11 | 0.370 | 0.374 | 0.004 | 101.14% | 0.175 | 213.83% |
| 12 | 0.335 | 0.337 | 0.002 | 100.66% | 0.175 | 192.77% |
| 21 | 0.329 | 0.335 | 0.006 | 101.90% | 0.285 | 117.73% |
| 22 | 0.350 | 0.358 | 0.008 | 102.36% | 0.285 | 125.79% |
| 31 | 0.366 | 0.392 | 0.026 | 107.17% | 0.175 | 224.16% |

-continued

Third Embodiment (Primary reference wavelength = 555 nm)

| 32 | 0.401 | 0.423 | 0.022 | 105.49% | 0.175 | 241.46% |
| 41 | 0.463 | 0.488 | 0.026 | 105.55% | 0.175 | 278.99% |
| 42 | 0.601 | 0.660 | 0.060 | 109.93% | 0.175 | 377.37% |

The Fourth Embodiment

Figure 4A:
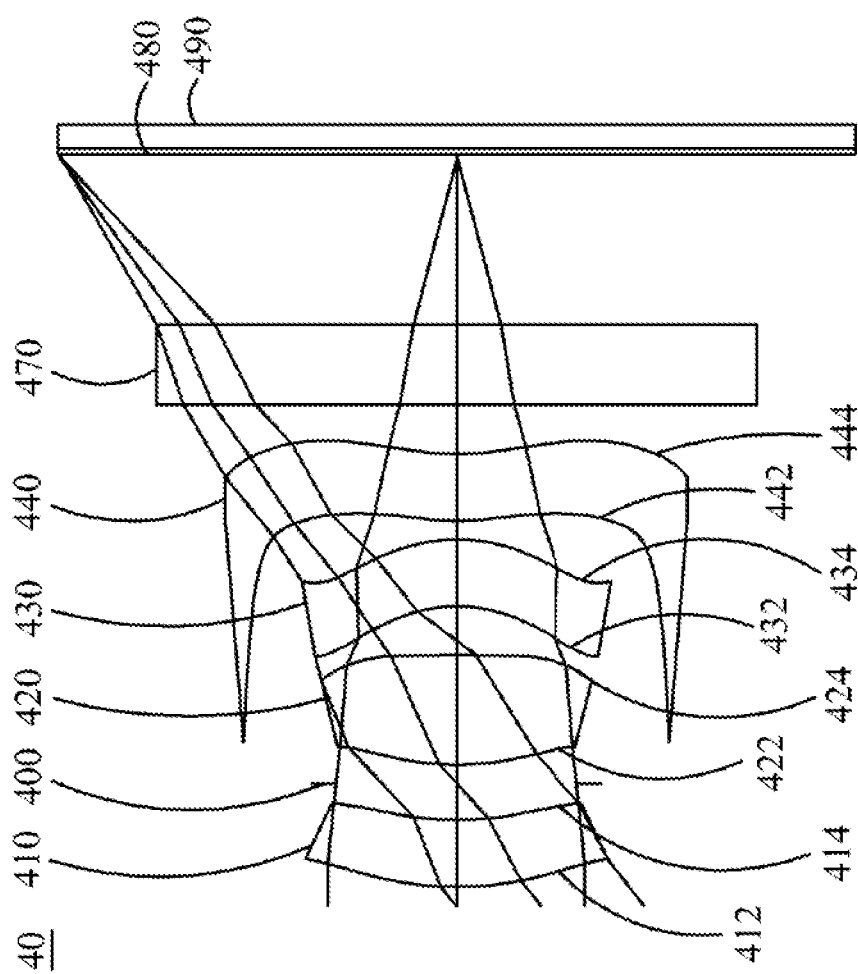
FIG. 4A is a schematic view of an optical image capturing system of a fourth embodiment of the present invention.
Figure 4B:
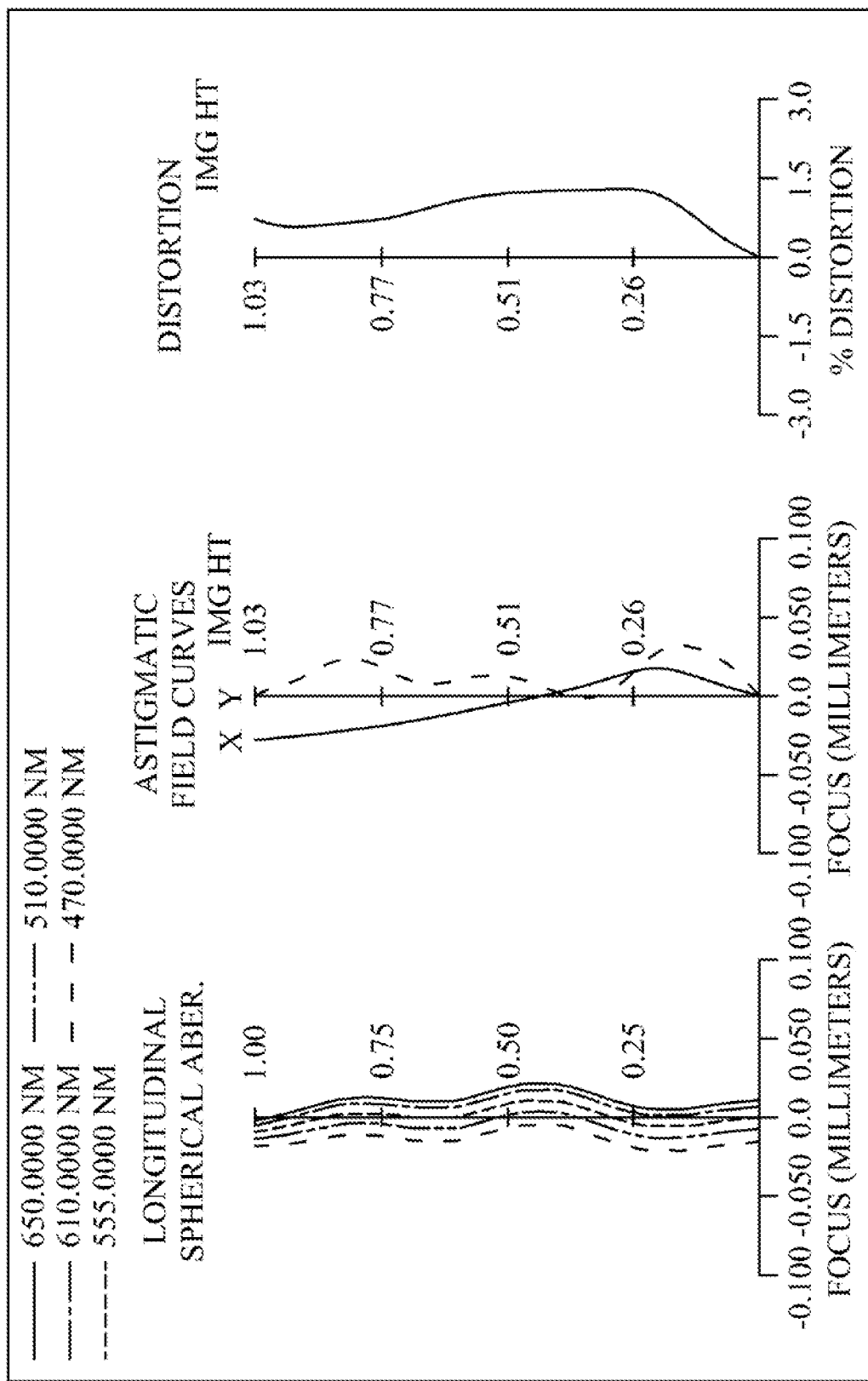
FIG. 4B shows curve diagrams of longitudinal spherical aberration, astigmatic field, and optical distortion of the optical image capturing system in order from left to right of the fourth embodiment of the present invention.
Figure 4D:
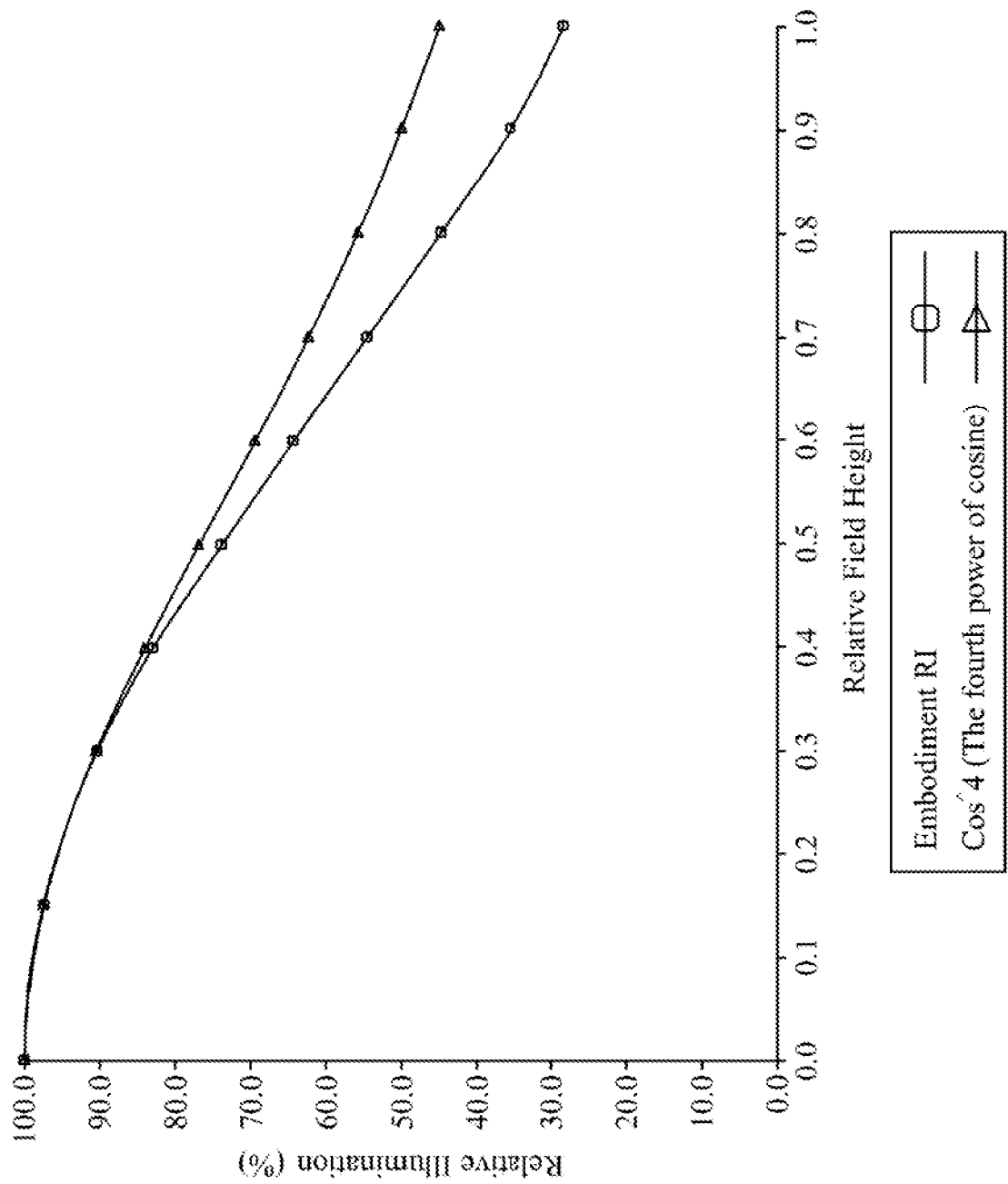
FIG. 4D is a numerical diagram of relative illuminance at each field of view on the image plane for an optical image capturing system of the fourth embodiment of the present invention.

Please refer to FIGS. 4A, 4B, 4C and 4D. FIG. 4A is a schematic view of an optical image capturing system of the fourth embodiment of the present invention. FIG. 4B shows the longitudinal spherical aberration curves, astigmatic field curves, and optical distortion curve of the optical image capturing system in order from left to right according to the fourth embodiment of the present invention. FIG. 4C is a transverse aberration diagram of the longest operation wavelength and the shortest operation wavelength for tangential fan and sagittal fan, in which the longest operation wavelength and the shortest operation wavelength pass through an margin of the entrance pupil and strike at the position of 0.7 field of view on the image plane, according to the fourth embodiment of the present invention. FIG. 4D is a numerical diagram of relative illuminance at each field of view on the image plane for an optical image capturing system of the fourth embodiment of the present invention. As shown in FIG. 4A, in order along an optical axis from an object side to an image side, the optical image capturing system 40 comprises a first lens 410, an aperture 400 a second lens 420, a third lens 430, a fourth lens 440, an IR-bandstop filter 470, an image plane 480 and an image-sensing device 490.

The first lens 410 has positive refractive power and is made of plastic. An object side 412 of the first lens 410 is a convex surface and an image side 414 of the first lens 410 is a concave surface. Both of the object side 412 and the image side 414 of the first lens 410 are aspheric. Both of the object side 412 and the image side 414 of the first lens 410 has one inflection point.

The second lens 420 has positive refractive power and is made of plastic. An object side 422 of the second lens 420 is a convex surface and an image side 424 of the second lens 420 is a convex surface. Both of the object side 422 and the image side 424 of the second lens 420 are aspheric. The object side 422 of the second lens 420 has one inflection point.

The third lens 430 has negative refractive power and is made of plastic. An object side 432 of the third lens 430 is a concave surface and an image side 434 of the third lens 430 is a convex surface. Both of the object side 432 and the image side 434 of the third lens 430 are aspheric. Both of the object side 432 and the image side 434 of the third lens 430 has one inflection point.

The fourth lens 440 has positive refractive power and is made of plastic. An object side 442 of the fourth lens 440 is convex a surface and an image side 444 of the fourth lens 440 is a concave surface. Both of the object side 442 and the image side 444 of the fourth lens 440 are aspheric. Both of the object side 442 and the image side 444 of the fourth lens 440 has one inflection point.

The IR-bandstop filter 470 is made of glass. The IR-bandstop filter 470 is disposed between the fourth lens 440 and the image plane 480, and does not affect the focal length of the optical image capturing system 40.

In the optical image capturing system 40 of the fourth embodiment, the first lens 410, the second lens 420 and the fourth lens 440 have positive refractive power. The focal lengths of the first lens 410, the second lens 420 and the fourth lens 440 are respectively expressed as f1, f2 and f4. The sum of the fp of all lenses with positive refractive power of the optical image capturing system 40 is ΣPP, and the following condition is satisfied: ΣPP=f1+f2+f4. Hereby, this configuration is helpful to distribute the positive refractive power of the single lens to other lenses with positive refractive power in an appropriate way to suppress the generation of noticeable aberrations in the propagating process of the incident light in the optical image capturing system 40.

In the optical image capturing system 40 of the fourth embodiment, the focal length of the third lens 430 are expressed as f3, a sum of the focal lengths of all lenses with negative refractive power is Σ NP, and the following condition is satisfied: ΣNP=f3.

Please refer to the following Table 7 and Table 8.

TABLE 7

Lens Parameter for the fourth Embodiment
f (focal length) = 1.3290 mm; f/HEP = 2.0;
HAF (half angle of view) = 37.5150 deg; tan (HAF) = 0.7677

| Surface No. | | Curvature Radius | Thickness (mm) | Material |
|---|---|---|---|---|
| 0 | Object | Plane | infinity | |
| 1 | First Lens | 0.796358327 | 0.175 | Plastic |
| 2 | | 0.752894203 | 0.095 | |
| 3 | Aperture | Plane | 0.050 | |
| 4 | Second Lens | 0.69002414 | 0.289 | Plastic |
| 5 | | −5.470145447 | 0.127 | |
| 6 | Third Lens | −0.375226684 | 0.175 | Plastic |
| 7 | | −0.480949837 | 0.050 | |
| 8 | Fourth Lens | 0.634776701 | 0.175 | Plastic |
| 9 | | 0.628050498 | 0.130 | |
| 10 | IR-bandstop Filter | Plane | 0.210 | BK7_SCHOTT |
| 11 | | Plane | 0.446 | |
| 12 | Image Plane | Plane | | |

| Surface No. | Refractive Index | Coefficient of Dispersion | Focal Length |
|---|---|---|---|
| 0 | | | |
| 1 | 1.584 | 29.88 | 47.93 |
| 2 | | | |
| 3 | | | |
| 4 | 1.545 | 55.96 | 1.14 |
| 5 | | | |
| 6 | 1.642 | 22.46 | −7.54 |
| 7 | | | |
| 8 | 1.642 | 22.46 | 9.92 |
| 9 | | | |
| 10 | 1.517 | 64.13 | |
| 11 | | | |
| 12 | | | |

Reference Wavelength: 555 nm; Shield Position: the 1st surface with effective aperture radius = 0.390 mm; the 5th surface with effective aperture radius = 0.350 mm

TABLE 8 coefficients of aspheric surfaces of the fourth embodiment
Table 8: Aspheric Coefficients

| | Surface No. | | | |
|---|---|---|---|---|
| | 1 | 2 | 4 | 5 |
| k | −1.559070E+01 | −3.277696E+01 | −1.338964E−01 | −2.644155E+01 |
| A4 | 3.931058E+00 | 6.407587E+00 | −7.455663E−01 | −3.112638E−01 |
| A6 | −1.040453E+02 | −1.208225E+02 | −4.905075E+01 | −7.316173E+01 |
| A8 | 2.548788E+03 | −4.252993E+01 | 2.152711E+03 | 1.536768E+03 |
| A10 | −4.367449E+04 | 4.938506E+04 | −6.180943E+04 | −3.005936E+04 |
| A12 | 4.647813E+05 | −1.098966E+06 | 9.823348E+05 | 3.189116E+05 |
| A14 | −2.944070E+06 | 1.140707E+07 | −9.044375E+06 | −1.714189E+06 |
| A16 | 1.013712E+07 | −5.908647E+07 | 4.382259E+07 | 4.420446E+06 |
| A18 | −1.459442E+07 | 1.229646E+08 | −8.582584E+07 | −4.104192E+06 |
| A20 | 1.874407E+01 | 0.000000E+00 | 0.000000E+00 | 0.000000E+00 |

| | Surface No. | | | |
|---|---|---|---|---|
| | 6 | 7 | 8 | 9 |
| k | −9.444825E−01 | −8.569895E−01 | −2.727253E+01 | −1.028315E+01 |
| A4 | 1.474769E+00 | −7.584700E+00 | −4.999799E+00 | −3.743632E+00 |
| A6 | −2.913984E+01 | 2.026719E+02 | 6.751631E+01 | 2.859772E+01 |
| A8 | 1.861605E+02 | −2.697091E+03 | −9.280684E+02 | −2.281186E+02 |
| A10 | −1.107176E+03 | 1.921504E+04 | 7.954824E+03 | 1.278101E+03 |
| A12 | 8.405416E+04 | −1.663989E+04 | −3.875688E+04 | −4.522034E+03 |
| A14 | −9.804138E+05 | −5.393357E+05 | 8.940373E+04 | 9.165264E+03 |
| A16 | 4.316120E+06 | 2.803448E+06 | −2.453740E+04 | −9.062636E+03 |
| A18 | −6.822180E+06 | −4.349295E+06 | −1.771508E+05 | 2.609779E+03 |
| A20 | 0.000000E+00 | 0.000000E+00 | 0.000000E+00 | 0.000000E+00 |

In the fourth embodiment, the presentation of the aspheric surface formula is similar to that in the first embodiment. Furthermore, the definitions of parameters in following tables are equal to those in the first embodiment, so the repetitious details will not be given here.

The following values for the conditions can be obtained from the data in Table 7 and Table 8.

| Fourth Embodiment (Primary reference wavelength = 555 nm) | | | | | |
|---|---|---|---|---|---|
| InRS41 | InRS42 | HVT41 | HVT42 | ODT % | TDT % |
| −0.04300 | −0.06200 | 0.26100 | 0.34000 | 1.30500 | 0.49200 |
| \|f/f1\| | \|f/f2\| | \|f/f3\| | \|f/f4\| | \|f1/f2\| | \|f2/f3\| |
| 0.02773 | 1.16477 | 0.17617 | 0.13399 | 42.00876 | 0.15125 |
| ΣPPR | ΣNPR | ΣPPR/\|ΣNPR\| | ΣPP | ΣNP | f1/ΣPP |
| 1.32648 | 0.17617 | 7.52969 | 58.99200 | −7.54400 | 0.81252 |
| f4/ΣNP | IN12/f | IN23/f | IN34/f | TP3/f | TP4/f |
| −0.15125 | 0.10910 | 0.09556 | 0.03762 | 0.13168 | 0.13168 |

| Fourth Embodiment (Primary reference wavelength = 555 nm) | | | | | |
|---|---|---|---|---|---|
| InTL | HOS | HOS/HOI | InS/HOS | InTL/HOS | ΣTP/InTL |
| 1.13600 | 1.92300 | 1.87062 | 0.85959 | 0.59074 | 0.71655 |
| (TP1 + IN12)/TP2 | (TP4 + IN34)/TP3 | TP1/TP2 | TP3/TP4 | | IN23/(TP2 + IN23 + TP3) |
| 1.10727 | 1.28571 | 0.60554 | 1.00000 | | 0.21489 |
| \|InRS41\|/TP4 | \|InRS42\|/TP4 | HVT42/HOI | HVT42/HOS | PhiA4/InTL | PhiA4/HOI |
| 0.2457 | 0.3543 | 0.3307 | 0.1768 | 1.1004 | 0.6080 |
| PhiA4 | PhiB | PhiC | PhiD | RI9 | PhiA4/HEP |
| 1.25 mm | 1.65 mm | 2.05 mm | 2.35 mm | 50% | 1.8811 |
| PSTA | PLTA | NSTA | NLTA | SSTA | SLTA |
| 0.00007 mm | 0.004 mm | 0.008 mm | −0.00001 mm | 0.005 mm | 0.005 mm |

The following values for the conditions can be obtained from the data in Table 7 and Table 8.

| Values Related to Inflection Point of Fourth Embodiment (Primary Reference Wavelength = 555 nm) | | | | | | | |
|---|---|---|---|---|---|---|---|
| HIF111 | 0.3010 | HIF111/HOI | 0.2928 | SGI111 | 0.0510 | \|SGI111\|/(\|SGI111\| + TP1) | 0.2257 |
| HIF121 | 0.2200 | HIF121/HOI | 0.2140 | SGI121 | 0.0280 | \|SGI121\|/(\|SGI121\| + TP1) | 0.1379 |
| HIF211 | 0.2190 | HIF211/HOI | 0.2130 | SGI211 | 0.0320 | \|SGI211\|/(\|SGI211\| + TP2) | 0.0997 |
| HIF311 | 0.2600 | HIF311/HOI | 0.2529 | SGI311 | −0.0870 | \|SGI311\|/(\|SGI311\| + TP3) | 0.3321 |

-continued

Values Related to Inflection Point of Fourth Embodiment
(Primary Reference Wavelength = 555 nm)

| | | | | | | | |
|---|---|---|---|---|---|---|---|
| HIF321 | 0.2570 | HIF321/HOI | 0.2500 | SGI321 | −0.0750 | \|SGI321\|/(\|SGI321\| + TP3) | 0.3000 |
| HIF411 | 0.1210 | HIF411/HOI | 0.1177 | SGI411 | 0.0090 | \|SGI411\|/(\|SGI411\| + TP4) | 0.0489 |
| HIF421 | 0.1620 | HIF421/HOI | 0.1576 | SGI421 | 0.0160 | \|SGI421\|/(\|SGI421\| + TP4) | 0.0838 |

The numerical data related to the length of the outline curve is shown according to table 7 and table 8.

Fourth Embodiment (Primary reference wavelength = 555 nm)

| ARE | ½(HEP) | ARE value | ARE − ½(HEP) | 2(ARE/HEP) % | TP | ARE/TP (%) |
|---|---|---|---|---|---|---|
| 11 | 0.332 | 0.339 | 0.00620 | 101.87% | 0.175 | 193.46% |
| 12 | 0.332 | 0.336 | 0.00327 | 100.98% | 0.175 | 191.78% |
| 21 | 0.321 | 0.326 | 0.00425 | 101.32% | 0.289 | 112.60% |
| 22 | 0.332 | 0.342 | 0.00955 | 102.87% | 0.289 | 118.23% |
| 31 | 0.332 | 0.360 | 0.02753 | 108.28% | 0.175 | 205.65% |
| 32 | 0.332 | 0.353 | 0.02089 | 106.28% | 0.175 | 201.85% |
| 41 | 0.332 | 0.333 | 0.00065 | 100.20% | 0.175 | 190.29% |
| 42 | 0.332 | 0.334 | 0.00172 | 100.52% | 0.175 | 190.90% |

| ARS | EHD | ARS value | ARS − EHD | (ARS/EHD) % | TP | ARS/TP (%) |
|---|---|---|---|---|---|---|
| 11 | 0.390 | 0.397 | 0.007 | 101.82% | 0.175 | 226.92% |
| 12 | 0.338 | 0.341 | 0.003 | 100.82% | 0.175 | 194.64% |
| 21 | 0.321 | 0.326 | 0.004 | 101.32% | 0.289 | 112.60% |
| 22 | 0.350 | 0.362 | 0.012 | 103.55% | 0.289 | 125.32% |
| 31 | 0.368 | 0.397 | 0.029 | 107.80% | 0.175 | 226.72% |
| 32 | 0.407 | 0.429 | 0.022 | 105.43% | 0.175 | 244.96% |
| 41 | 0.486 | 0.511 | 0.025 | 105.08% | 0.175 | 291.94% |
| 42 | 0.625 | 0.683 | 0.057 | 109.17% | 0.175 | 390.18% |

The Fifth Embodiment

Figure 5B:
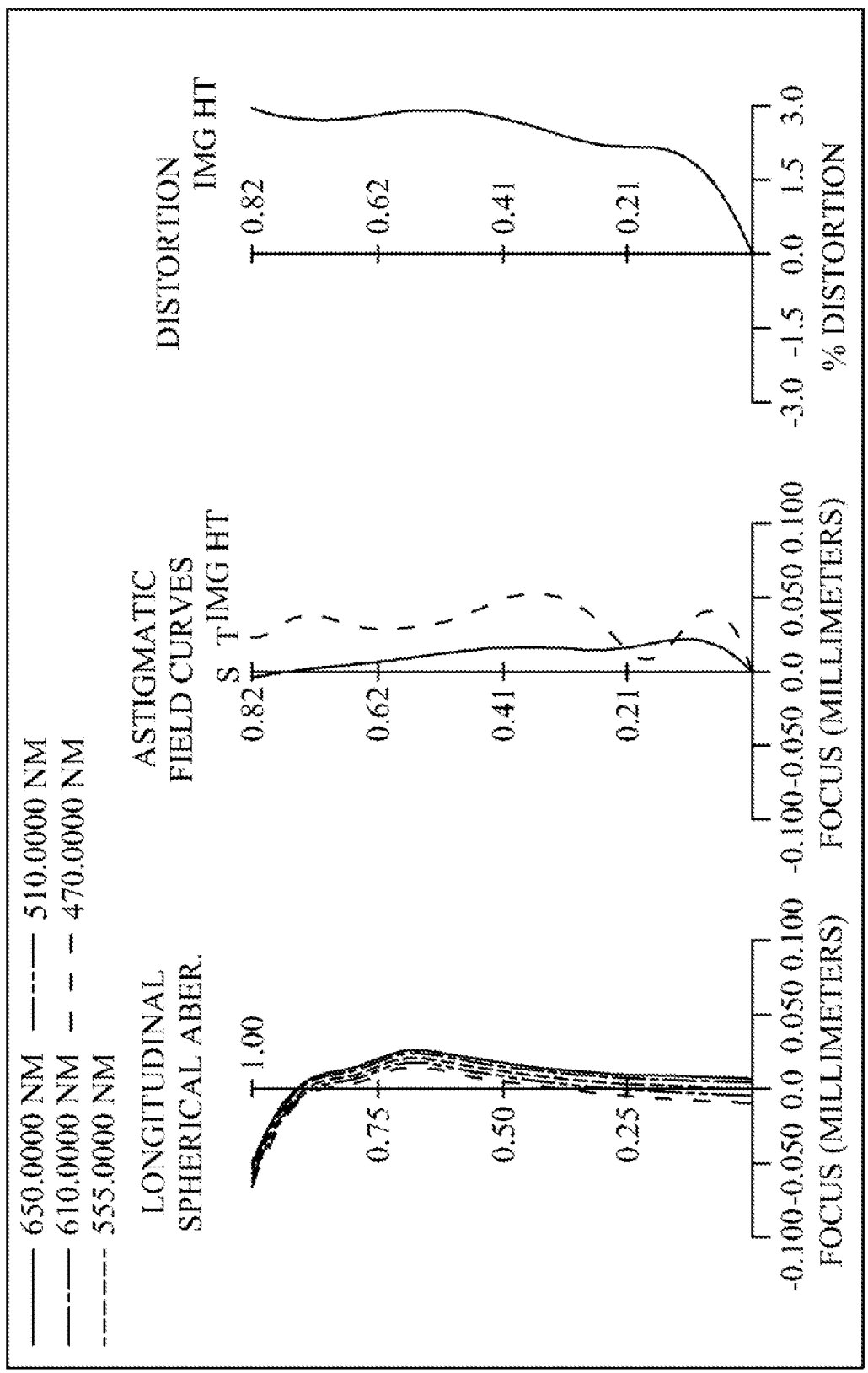
FIG. 5B shows curve diagrams of longitudinal spherical aberration, astigmatic field, and optical distortion of the optical image capturing system in order from left to right of the fifth embodiment of the present invention.
Figure 5C:
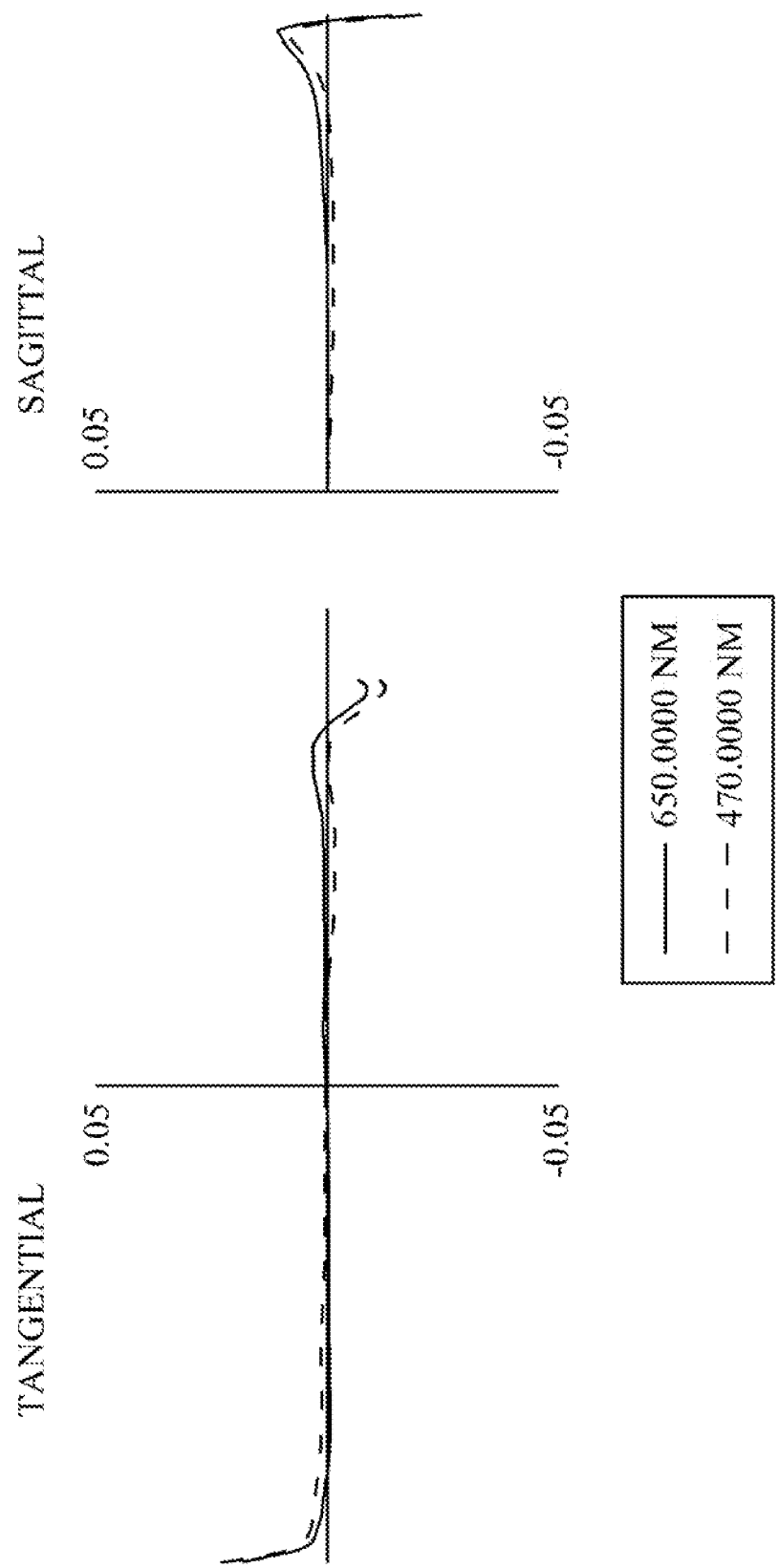
FIG. 5C is a transverse aberration diagram of the longest operation wavelength and the shortest operation wavelength for tangential fan and sagittal fan, in which the longest operation wavelength and the shortest operation wavelength pass through an margin of the entrance pupil and strike at the position of 0.7 field of view on the image plane, according to the fifth embodiment of the present invention.
Figure 5D:
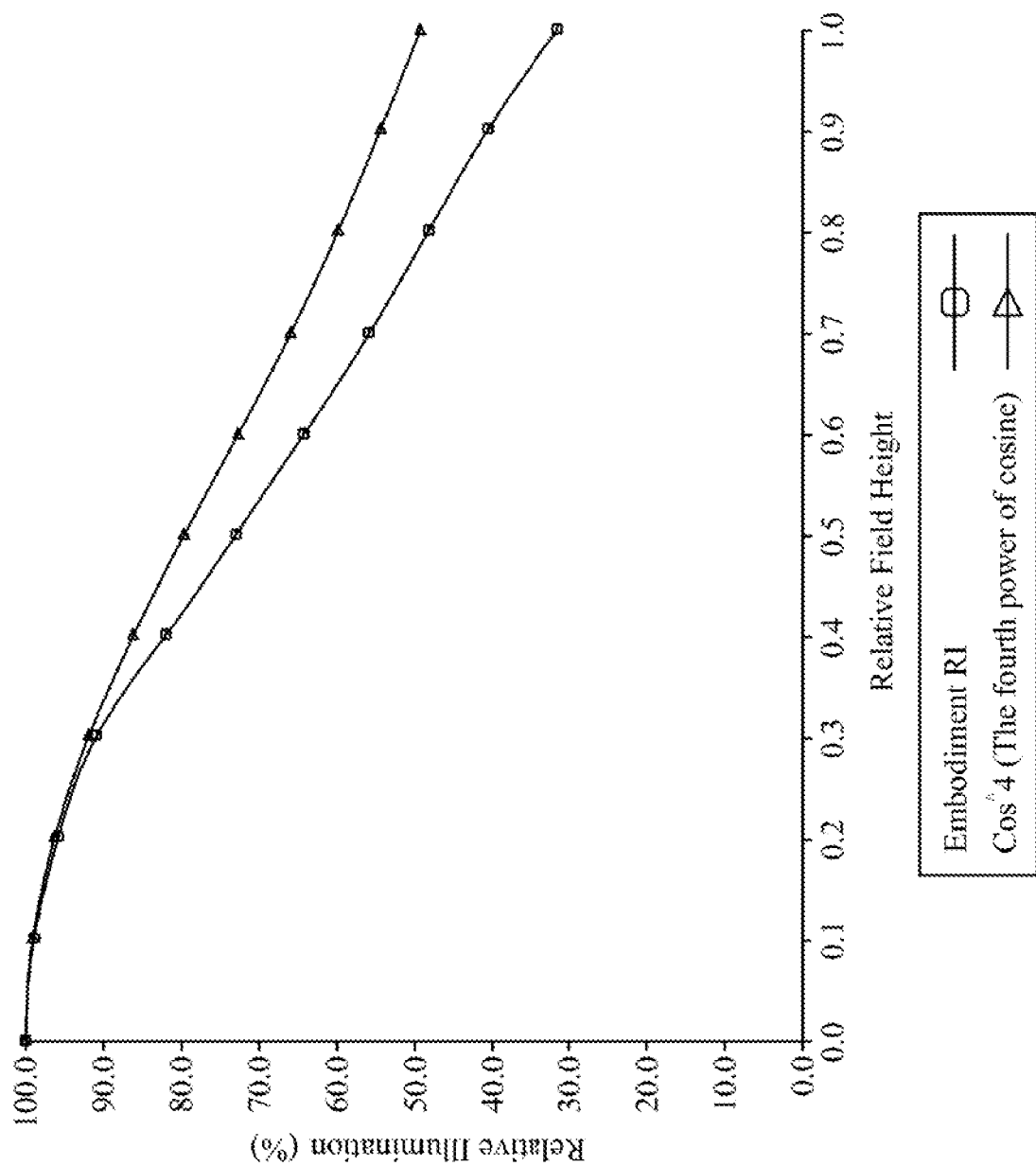
FIG. 5D is a numerical diagram of relative illuminance at each field of view on the image plane for an optical image capturing system of the fifth embodiment of the present invention.

Please refer to FIGS. 5A, 5B, 5C and 5D. FIG. 5A is a schematic view of an optical image capturing system of the fifth embodiment of the present invention. FIG. 5B shows the longitudinal spherical aberration curves, astigmatic field curves, and optical distortion curve of the optical image capturing system in order from left to right according to the fifth embodiment of the present invention. FIG. 5C is a transverse aberration diagram of the longest operation wavelength and the shortest operation wavelength for tangential fan and sagittal fan, in which the longest operation wavelength and the shortest operation wavelength pass through an margin of the entrance pupil and strike at the position of 0.7 field of view on the image plane, according to the fifth embodiment of the present invention. FIG. 5D is a numerical diagram of relative illuminance at each field of view on the image plane for an optical image capturing system of the fifth embodiment of the present invention. As shown in FIG. 5A, in order along an optical axis from an object side to an image side, the optical image capturing system 50 comprises a first lens 510, an aperture 500 a second lens 520, a third lens 530, a fourth lens 540, an IR-bandstop filter 570, an image plane 580 and an image-sensing device 590.

The first lens 510 has negative refractive power and is made of plastic. An object side 512 of the first lens 510 is a convex surface and an image side 514 of the first lens 510 is a concave surface. Both of the object side 512 and the image side 514 of the first lens 510 are aspheric. The object side 512 of the first lens 510 has one inflection point.

The second lens 520 has positive refractive power and is made of plastic. An object side 522 of the second lens 520 is a convex surface and an image side 524 of the second lens 520 is a convex surface. Both of the object side 522 and the image side 524 of the second lens 520 are aspheric.

The third lens 530 has positive refractive power and is made of plastic. An object side 532 of the third lens 530 is a concave surface and an image side 534 of the third lens 530 is a convex surface. Both of the object side 532 and the image side 534 of the third lens 530 are aspheric. The image side 534 of the third lens 530 has one inflection point.

The fourth lens 540 has negative refractive power and is made of plastic. An object side 542 of the fourth lens 540 is convex a surface and an image side 544 of the fourth lens 540 is a concave surface. Both of the object side 542 and the image side 544 of the fourth lens 540 are aspheric. Both of the object side 542 and the image side 544 of the fourth lens 540 has one inflection point.

The IR-bandstop filter 570 is made of glass. The IR-bandstop filter 570 is disposed between the fourth lens 540 and the image plane 580, and does not affect the focal length of the optical image capturing system 50.

In the optical image capturing system 50 of the fifth embodiment, the second lens 520 and the third lens 530 have positive refractive power. The focal lengths of the second lens 520 and the third lens 530 are respectively expressed as f2 and f3. The sum of the fp of all lenses with positive refractive power of the optical image capturing system 50 is ΣPP, and the following condition is satisfied: ΣPP=f2+f3. Hereby, this configuration is helpful to distribute the positive refractive power of the single lens to other lenses with positive refractive power in an appropriate way to suppress the generation of noticeable aberrations in the propagating process of the incident light in the optical image capturing system 50.

In the optical image capturing system 50 of the fifth embodiment, a sum of the focal lengths of all lenses with negative refractive power is Σ NP, and the following condition is satisfied: ΣNP=f1+f4.

Please refer to the following Table 9 and Table 10.

TABLE 9

Lens Parameter for the fifth Embodiment
f (focal length) = 1.038 mm; f/HEP = 2.0;
HAF (half angle of view) = 40.2351 deg; tan (HAF) = 0.8461

| Surface No. | | Curvature Radius | Thickness (mm) | Material |
|---|---|---|---|---|
| 0 | Object | 1E+18 | 600 | |
| 1 | First Lens | 1.318838134 | 0.151 | Plastic |
| 2 | | 1.199785426 | 0.080 | |
| 3 | Aperture | 1E+18 | −0.033 | |
| 4 | Second Lens | 0.888008072 | 0.266 | Plastic |
| 5 | | −0.836283021 | −0.021 | |
| 6 | | 1E+18 | 0.195 | |
| 7 | Third Lens | −0.230724801 | 0.179 | Plastic |
| 8 | | −0.252833943 | 0.023 | |
| 9 | Fourth Lens | 0.961626482 | 0.161 | Plastic |
| 10 | | 0.584762783 | 0.141 | |

TABLE 9-continued

Lens Parameter for the fifth Embodiment
f (focal length) = 1.038 mm; f/HEP = 2.0;
HAF (half angle of view) = 40.2351 deg; tan (HAF) = 0.8461

| 11 | IR-bandstop Filter | 1E+18 | 0.145 | BK_7 |
|---|---|---|---|---|
| 12 | | 1E+18 | 0.336 | |
| 13 | | 1E+18 | 0.000 | |
| 14 | Image Plane | 1E+18 | 0.000 | |

| Surface No. | Refractive Index | Coefficient of Dispersion | Focal Length |
|---|---|---|---|
| 0 | | | |
| 1 | 1.661 | 20.364 | −40.448 |
| 2 | | | |
| 3 | | | |
| 4 | 1.545 | 55.961 | 0.834 |
| 5 | | | |
| 6 | | | |
| 7 | 1.545 | 55.961 | 2.594 |
| 8 | | | |
| 9 | 1.661 | 20.364 | −2.697 |
| 10 | | | |
| 11 | 1.517 | 64.13 | |
| 12 | | | |
| 13 | | | |
| 14 | | | |

Reference Wavelength: 555 nm; Shield Position: the 6st surface with effective aperture radius = 0.261 mm; the 10th surface with effective aperture radius = 0.510 mm

TABLE 10 coefficients of aspheric surfaces of the fifth embodiment
Table 10: Aspheric Coefficients

| | Surface No. | | | |
|---|---|---|---|---|
| | 1 | 2 | 4 | 5 |
| k | −1.931550E+01 | −5.944256E−01 | 2.899251E+00 | −1.652042E−01 |
| A4 | 4.751055E−02 | 1.985239E−01 | 2.378219E+00 | −4.531571E+00 |
| A6 | −7.369787E−01 | 1.141525E+00 | −3.409528E+02 | 4.125321E+02 |
| A8 | −1.464233E+01 | 1.320343E+02 | 2.653552E+04 | −3.976522E+04 |
| A10 | −3.898305E+01 | 1.845076E+03 | −1.305270E+06 | 2.168067E+06 |
| A12 | 1.163348E+03 | −1.337007E+04 | 4.201857E+07 | −7.185274E+07 |
| A14 | 2.325617E+04 | −4.098113E+04 | −8.838875E+08 | 1.461296E+09 |
| A16 | −1.646115E+05 | 4.413052E+06 | 1.172744E+10 | −1.772179E+10 |
| A18 | 0.000000E+00 | 0.000000E+00 | −8.871474E+10 | 1.171847E+11 |
| A20 | 0.000000E+00 | 0.000000E+00 | 2.903080E+11 | −3.238002E+11 |

| | Surface No. | | | |
|---|---|---|---|---|
| | 7 | 8 | 9 | 10 |
| k | −2.129767E+00 | −3.535712E+00 | −2.991367E+02 | −1.652397E+00 |
| A4 | −9.144793E+00 | −3.994793E+01 | −3.470143E+00 | −1.319941E+01 |
| A6 | −1.078446E+03 | 1.892532E+03 | 1.603843E+02 | 1.852286E+02 |
| A8 | 9.151087E+04 | −6.900259E+04 | −6.615281E+03 | −2.230679E+03 |
| A10 | −4.008615E+06 | 1.677337E+06 | 1.514333E+05 | 1.958918E+04 |
| A12 | 1.079904E+08 | −2.670001E+07 | −2.187693E+06 | −1.240236E+05 |
| A14 | −1.835847E+09 | 2.744293E+08 | 2.010551E+07 | 5.484178E+05 |
| A16 | 1.919580E+10 | −1.747522E+09 | −1.140136E+08 | −1.594466E+06 |
| A18 | −1.123167E+11 | 6.253395E+09 | 3.628560E+08 | 2.709933E+06 |
| A20 | 2.802708E+11 | −9.593353E+09 | −4.954465E+08 | −2.019570E+06 |

In the fifth embodiment, the presentation of the aspheric surface formula is similar to that in the first embodiment. Furthermore, the definitions of parameters in following tables are equal to those in the first embodiment, so the repetitious details will not be given here.

The numerical data related to the length of the outline curve is shown according to table 9 and table 10.

| Fifth Embodiment (Primary reference wavelength = 555 nm) | | | | | |
|---|---|---|---|---|---|
| InRS41 | InRS42 | HVT41 | HVT42 | ODT % | TDT % |
| −0.05607 | −0.05495 | 0.19248 | 0.29032 | 4.66088 | 1.96699 |
| \|f/f1\| | \|f/f2\| | \|f/f3\| | \|f/f4\| | \|f1/f2\| | \|f2/f3\| |
| 0.02566 | 1.24493 | 0.40010 | 0.38484 | 48.51187 | 0.32138 |
| ΣPPR | ΣNPR | ΣPPR/\|ΣNPR\| | ΣPP | ΣNP | f1/ΣPP |
| 1.67069 | 0.38484 | 4.34120 | −37.01941 | −2.69714 | 1.09260 |
| f4/ΣNP | IN12/f | IN23/f | IN34/f | TP3/f | TP4/f |
| 1.00000 | 0.04615 | 0.16743 | 0.02211 | 0.17254 | 0.15490 |

| Fifth Embodiment (Primary reference wavelength = 555 nm) | | | | | |
|---|---|---|---|---|---|
| InTL | HOS | HOS/HOI | InS/HOS | InTL/HOS | ΣTP/InTL |
| 1.00103 | 1.62276 | 1.74490 | 0.85739 | 0.61687 | 0.75561 |
| (TP1 + IN12)/TP2 | (TP4 + IN34)/TP3 | TP1/TP2 | TP3/TP4 | | IN23/(TP2 + IN23 + TP3) |
| 0.74891 | 1.02590 | 0.56852 | 1.11389 | | 0.28102 |
| \|InRS41\|/TP4 | \|InRS42\|/TP4 | HVT42/HOI | HVT42/HOS | PhiA4/InTL | PhiA4/HOI |
| 0.3488 | 0.3418 | 0.3122 | 0.1789 | 1.0189 | 1.0968 |
| PhiA4 | PhiB | PhiC | PhiD | RI9 | PhiA4/HEP |
| 1.02 mm | 1.4026 mm | 1.4026 mm | 1.8 mm | 55% | 0.5197 |
| PSTA | PLTA | NSTA | NLTA | SSTA | SLTA |
| −0.012 mm | −0.007 mm | 0.023 mm | 0.019 mm | −0.021 mm | −0.014 mm |

The numerical data related to the length of the outline curve is shown according to table 9 and table 10.

| Values Related to Inflection Point of Fifth Embodiment (Primary Reference Wavelength = 555 nm) | | | | | |
|---|---|---|---|---|---|
| HIF111 | 0.3482 | HIF111/HOI | 0.3744 | SGI111 | 0.0368 | \|SGI111\|/(\|SGI111\| + TP1) | 0.1960 |
| HIF321 | 0.2908 | HIF321/HOI | 0.3126 | SGI321 | −0.1685 | \|SGI321\|/(\|SGI321\| + TP3) | 0.4848 |
| HIF411 | 0.0872 | HIF411/HOI | 0.0937 | SGI411 | 0.0026 | \|SGI411\|/(\|SGI411\| + TP4) | 0.0160 |
| HIF421 | 0.1344 | HIF421/HOI | 0.1445 | SGI421 | 0.0119 | \|SGI421\|/(\|SGI421\| + TP4) | 0.0689 |

The numerical data related to the length of the outline curve is shown according to table 9 and table 10.

| Fifth Embodiment (Primary reference wavelength = 555 nm) | | | | | | |
|---|---|---|---|---|---|---|
| ARE | ½(HEP) | ARE value | ARE − ½(HEP) | 2(ARE/HEP) % | TP | ARE/TP (%) |
| 11 | 0.260 | 0.260 | 0.00028 | 100.11% | 0.151 | 172.33% |
| 12 | 0.260 | 0.263 | 0.00278 | 101.07% | 0.151 | 173.99% |
| 21 | 0.260 | 0.264 | 0.00438 | 101.68% | 0.266 | 99.52% |
| 22 | 0.260 | 0.267 | 0.00685 | 102.64% | 0.266 | 100.45% |
| 31 | 0.260 | 0.312 | 0.05237 | 120.15% | 0.179 | 174.35% |
| 32 | 0.260 | 0.300 | 0.04057 | 115.61% | 0.179 | 167.77% |
| 41 | 0.260 | 0.259 | −0.00067 | 99.74% | 0.161 | 161.22% |
| 42 | 0.260 | 0.260 | 0.00049 | 100.19% | 0.161 | 161.94% |
| ARS | EHD | ARS value | ARS − EHD | (ARS/EHD) % | TP | ARS/TP (%) |
| 11 | 0.357 | 0.360 | 0.002 | 100.61% | 0.151 | 238.18% |
| 12 | 0.275 | 0.280 | 0.005 | 101.83% | 0.151 | 185.36% |
| 21 | 0.264 | 0.270 | 0.006 | 102.18% | 0.266 | 101.62% |
| 22 | 0.267 | 0.274 | 0.008 | 102.85% | 0.266 | 103.35% |
| 31 | 0.269 | 0.326 | 0.057 | 121.22% | 0.179 | 181.76% |
| 32 | 0.335 | 0.407 | 0.072 | 121.54% | 0.179 | 227.25% |
| 41 | 0.389 | 0.410 | 0.021 | 105.32% | 0.161 | 255.08% |
| 42 | 0.510 | 0.532 | 0.022 | 104.39% | 0.161 | 331.12% |

The Sixth Embodiment

Figure 6A:
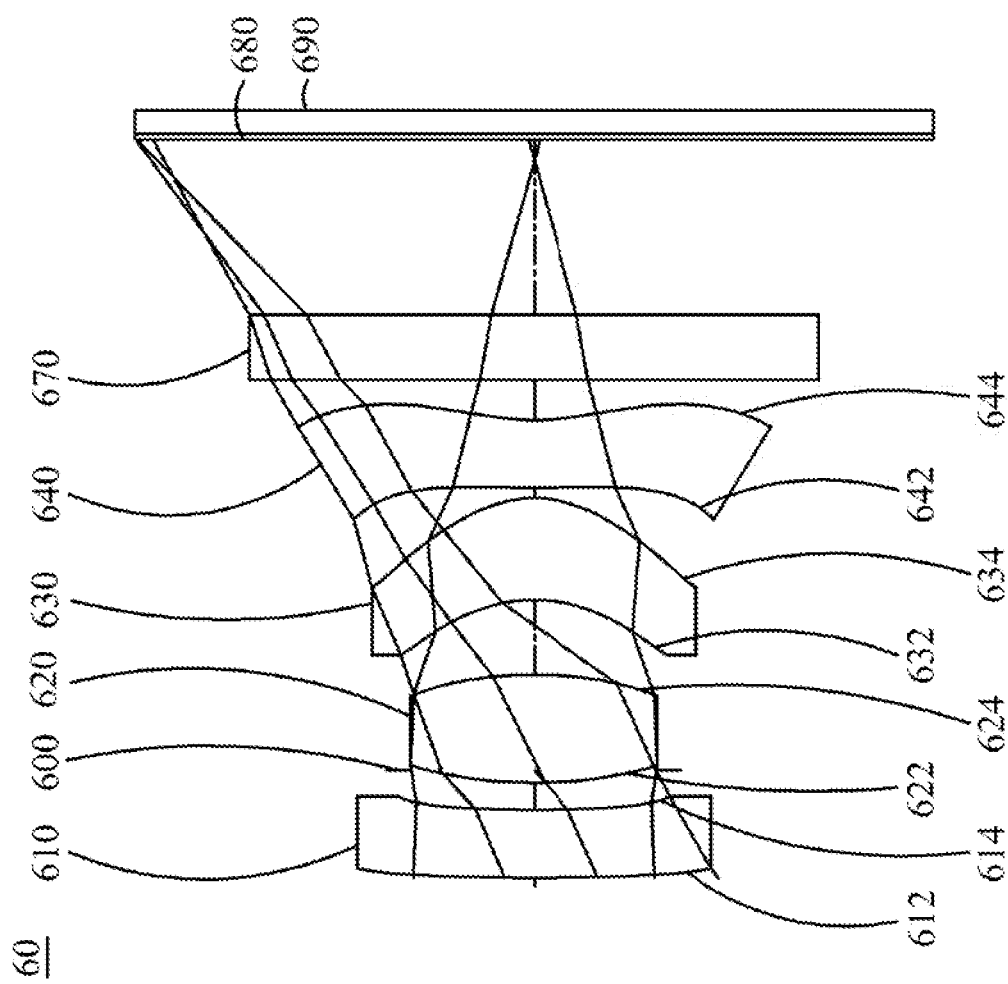
FIG. 6A is a schematic view of an optical image capturing system of a sixth embodiment of the present invention.
Figure 6B:
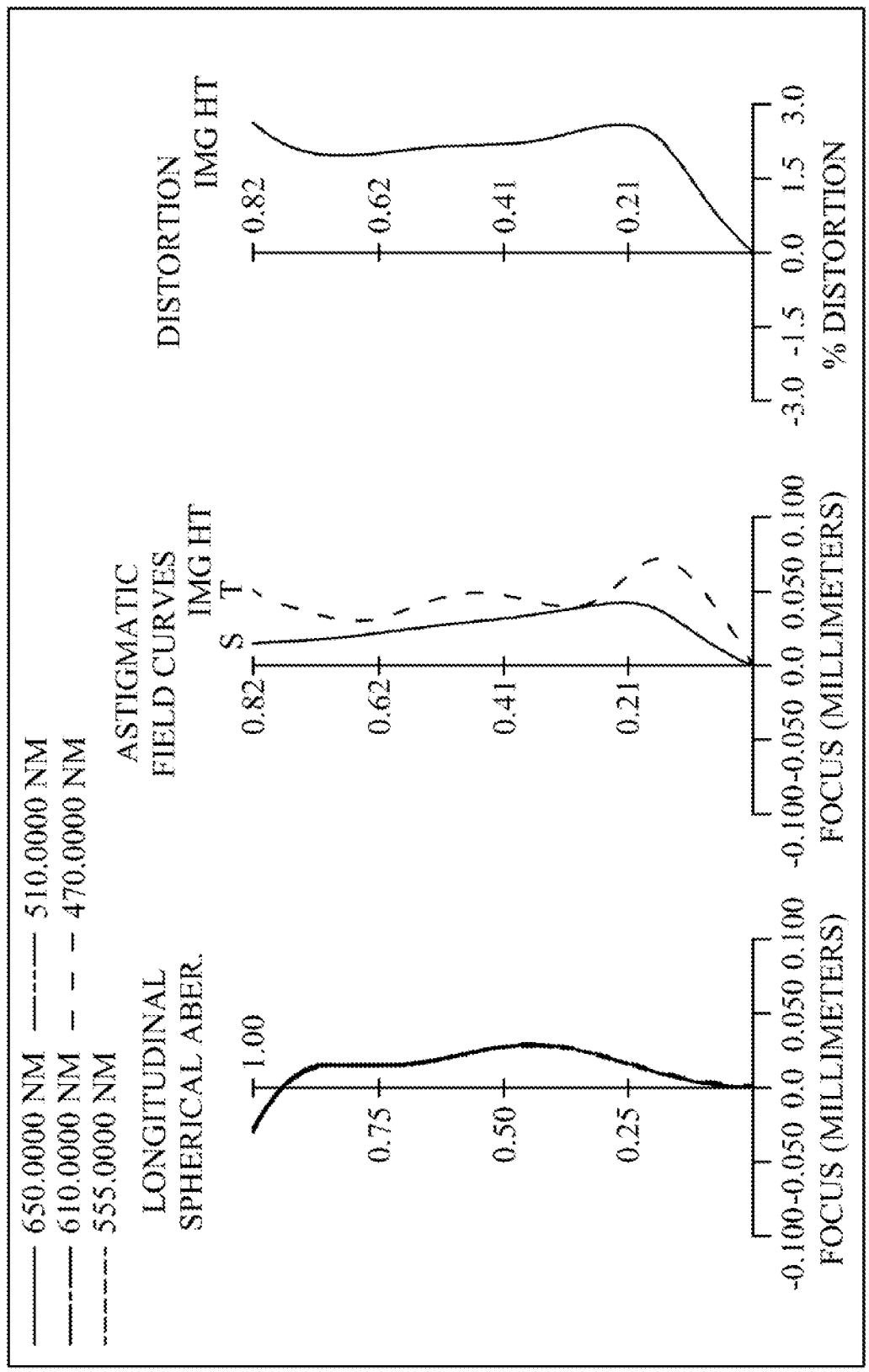
FIG. 6B shows curve diagrams of longitudinal spherical aberration, astigmatic field, and optical distortion of the optical image capturing system in order from left to right of the sixth embodiment of the present invention.
Figure 6C:
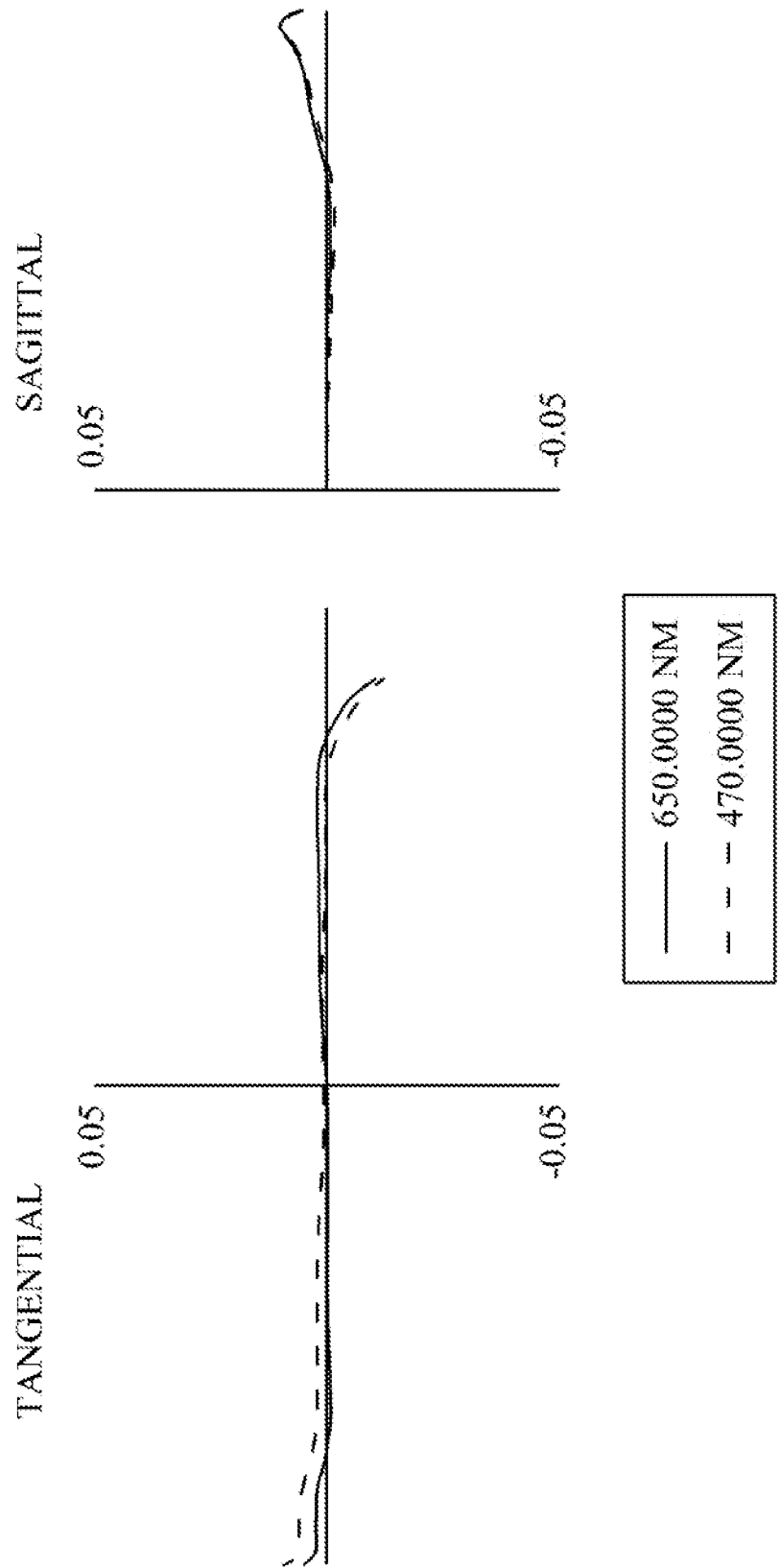
FIG. 6C is a transverse aberration diagram of the longest operation wavelength and the shortest operation wavelength for tangential fan and sagittal fan, in which the longest operation wavelength and the shortest operation wavelength pass through an margin of the entrance pupil and strike at the position of 0.7 field of view on the image plane, according to the sixth embodiment of the present invention.
Figure 6D:
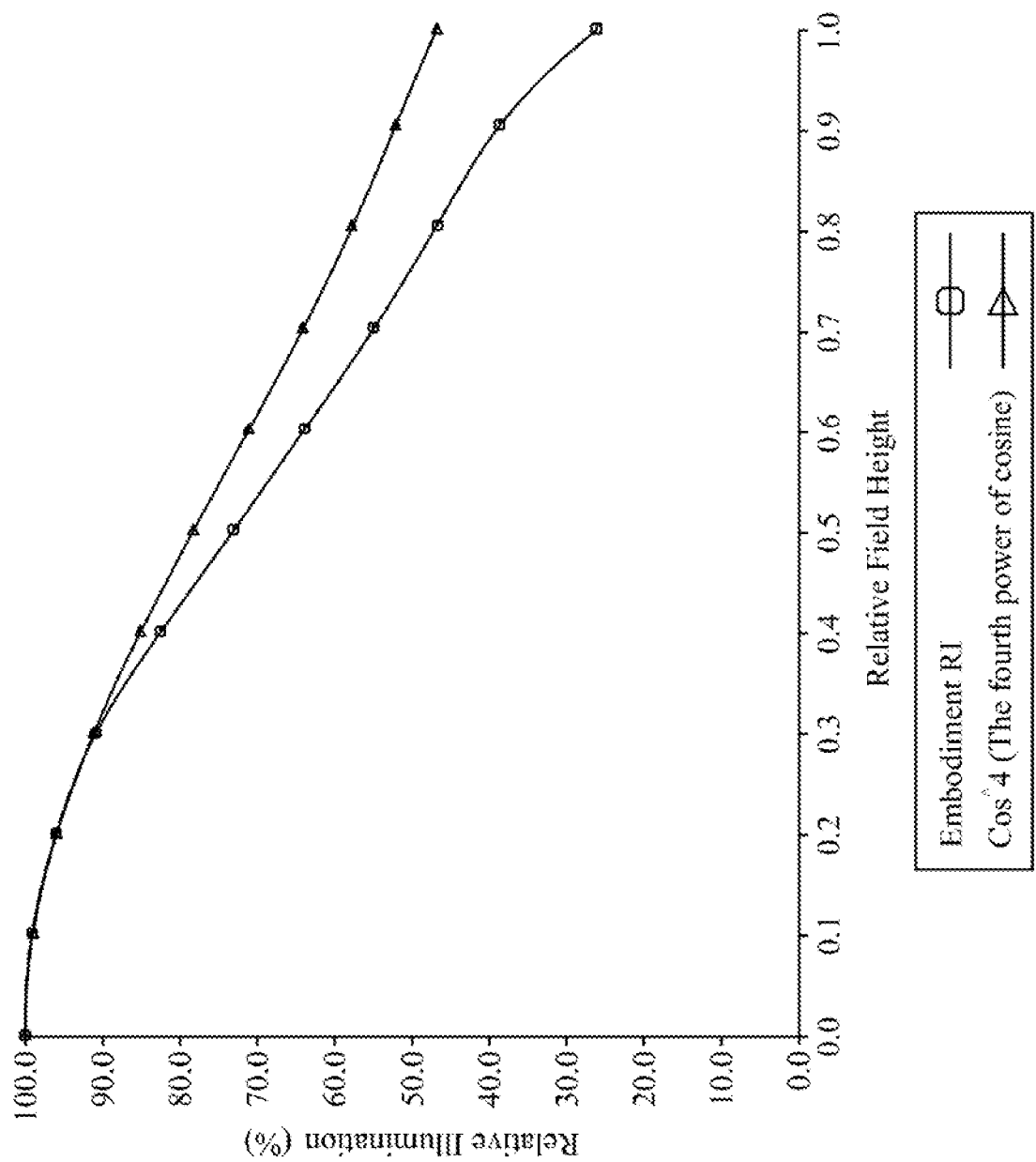
FIG. 6D is a numerical diagram of relative illuminance at each field of view on the image plane for an optical image capturing system of the sixth embodiment of the present invention.

Please refer to FIGS. 6A, 6B, 6C and 6D. FIG. 6A is a schematic view of an optical image capturing system of the sixth embodiment of the present invention. FIG. 6B shows the longitudinal spherical aberration curves, astigmatic field curves, and optical distortion curve of the optical image capturing system in order from left to right according to the sixth embodiment of the present invention. FIG. 6C is a transverse aberration diagram of the longest operation wavelength and the shortest operation wavelength for tangential fan and sagittal fan, in which the longest operation wavelength and the shortest operation wavelength pass through an margin of the entrance pupil and strike at the position of 0.7 field of view on the image plane, according to the sixth embodiment of the present invention. FIG. 6D is a numerical diagram of relative illuminance at each field of view on the image plane for an optical image capturing system of the sixth embodiment of the present invention. As shown in FIG. 6A, in order along an optical axis from an object side to an image side, the optical image capturing system 60 comprises a first lens 610, an aperture 600 a second lens 620, a third lens 630, a fourth lens 640, an IR-bandstop filter 670, an image plane 680 and an image-sensing device 690.

The first lens 610 has negative refractive power and is made of plastic. An object side 612 of the first lens 610 is a convex surface and an image side 614 of the first lens 610 is a concave surface. Both of the object side 612 and the image side 614 of the first lens 610 are aspheric.

The second lens 620 has positive refractive power and is made of plastic. An object side 622 of the second lens 620 is a convex surface and an image side 624 of the second lens 620 is a convex surface. Both of the object side 622 and the image side 624 of the second lens 620 are aspheric. The image side 624 of the second lens 620 has one inflection point.

The third lens 630 has positive refractive power and is made of plastic. An object side 632 of the third lens 630 is a concave surface and an image side 634 of the third lens 630 is a convex surface. Both of the object side 632 and the image side 634 of the third lens 630 are aspheric. Both of the object side 632 and the image side 634 of the third lens 630 has one inflection point.

The fourth lens 640 has negative refractive power and is made of plastic. An object side 642 of the fourth lens 640 is convex a surface and an image side 644 of the fourth lens 640 is a concave surface. Both of the object side 642 and the image side 644 of the fourth lens 640 are aspheric. Both of the object side 642 and the image side 644 of the fourth lens 640 has one inflection point.

The IR-bandstop filter 670 is made of glass. The IR-bandstop filter 670 is disposed between the fourth lens 640 and the image plane 680, and does not affect the focal length of the optical image capturing system 60.

In the optical image capturing system 60 of the sixth embodiment, the second lens 620 and the third lens 630 have positive refractive power. The focal lengths of the second lens 620 and the third lens 630 are respectively expressed as f2 and f3. The sum of the fp of all lenses with positive refractive power of the optical image capturing system 60 is ΣPP, and the following condition is satisfied: ΣPP=f2+f3. Hereby, this configuration is helpful to distribute the positive refractive power of the single lens to other lenses with positive refractive power in an appropriate way to suppress the generation of noticeable aberrations in the propagating process of the incident light in the optical image capturing system 60.

In the optical image capturing system 60 of the sixth embodiment, a sum of the focal lengths of all lenses with negative refractive power is Σ NP, and the following condition is satisfied: ΣNP=f1+f4.

Please refer to the following Table 11 and Table 12.

TABLE 11

Lens Parameter for the fifth Embodiment
f (focal length) = 0.9946 mm; f/HEP = 2.0;
HAF (half angle of view) = 41.2533 deg; tan (HAF) = 0.8771

| Surface No. | | Curvature Radius | Thickness (mm) | Material |
|---|---|---|---|---|
| 0 | Object | 1E+18 | 600 | |
| 1 | First Lens | 7.46846478 | 0.151 | Plastic |
| 2 | | 4.317793429 | 0.088 | |
| 3 | Aperture | 1E+18 | −0.028 | |
| 4 | Second Lens | 0.935843227 | 0.239 | Plastic |
| 5 | | −0.933344075 | 0.010 | |
| 6 | | 1E+18 | 0.157 | |
| 7 | Third Lens | −0.322918565 | 0.227 | Plastic |
| 8 | | −0.210895065 | 0.023 | |
| 9 | Fourth Lens | 4.506707493 | 0.150 | Plastic |
| 10 | | 0.414840736 | 0.090 | |
| 11 | IR-bandstop Filter | 1E+18 | 0.145 | BK_7 |
| 12 | | 1E+18 | 0.388 | |
| 13 | | 1E+18 | 0.000 | |
| 14 | Image Plane | 1E+18 | 0.000 | |

| Surface No. | Refractive Index | Coefficient of Dispersion | Focal Length |
|---|---|---|---|
| 0 | | | |
| 1 | 1.661 | 20.364 | −15.642 |
| 2 | | | |
| 3 | | | |
| 4 | 1.545 | 55.961 | 0.896 |
| 5 | | | |
| 6 | | | |
| 7 | 1.545 | 55.961 | 0.648 |
| 8 | | | |
| 9 | 1.661 | 20.364 | −0.695 |
| 10 | | | |
| 11 | 1.517 | 64.13 | |
| 12 | | | |
| 13 | | | |
| 14 | | | |

Reference Wavelength: 555 nm; Shield Position: the 6st surface with effective aperture radius = 0.265 mm

TABLE 12 coefficients of aspheric surfaces of the sixth embodiment
Table 12: Aspheric Coefficients

| | Surface No. | | | |
|---|---|---|---|---|
| | 1 | 2 | 4 | 5 |
| k | 2.572381E+02 | 2.223058E+02 | 1.904462E+00 | −2.099831E+00 |
| A4 | 4.569267E−01 | 1.680923E+00 | 1.808880E+00 | −2.384445E+00 |
| A6 | −1.346296E+00 | 9.798959E+00 | −1.079205E+02 | 2.286660E+01 |

TABLE 12-continued coefficients of aspheric surfaces of the sixth embodiment
Table 12: Aspheric Coefficients

| | | | | |
|---|---|---|---|---|
| A8  | 2.121674E+01  | −2.674219E+01 | 5.449604E+03  | −5.307268E+03 |
| A10 | 6.617868E+01  | −4.885509E+02 | −1.968503E+05 | 2.435205E+05 |
| A12 | −6.722692E+02 | 5.965613E+03  | 4.181697E+06  | −4.972932E+06 |
| A14 | −1.036815E+04 | 1.437029E+05  | −4.660329E+07 | 4.795142E+07 |
| A16 | 6.804141E+04  | −8.308662E+05 | 2.112434E+08  | −1.745943E+08 |
| A18 | 0.000000E+00  | 0.000000E+00  | 0.000000E+00  | 0.000000E+00 |
| A20 | 0.000000E+00  | 0.000000E+00  | 0.000000E+00  | 0.000000E+00 |

| | Surface No. | | | |
|---|---|---|---|---|
| | 7 | 8 | 9 | 10 |
| k   | −1.545752E+00 | −4.669869E+00 | 3.643159E+01  | −1.345056E+01 |
| A4  | −5.986753E+00 | −2.322068E+01 | −4.368014E+00 | −4.463185E+00 |
| A6  | −5.532782E+01 | 4.773595E+02  | 1.821189E+01  | 3.295984E+01 |
| A8  | 7.180106E+03  | −7.713606E+03 | −2.098946E+02 | −2.343704E+02 |
| A10 | −3.046991E+05 | 8.493639E+04  | 7.784101E+02  | 1.007289E+03 |
| A12 | 6.619474E+06  | −5.844502E+05 | 1.003698E+02  | −2.254853E+03 |
| A14 | −6.258719E+07 | 2.371643E+06  | −3.542943E+03 | 1.303148E+03 |
| A16 | 1.680202E+07  | −4.384066E+06 | −4.678203E+04 | 4.409045E+02 |
| A18 | 3.817877E+09  | 1.181835E+06  | −1.299365E+06 | 1.202425E+04 |
| A20 | −1.909590E+10 | −1.795783E+06 | 7.031548E+06  | −2.133442E+04 |

In the sixth embodiment, the presentation of the aspheric surface formula is similar to that in the first embodiment. Furthermore, the definitions of parameters in following tables are equal to those in the first embodiment, so the repetitious details will not be given here.

The numerical data related to the length of the outline curve is shown according to table 11 and table 12.

Sixth Embodiment (Primary reference wavelength = 555 nm)

| InRS41 | InRS42 | HVT41 | HVT42 | ODT % | TDT % |
|---|---|---|---|---|---|
| −0.08490 | −0.03269 | 0.11758 | 0.30304 | 4.94835 | 2.97889 |

| |f/f1| | |f/f2| | |f/f3| | |f/f4| | |f1/f2| | |f2/f3| |
|---|---|---|---|---|---|
| 0.06358 | 1.11017 | 1.53450 | 1.43093 | 17.45990 | 1.38222 |

| ΣPPR | ΣNPR | ΣPPR/|ΣNPR| | ΣPP | ΣNP | f1/ΣPP |
|---|---|---|---|---|---|
| 2.70825 | 1.43093 | 1.89264 | −14.09806 | −0.69506 | 1.10952 |

| f4/ΣNP | IN12/f | IN23/f | IN34/f | TP3/f | TP4/f |
|---|---|---|---|---|---|
| 1.00000 | 0.06098 | 0.16739 | 0.02309 | 0.22858 | 0.15043 |

Sixth Embodiment (Primary reference wavelength = 555 nm)

| InTL | HOS | HOS/HOI | InS/HOS | InTL/HOS | ΣTP/InTL |
|---|---|---|---|---|---|
| 1.01692 | 1.63914 | 1.76252 | 0.85399 | 0.62040 | 0.75407 |

| (TP1 + IN12)/TP2 | (TP4 + IN34)/TP3 | TP1/TP2 | TP3/TP4 | IN23/(TP2 + IN23 + TP3) |
|---|---|---|---|---|
| 0.88517 | 0.75909 | 0.63138 | 1.51957 | 0.26308 |

| |InRS41|/TP4 | |InRS42|/TP4 | HVT42/HOI | HVT42/HOS | PhiA4/InTL | PhiA4/HOI |
|---|---|---|---|---|---|
| 0.5675 | 0.2185 | 0.3258 | 0.1849 | 1.0129 | 1.1075 |

| PhiA4 | PhiB | PhiC | PhiD | RI9 | PhiA4/HEP |
|---|---|---|---|---|---|
| 1.030 mm | 1.4026 mm | 1.4026 mm | 1.8 mm | 50% | 2.0712 |

| PSTA | PLTA | NSTA | NLTA | SSTA | SLTA |
|---|---|---|---|---|---|
| −0.017 mm | −0.015 mm | 0.006 mm | 0.002 mm | 0.009 mm | 0.010 mm |

The numerical data related to the length of the outline curve is shown according to table 11 and table 12.

Values Related to Inflection Point of Sixth Embodiment (Primary Reference Wavelength = 555 nm)

| | | | | | | |
|---|---|---|---|---|---|---|
| HIF221 | 0.2508 | HIF221/HOI | 0.2696 | SGI221 | −0.0441 | |SGI221|/(|SGI221| + TP2) | 0.1557 |
| HIF311 | 0.2356 | HIF311/HOI | 0.2533 | SGI311 | −0.0934 | |SGI311|/(|SGI311| + TP3) | 0.2913 |
| HIF321 | 0.2839 | HIF321/HOI | 0.3053 | SGI321 | −0.1545 | |SGI321|/(|SGI321| + TP3) | 0.4046 |
| HIF411 | 0.0669 | HIF411/HOI | 0.0719 | SGI411 | 0.0004  | |SGI411|/(|SGI411| + TP4) | 0.0027 |
| HIF421 | 0.1329 | HIF421/HOI | 0.1429 | SGI421 | 0.0157  | |SGI421|/(|SGI421| + TP4) | 0.0952 |

The numerical data related to the length of the outline curve is shown according to table 11 and table 12.

| Sixth Embodiment (Primary reference wavelength = 555 nm) | | | | | | |
|---|---|---|---|---|---|---|
| ARE | ½(HEP) | ARE value | ARE − ½(HEP) | 2(ARE/HEP) % | TP | ARE/TP (%) |
| 11 | 0.249 | 0.249 | 0.00011 | 100.05% | 0.151 | 165.11% |
| 12 | 0.249 | 0.250 | 0.00126 | 100.51% | 0.151 | 165.87% |
| 21 | 0.249 | 0.252 | 0.00349 | 101.40% | 0.239 | 105.66% |
| 22 | 0.249 | 0.254 | 0.00542 | 102.18% | 0.239 | 106.47% |
| 31 | 0.249 | 0.276 | 0.02654 | 110.66% | 0.227 | 121.20% |
| 32 | 0.249 | 0.283 | 0.03437 | 113.80% | 0.227 | 124.65% |
| 41 | 0.249 | 0.249 | 0.00044 | 100.18% | 0.150 | 166.73% |
| 42 | 0.249 | 0.251 | 0.00239 | 100.96% | 0.150 | 168.03% |
| ARS | EHD | ARS value | ARS − EHD | (ARS/EHD) % | TP | ARS/TP (%) |
| 11 | 0.376 | 0.377 | 0.001 | 100.25% | 0.151 | 250.12% |
| 12 | 0.284 | 0.287 | 0.003 | 101.19% | 0.151 | 190.21% |
| 21 | 0.258 | 0.261 | 0.003 | 101.28% | 0.239 | 109.19% |
| 22 | 0.269 | 0.276 | 0.007 | 102.53% | 0.239 | 115.45% |
| 31 | 0.276 | 0.308 | 0.032 | 111.50% | 0.227 | 135.60% |
| 32 | 0.339 | 0.404 | 0.065 | 119.09% | 0.227 | 177.65% |
| 41 | 0.382 | 0.407 | 0.025 | 106.58% | 0.150 | 272.33% |
| 42 | 0.515 | 0.531 | 0.017 | 103.21% | 0.150 | 355.13% |

Although the present invention is disclosed via the aforementioned embodiments, those embodiments do not serve to limit the scope of the present invention. A person skilled in the art may perform various alterations and modifications to the present invention without departing from the spirit and the scope of the present invention. Hence, the scope of the present invention should be defined by the following appended claims.

Despite the fact that the present invention is specifically presented and illustrated with reference to the exemplary embodiments thereof, it should be obvious to a person skilled in the art that, various modifications to the forms and details of the present invention may be performed without departing from the scope and spirit of the present invention defined by the following claims and equivalents thereof.

What is claimed is:

1. An optical image capturing system, in order along an optical axis from an object side to an image side, comprising:
 a first lens with refractive power;
 a second lens with positive refractive power;
 a third lens with refractive power;
 a fourth lens with refractive power; and
 an image plane, wherein the optical image capturing system comprises the four lenses with refractive power, at least one lens among the third lens to the fourth lens has positive refractive power, focal lengths of the four lenses are expressed as f1, f2, f3 and f4, respectively, a focal length of the optical image capturing system is denoted by f, and an entrance pupil diameter of the optical image capturing system is denoted by HEP, a distance on the optical axis from an object side of the first lens to the image plane is denoted by HOS, a distance on the optical axis from the object side of the first lens to an image side of the fourth lens is denoted by InTL, a maximum effective diameter of the image side of the fourth lens is denoted by PhiA4, with a point on any one surface of any one of the four lenses which crosses the optical axis defined as a first starting point, a length of an outline curve from the first starting point to a first coordinate point of vertical height with a distance from the optical axis to a half entrance pupil diameter on the surface along an outline of the surface is denoted by ARE, and the following conditions are satisfied: 1.2≤f/HEP≤10; 0.5≤HOS/f≤7; 0<PhiA4/InTL≤1.1 and 0.1≤2(ARE/HEP)≤2.0.

2. The optical image capturing system of claim 1, wherein a distance on the optical axis between the first lens and the second lens is denoted by IN12, a distance on the optical axis between the second lens and the third lens is denoted by IN23, and the following condition is satisfied: IN23>IN12.

3. The optical image capturing system of claim 1, wherein TV distortion of the optical image capturing system when forming image is denoted by TDT, a maximum image height of visible spectrum perpendicular to the optical axis on the image plane is denoted by HOI, a lateral aberration of the longest operation wavelength of visible light of a positive tangential fan of the optical image capturing system passing through a margin of an entrance pupil and incident at the image plane by 0.7 HOI is denoted by PLTA, a lateral aberration of the shortest operation wavelength of visible light of the positive tangential fan of the optical image capturing system passing through the margin of the entrance pupil and incident at the image plane by 0.7 HOI is denoted by PSTA, a lateral aberration of the longest operation wavelength of visible light of a negative tangential fan of the optical image capturing system passing through the margin of the entrance pupil and incident at the image plane by 0.7 HOI is denoted by NLTA, a lateral aberration of the shortest operation wavelength of visible light of the negative tangential fan of the optical image capturing system passing through the margin of the entrance pupil and incident at the image plane by 0.7 HOI is denoted by NSTA, a lateral aberration of the longest operation wavelength of visible light of a sagittal fan of the optical image capturing system passing through the margin of the entrance pupil and incident at the image plane by 0.7 HOI is denoted by SLTA, a lateral aberration of the shortest operation wavelength of visible light of the sagittal fan of the optical image capturing system passing through the margin of the entrance pupil and incident at the image plane by 0.7 HOI is denoted by SSTA, and the following conditions are satisfied: PLTA≤100 μm; PSTA≤100 μm; NLTA≤100 μm; NSTA≤100 μm; SLTA≤100 μm; and SSTA≤100 μm; |TDT|<100%.

4. The optical image capturing system of claim 1, wherein an maximum effective half diameter of any one surface on the single lens among the four lenses is denoted by EHD, with a point on any one surface of any one of the four lenses which crosses the optical axis defined as the first starting point, the maximum effective half diameter position of the surface along the outline of the surface defined as a first final point, a length of outline curve from the first starting point to the first final point is ARS, and the following condition is satisfied: $0.1 \leq ARS/EHD \leq 2.0$.

5. The optical image capturing system of claim 1, wherein a half maximum angle of view of the optical image capturing system is denoted by HAF, and the following condition is satisfied: $0 \deg < HAF \leq 50 \deg$.

6. The optical image capturing system of claim 1, wherein with a point on the object side of the fourth lens which crosses the optical axis defined as a second starting point, a length of an outline curve from the second starting point to a second coordinate point of vertical height with a distance from the optical axis to the half entrance pupil diameter on the surface along an outline of the surface is denoted by ARE41, with a point on the image side of the fourth lens which crosses the optical axis defined as a third starting point, a length of an outline curve from the third starting point to a third coordinate point of vertical height with a distance from the optical axis to the half entrance pupil diameter on the surface along an outline of the surface is denoted by ARE42, a thickness of the fourth lens on the optical axis is denoted by TP4, and the following conditions are satisfied: $0.5 \leq ARE41/TP4 \leq 20$; and $0.5 \leq ARE42/TP4 \leq 20$.

7. The optical image capturing system of claim 1, wherein the following condition is satisfied: $0 < PhiA4/HEP \leq 3.0$.

8. The optical image capturing system of claim 1, wherein the optical image capturing system has a maximum image height HOI which is perpendicular to the optical axis on the image plane, and the following condition is satisfied: $0 < PhiA4/2HOI \leq 1.0$.

9. The optical image capturing system of claim 1, further comprising an aperture, wherein a distance from the aperture to the image plane on the optical axis is denoted by InS, the optical image capturing system has a maximum image height HOI which is perpendicular to the optical axis on the image plane and the following conditions are satisfied: $0.2 \leq InS/HOS \leq 1.1$, and $0.5 < HOS/HOI \leq 1.8$.

10. An optical image capturing system, in order along an optical axis from an object side to an image side, comprising:
 a first lens with refractive power;
 a second lens with positive refractive power;
 a third lens with refractive power;
 a fourth lens with refractive power;
 an image plane; and
 a first positioning element comprising a holder, wherein the holder is in a hollow shape and opaque, and comprises a cylinder and a basement connected with each other; the cylinder is configured to accommodate the first lens to the fourth lens; the basement is between the fourth lens and the image plane; an outer periphery of the basement is greater than an outer periphery of the cylinder; and a maximum value of the minimum side length of the basement perpendicular to the optical axis is denoted by PhiD;
 wherein, at least one lens among the third lens to the fourth lens has positive refractive power, focal lengths of the four lenses are expressed as f1, f2, f3 and f4, respectively, a focal length of the optical image capturing system is denoted by f and an entrance pupil diameter of the optical image capturing system is denoted by HEP, a distance on the optical axis from an object side of the first lens to the image plane is denoted by HOS, a distance on the optical axis from the object side of the first lens to an image side of the fourth lens is denoted by InTL, with a point on any one surfaces of any one of the four lenses which crosses the optical axis defined as a first starting point, a length of an outline curve from the first starting point to a first coordinate point of vertical height with a distance from the optical axis to the half entrance pupil diameter on the surface along an outline of the surface is denoted by ARE, and the following conditions are satisfied: $1.2 \leq f/HEP \leq 10$; $0.5 \leq HOS/f \leq 7$; $0 \text{ mm} < PhiD \leq 2.0 \text{ mm}$ and $0.1 \leq 2(ARE/HEP) \leq 2.0$.

11. The optical image capturing system of claim 10, a maximum effective diameter of the image side of the fourth lens is denoted by PhiA4, and the following condition is satisfied: $0 < PhiA4/InTL \leq 1.1$.

12. The optical image capturing system of claim 10, wherein a distance on the optical axis between the first lens and the second lens is denoted by IN12, a distance on the optical axis between the second lens and the third lens is denoted by IN23, a distance on the optical axis between the third lens and the fourth lens is denoted by IN34 and the following conditions are satisfied: $IN23 > IN12$ and $IN23 > IN34$.

13. The optical image capturing system of claim 10, wherein an object side of the second lens on the optical axis is a convex surface and an image side of the second lens on the optical axis is a convex surface.

14. The optical image capturing system of claim 10, thicknesses of the second lens, the third lens and the fourth lens on the optical axis are respectively expressed as TP2, TP3 and TP4 and the following conditions are satisfied: $TP2 > TP3$ and $TP2 > TP4$.

15. The optical image capturing system of claim 10, at least one surface of at least two lenses among the first lens to the fourth lens has at least one inflection point.

16. The optical image capturing system of claim 10, wherein the following condition is satisfied: $0 < PhiA4/HEP \leq 3.0$.

17. The optical image capturing system of claim 10, wherein the optical image capturing system has a maximum image height HOI which is perpendicular to the optical axis on the image plane, and the following condition is satisfied: $0 < PhiA4/2HOI \leq 1.0$.

18. The optical image capturing system of claim 10, wherein the following condition is satisfied: $0 \text{ mm} < PhiA4 \leq 1.4 \text{ mm}$.

19. The optical image capturing system of claim 10, a maximum image height of visible spectrum perpendicular to the optical axis on the image plane is denoted by HOI, a relative illumination on the maximum image height HOI of the optical image capturing system is denoted by RI, a lateral aberration of the longest operation wavelength of visible light of a positive tangential fan of the optical image capturing system passing through a margin of an entrance pupil and incident at the image plane by 0.7 HOI is denoted by PLTA, a lateral aberration of the shortest operation wavelength of visible light of the positive tangential fan of the optical image capturing system passing through the margin of the entrance pupil and incident at the image plane by 0.7 HOI is denoted by PSTA, a lateral aberration of the longest operation wavelength of visible light of a negative tangential fan of the optical image capturing system passing through the margin of the entrance pupil and incident at the image plane by 0.7 HOI is denoted by NLTA, a lateral aberration of the shortest operation wavelength of visible light of the negative tangential fan of the optical image capturing system passing through the margin of the entrance pupil and incident at the image plane by 0.7 HOI is denoted by NSTA, a lateral aberration of the longest operation wavelength of visible light of a sagittal fan of the optical image capturing system passing through the margin of the entrance pupil and incident at the image plane by 0.7 HOI is denoted by SLTA, a lateral aberration of the shortest operation wavelength of visible light of the sagittal fan of the optical image capturing system passing through the margin of the entrance pupil and incident at the image plane by 0.7 HOI is denoted by SSTA, and the following conditions are satisfied: PLTA≤100 µm; PSTA≤100 µm; NLTA≤100 µm; NSTA≤100 µm; SLTA≤100 µm; and SSTA≤100 µm; and 10%≤RI<100%.

20. An optical image capturing system, in order along an optical axis from an object side to an image side, comprising:
a first lens with refractive power;
a second lens with positive refractive power, both an object side and an image side of the second lens on the optical axis being convex;
a third lens with positive refractive power;
a fourth lens with refractive power;
an image plane;
a first positioning element comprising a holder, wherein the holder is in a hollow shape and opaque, and comprises a cylinder and a basement connected with each other; the cylinder is configured to accommodate the four lenses, the basement is between the fourth lens and the image plane; an outer periphery of the basement is greater than an outer periphery of the cylinder; and a maximum value of the minimum side length of the basement perpendicular to the optical axis is denoted by PhiD; and
a second positioning element accommodated in the holder and comprising a positioning part and a connecting part, wherein the positioning part is in a hollow shape and directly contacts and accommodates any one of the four lenses to arrange the four lenses on the optical axis; the connecting part is disposed outside the positioning part and directly contacts an inner periphery of the cylinder, and a maximum outer diameter of the connecting part on the plane perpendicular to the optical axis is denoted by PhiC;
wherein, the optical image capturing system has the four lenses with refractive power, a maximum effective diameter of an image side of the fourth lens is denoted by PhiA4, focal lengths of the four lenses are expressed as f1, f2, f3 and f4, respectively, a focal length of the optical image capturing system is denoted by f, and an entrance pupil diameter of the optical image capturing system is denoted by HEP, a distance on the optical axis from an object side of the first lens to the image plane is denoted by HOS, a distance on the optical axis from the object side of the first lens to the image side of the fourth lens is denoted by InTL, with a point on any one surface of any one of the four lenses which crosses the optical axis defined as a first starting point, a length of an outline curve from the first starting point to a first coordinate point of vertical height with a distance from the optical axis to the half entrance pupil diameter on the surface along an outline of the surface is denoted by ARE, and the following conditions are satisfied: 1.2≤f/HEP≤10; 0.5≤HOS/f≤7; PhiC<PhiD, 0 mm<PhiD≤2.0 mm, and 0.1≤2(ARE/HEP)≤2.0.

21. The optical image capturing system of claim 20, wherein the following condition is satisfied: 0<PhiA4/InTL≤1.3.

22. The optical image capturing system of claim 20, wherein a distance on the optical axis between the first lens and the second lens is denoted by IN12, a distance on the optical axis between the second lens and the third lens is denoted by IN23, a distance on the optical axis between the third lens and the fourth lens is denoted by IN34, and the following conditions are satisfied: IN23>IN12 and IN23>IN34.

23. The optical image capturing system of claim 20, thicknesses of the second lens, the third lens and the fourth lens on the optical axis are respectively expressed as TP2, TP3 and TP4 and the following conditions are satisfied: TP2>TP3 and TP2>TP4.

24. The optical image capturing system of claim 20, wherein the optical image capturing system has a maximum image height HOI which is perpendicular to the optical axis on the image plane, and the following condition is satisfied: 0<PhiA4/2HOI≤1.0.

25. The optical image capturing system of claim 20, further comprising an aperture, an image-sensing device and a driving module, wherein the image-sensing device is disposed in the image plane, InS is a distance on the optical axis from the aperture to the image plane, and the driving module is coupled with the four lenses to displace the four lenses, and the following condition is satisfied: 0.2≤InS/HOS≤1.1.

* * * * *